US008377344B2

(12) United States Patent
Moto et al.

(10) Patent No.: US 8,377,344 B2
(45) Date of Patent: Feb. 19, 2013

(54) OPTICAL FILM, METHOD FOR PRODUCING OPTICAL FILM, OPTICALLY-COMPENSATORY FILM, POLARIZING PLATE AND LIQUID-CRYSTAL DISPLAY DEVICE

(75) Inventors: Takahiro Moto, Minami-Ashigara (JP); Yosuke Nishiura, Odawara (JP); Takako Nishiura, legal representative, Odawara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1558 days.

(21) Appl. No.: 11/795,145

(22) PCT Filed: Jan. 31, 2006

(86) PCT No.: PCT/JP2006/001943
§ 371 (c)(1),
(2), (4) Date: Jul. 12, 2007

(87) PCT Pub. No.: WO2006/080588
PCT Pub. Date: Aug. 3, 2006

(65) Prior Publication Data
US 2008/0138541 A1    Jun. 12, 2008

(30) Foreign Application Priority Data

Jan. 31, 2005  (JP) ................................. 2005-023881

(51) Int. Cl.
*B29C 63/00*  (2006.01)
(52) U.S. Cl. ................. 264/1.1; 264/171.1; 264/172.19; 264/212
(58) Field of Classification Search ............... 264/171.1, 264/172.19, 212, 1.1
See application file for complete search history.

(56) References Cited

U.S. PATENT DOCUMENTS

| 3,805,402 | A | * | 4/1974 | Aono et al. ..................... 34/446 |
| 6,184,957 | B1 | | 2/2001 | Mori et al. |
| 6,285,429 | B1 | | 9/2001 | Nishida et al. |
| 2002/0162483 | A1 | | 11/2002 | Shimizu et al. |
| 2005/0046074 | A1* | | 3/2005 | Tasaka et al. ................. 264/207 |

FOREIGN PATENT DOCUMENTS

| JP | 9-080424 | A | 3/1997 |
| JP | 9-292522 | A | 11/1997 |
| JP | 10-054982 | A | 2/1998 |
| JP | 11-202323 | A | 7/1999 |
| JP | 2001-131301 | A | 5/2001 |
| JP | 2001-151902 | A | 6/2001 |
| JP | 2001-163994 | A | 6/2001 |
| JP | 2003-096207 | A | 4/2003 |
| JP | 2003-096237 | A | 4/2003 |
| JP | 2003-165868 | A | 6/2003 |
| JP | 2003-185839 | A | 7/2003 |
| JP | 2003-294943 | A | 10/2003 |
| JP | 2004-151472 | A | 5/2004 |
| JP | 2004-155146 | A | 6/2004 |
| JP | 2004-315613 | A | 11/2004 |
| JP | 2005-014584 | A | 1/2005 |
| JP | 2003-030937 | A | 2/2006 |

OTHER PUBLICATIONS

Mechine translation of JP 2003-185839.*
Saito et al., JP-2001-131301-A, machine translation, May 15, 2001.*
Form PCT/ISA/210 (International Search Report) dated Mar. 14, 2006.
Form PCT/ISA/237 (Written Opinion of the International Searching Authority) dated Mar. 14, 2006.
The Japan Institute of Invention and Innovation Technical Disclosure (Hatsumei Kyokai Kokaigihou), KOGI No. 2001-1745, Fuji Photo Film Co., Ltd., Mar. 15, 2001, pp. 16-30 (cited in International Search Report).
Takahiro Ishinabe et al., "Wide-Viewing-Angle Polarizer With a Large Wavelength Range", Jpn. J. Appl. Phys., 2002, vol. 41, Pt. 1, No. 7A, pp. 4553-4558 (cited on p. 2 of the present application).

* cited by examiner

*Primary Examiner* — Galen Hauth
(74) *Attorney, Agent, or Firm* — Buchanan Ingersoll & Rooney PC

(57) ABSTRACT

An optical film comprising: a resin material; and an additive in an amount of at least 0.3% by mass based on the resin material, wherein when the optical film is divided into 10 equal portions in a thickness direction of the optical film, an amount of the additive existing in each of 8 portions excepting the two outermost layer portions of the 10 equal portions is from 80 to 120% based on a mean additive amount in an entire optical film; a method for producing it; an optically-compensatory film, a polarizing plate and a liquid-crystal display device that comprise the optical film.

6 Claims, No Drawings

OPTICAL FILM, METHOD FOR PRODUCING OPTICAL FILM, OPTICALLY-COMPENSATORY FILM, POLARIZING PLATE AND LIQUID-CRYSTAL DISPLAY DEVICE

TECHNICAL FIELD

The present invention relates to an optical film and a method for producing an optical film, and to an optically-compensatory film, a polarizing plate and a liquid-crystal comprising an optical film.

BACKGROUND ART

A liquid-crystal display (LCD) device comprises a liquid-crystal cell and a polarizing plate. The polarizing plate has a polarizing film and a protective film, and is fabricated, for example, by coloring a polarizing film of polyvinyl alcohol with iodine, stretching it and attaching a protective film to both surfaces of the film. In a transmission-type liquid-crystal display device, such a polarizing plate is disposed on both sides of the liquid-crystal cell therein, and one or more optically-compensatory films may be further disposed therein. In a reflection-type liquid-crystal display device, a reflector, a liquid-crystal cell, one or more optically-compensatory films and a polarizing plate are disposed in that order. The protective film or the optically-compensatory film disposed between two polarizing films or between a polarizing film and a reflector have significant influences on the display capabilities of the liquid-crystal display devices, and their functions are extremely important.

A liquid-crystal cell comprises liquid-crystalline molecules, two substrates for sealing up them therebetween, and an electrode layer for imparting a voltage to the liquid-crystalline molecules. The liquid-crystal cell acts for ON/OFF display, depending on the difference in the alignment condition of the liquid-crystalline molecules therein, and for it, proposed are various display modes of TN (twisted nematic), IPS (in-plane switching), OCB (optically-compensatory bent), VA (vertically-aligned), ECB (electrically-controlled birefringence) modes that are applicable to any of transmission-type and reflection-type liquid-crystal display devices.

Of such LCDs, a TN-mode liquid-crystal display device (90-degree twisted nematic-mode liquid-crystal display device) is suitable to applications that require high-level display quality. The TN-mode device comprises nematic liquid-crystal molecules having positive dielectric anisotropy, and is driven by a thin-film transistor. The TN-mode device has a viewing angle characteristic in that, when seen in front of it, the device shows excellent display characteristics, but when seen in the oblique direction thereof, its contrast lowers and its brightness in gradation display is reversed for gradation reversal and its display characteristic is thereby worsened, and it is strongly desired to improve this characteristic.

For solving the problem, proposed are an IPS (in-plane switching) mode liquid-crystal display where a lateral electric field is applied to the liquid crystal therein, and a VA (vertically-aligned) mode device where the liquid-crystal molecules having negative dielectric anisotropy are vertically aligned for alignment division by the projections and the slit electrodes formed inside the panel, and these are now in practical use. Recently, these panels have been developed not only for monitors for personal computers and the like but also for TVs, and accordingly, the plane brightness of the panels has become significantly increased. As a result, in these devices, a minor light leakage in the oblique incident direction in the diagonal position in black display, which has heretofore been negligible in these driving modes, has become problematic as a cause of worsening the display quality.

As one method for improving the color tone and the viewing angle characteristic in black display, disposing an optically-compensatory material having a birefringence characteristic between a liquid-crystal layer and a polarizing plate in an IPS-mode device is investigated. For example, disclosed is a technique of improving the color appearance in direct viewing of white display or intermediate tone display in the oblique direction of a device by disposing a birefringence medium, in which the optical axes having an action of compensating the change in the retardation of the liquid-crystal layer in inclination are put perpendicularly to each other, between a substrate and a polarizing plate (see JP-A 9-80424). Also proposed is a method of using an optically-compensatory film that comprises a styrenic polymer having a negative intrinsic birefringence and a discotic liquid-crystalline compound (see JP-A 10-54982, JP-A 11-202323 and JP-A 9-292522).

Many of the proposed methods as above are for improving the viewing angle characteristic by canceling the birefringence anisotropy of the liquid crystal in the liquid-crystal cell, and are therefore still problematic in that the problem of light leakage caused by the crossing angle shifting of the polarizing axes from perpendicular crossing when the orthogonal polarizing plate is seen in the oblique direction could not be satisfactorily solved. Even in the system that may be able to compensate the light leakage, it is extremely difficult to completely optically compensate the liquid-crystal cell with no problem. This is because, even though the light leakage could be completely compensated at a certain wavelength, it is not always possible to compensate it at any other wavelength. For example, even when light passage at a wavelength of green that has a largest visual sensitivity could be compensated, there still remains a problem in that light leakage at a shorter wavelength of blue or at a longer wavelength of red may occur. For solving the problem, *Jpn. J. Appl. Phys.*, 41, (2002), 4553, has proposed a technique of layering two biaxial films.

However, since the method of *Jpn. J. Appl. Phys.*, 41, (2002), 4553, uses two biaxial films, it is problematic in that the axes of the films may be often misplaced to cause panel unevenness. In addition, the light leakage in black display is because the triacetyl cellulose film that has heretofore been used as a polarizing plate-protective film put between the liquid-crystal cell and the polarizing film has an in-plane retardation Re of about 5 nm and a thickness-direction retardation Rth of about 50 nm. Accordingly, it is desired to develop a cellulose acylate film having a small in-plane retardation Re and a small thickness-direction retardation Rth and to use it as a protective film for polarizing plate.

Recently, the temperature of liquid-display devices in service is often high owing to the backlight inside them and the devices are often used in a severe condition of high temperature and high humidity or in a severe condition of low humidity, and there occur various problems in that Re and Rth of the protective film of triacetyl cellulose for polarizing plate fluctuate depending on the ambient temperature and humidity and therefore the optically-compensatory capability of the film therefore varies, whereby light may leak away in black display and the images formed may be uneven. The problems are that the aspect ratio of the panel of liquid-crystal display devices differs, that the physical properties of the members constituting the devices naturally differ in the machine direction and in the cross direction thereof, and therefore, in original black display, light may leak away through the around of the frame of the display devices and therefore the image color may change. In addition, the temperature and humidity change causes film curling, and, as a result, it causes other serious problems in that the polarizing plate and even the liquid-crystal display device that comprises the integrated polarizing plate and liquid-crystal cell may warp to thereby cause cell deformation and therefore light leakage and color unevenness owing to the rib interference at the corners of the display panel.

For controlling the curl value, known are methods described in JP-A 2001-131301, JP-A 2001-151902 and JP-A 2001-163994. According to these methods, however, it is still unsatisfactory to control the curl value owing to the ambient humidity change. Therefore, it is desired to develop a film capable of giving a liquid-crystal display device that is free from a problem of environment-dependent geometric characteristic change and optical compensatory function change.

DISCLOSURE OF THE INVENTION

An object of the invention is to provide an optical film which has a small absolute value of curl and which has a small curl value fluctuation in environmental change of temperature and humidity, and to provide a method for producing it.

Another object of the invention is to provide an optically-compensatory film, a polarizing plate and a liquid-crystal display device that comprise the optical film and have good handlability and good viewing angle characteristics.

We, the present inventors have assiduously studied and, as a result, have found that, when the amount of the additive existing in an optical film is uniformly distributed in the thickness direction of the film, then the absolute value of curl of the film and the temperature and humidity-dependent change of curl thereof may be reduced.

In addition, we, the inventors have found that, when an additive-containing resin material to principally constitute an optical film is formed into a film under a specific co-extrusion condition, a casting condition or a drying condition, then the intended optical film may be efficiently produced, and have found such a specific film-forming method.

Further, we, the inventors have found that, when the optical film is used in an optically-compensatory film, a polarizing plate and a liquid-crystal display device, then film warping, light leakage and display color change may be reduced.

The objects of the invention have been attained by the constitutions mentioned below.

(1) An optical film comprising:
a resin material; and
an additive in an amount of at least 0.3% by mass based on the resin material,
wherein when the optical film is divided into 10 equal portions in a thickness direction of the optical film, an amount of the additive existing in each of 8 portions excepting the two outermost layer portions of the 10 equal portions is from 80 to 120% based on a mean additive amount in an entire optical film.

(2) An optical film comprising:
a resin material; and
an additive in an amount of at least 0.3% by mass based on the resin material, wherein a MD-direction and TD-direction curl value of the optical film is from −14 to +14/m within an entire temperature/humidity condition range of from 25° C./10% RH to 25° C./80% RH, and
wherein a difference between a MD-direction curl value $C_{MD,80}$ of the optical film at 25° C./80% RH and a MD-direction curl value $C_{MD,10}$ of the optical film at 25° C./10% RH is from −9/m to +9/m, and a difference between a TD-direction curl value $C_{TD,80}$ of the optical film at 25° C./80% RH and a TD-direction curl value $C_{TD,10}$ of the optical film at 25° C./10% RH is from −9/m to +9/m.

(3) The optical film as described in (2) above,
wherein when the optical film is divided into 10 equal portions in a thickness direction of the optical film, an amount of the additive existing in each of 8 portions excepting the two outermost layer portions of the 10 equal portions is from 80 to 120% based on a mean additive amount in an entire optical film.

(4) The optical film as described in any of (1) to (3) above,
wherein at least one of the additive is represented by formula (1) or (2):

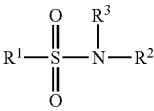

Formula (1)

wherein $R^1$ represents a substituted or unsubstituted alkyl or aryl group;
$R^2$ and $R^3$ each independently represents a hydrogen atom, or a substituted or unsubstituted alkyl or aryl group; and
a sum total of carbon atoms of $R^1$, $R^2$ and $R^3$ is at least 10;

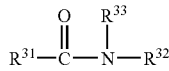

Formula (2)

wherein $R^{31}$ represents a substituted or unsubstituted alkyl or aryl group; and
$R^{32}$ and $R^{33}$ each independently represents a hydrogen atom, or a substituted or unsubstituted alkyl or aryl group.

(5) The optical film as described in any of (1) to (4) above,
wherein the optical film has Re (λ) and Rth (λ) satisfying formulae (I) and (II):

$$0 \leq Re_{(630)} \leq 10, \text{ and } |Rth_{(630)}| \leq 25, \quad (I)$$

$$|Re_{(400)} - Re_{(700)}| \leq 10, \text{ and } |Rth_{(400)} - Rth_{(700)}| \leq 35, \quad (II)$$

wherein Re (λ) represents an in-plane retardation value (unit: nm) of the optical film at a wavelength of λ nm; and
Rth (λ) represents a thickness-direction retardation value (unit: nm) of the optical film at a wavelength of λ nm.

(6) The optical film as described in any of (1) to (5) above,
wherein a thickness of the optical film is from 30 to 75

(7) A method for producing an optical film of any of (1) to (6) above, the method comprising steps (1) and (2):
(1) a step of adding an additive to a resin material at plural different concentrations and melting the additive and the resin material to prepare plural melts having different additive concentrations; and
(2) a step of co-extruding the plural melts onto a substrate in a manner that a melt having a higher additive concentration among the plural melts forms an outer layer of the optical film, so as to form an optical film in which when the optical film is divided into 10 equal portions in a thickness direction of the optical film, an amount of the additive existing in each of 8 portions excepting the two outermost layer portions of the 10 equal portions is from 80 to 120% based on a mean additive amount in an entire optical film.

(8) A method for producing an optical film of any of (1) to (6) above, the method comprising steps (1) and (2):

(1) a step of adding an additive to a resin material at plural different concentrations, adding a solvent to dissolve the additive and the resin material, and preparing plural solutions having different additive concentrations; and (2) a step of casting the plural solutions onto a substrate in a co-casting process or a multi-layer casting process in a manner that a solution having a higher additive concentration among the plural solutions forms an outer layer of the optical film, so as to form an optical film in which when the optical film is divided into 10 equal portions in a thickness direction of the optical film, an amount of the additive existing in each of 8 portions excepting the two outermost layer portions of the 10 equal portions is from 80 to 120% based on a mean additive amount in an entire optical film.

(9) A method for producing an optical film of any of (1) to (6) above, the method comprising steps (1), (2) and (3):

(1) a step of adding a resin material and an additive to a solvent and dissolving the resin material and the additive to prepare a solution, and casting the solution onto a substrate;

(2) a step of drying the casted solution so that a volatile content of the casted solution is within a range of from 40% to 80%, so as to form a film, and peeling the film from the substrate; and (3) a step of controlling a volatile content of the peeled film to fall within a range of from 10% to 45%, and drying the peeled film at a temperature not lower than 131° C., so as to form an optical film in which when the optical film is divided into 10 equal portions in a thickness direction of the optical film, an amount of the additive existing in each of 8 portions excepting the two outermost layer portions of the 10 equal portions is from 80 to 120% based on a mean additive amount in an entire optical film.

(10) An optically-compensatory film comprising:
an optical film as described in any of (1) to (6) above; and
an optically-anisotropic layer having $Re_{(630)}$ of from 0 to 200 nm and $|Rth_{(630)}|$ of from 0 to 400 nm on the optical film.

(11) A polarizing plate comprising at least one of an optical film as described in any of (1) to (6) above and an optically-compensatory film as described in (10) above as a protective film of the polarizing film.

(12) A liquid-crystal display device comprising at least one of an optical film as described in any of (1) to (6) above, an optically-compensatory film as described in (10) above and a polarizing plate as described in (11) above.

(13) The liquid-crystal display device as described in (12) above,
wherein a liquid-crystal mode of the liquid-crystal display device is a VA-mode or an IPS-mode.

BEST MODE FOR CARRYING OUT THE INVENTION

The invention is described in detail hereinunder.
[Curl Characteristic of Film]

The curl value of the optical film of the invention is from −14 to +14/m in both the MD direction and the TD direction thereof within the entire range of a temperature/humidity condition of from 25° C./10% RH to 25° C./80% RH, more preferably from −10/m to +10/m, even more preferably from −7/m to +7/m, still more preferably from −3/m to +3/m.

Also preferably, the curl value of the optical film of the invention does not change, depending on the ambient temperature and humidity. Concretely, the difference between the MD-direction curl value $C_{MD,80}$ of the optical film at 25° C./80% RH and the MD-direction curl value $C_{MD,10}$ thereof at 25° C./10% RH ($C_{MD,80} - C_{MD,10}$) is from −9/m to +9/m, and the difference between the TD-direction curl value $C_{TD,80}$ of the optical film at 25° C./80% RH and the TD-direction curl value $C_{TD,10}$ thereof at 25° C./10% RH ($C_{TD,80} - C_{TD,10}$) is from −9/m to +9/m. More preferably, ($C_{MD,80} - C_{MD,10}$) and ($C_{TD,80} - C_{TD,10}$) are from −7/m to +7/m, even more preferably from −5/m to +5/m, still more preferably from −3/m to +3/m.

Preferably, the difference in the curl value at 25° C./10% RH and the curl vale at 45° C./10% RH is from −19/m to +19/m both in the MD direction and in the TD direction of the film. More preferably, it is from −14/m to +14/m, even more preferably from −9/m to +9/m. Also preferably, the difference in the curl value at 25° C./60% RH and the curl vale at 45° C./60% RH and the difference in the curl value at 25° C./80% RH and the curl vale at 45° C./80% RH are from −15/m to +15/m both in the MD direction and in the TD direction of the film. More preferably, it is from −10/m to +10/m, even more preferably from −5/m to +5/m.

Having the curl value falling within the above-defined range, the optical film of the invention may reduce the curl of a polarizing plate as fabricated by sticking the optical film to a polarizing film serving as a polarizing plate-protective film for it, and may further reduce the curl fluctuation of the polarizing plate depending on the ambient temperature and humidity change, and as a result, when the optical film is used as built in a liquid-crystal display device, it is effective for reducing coloration unevenness and light leakage (density unevenness) in the device.

When the optical film of the invention is used as a polarizing plate-protective film and when it is stuck to a polarizing film, and, in particular, when a long-size polarizing film is efficiently stuck to a long-size optical film of the invention or when the optical film is subjected to surface treatment or subjected to rubbing treatment before it is coated with an optically-anisotropic layer, and especially when the treatment or the application of a functional layer such as the optically-anisotropic layer to the film, the curl value of the optical film of the invention shall be within the defined range as above. If not, or that is, if the curl value of the film is outside the range, then the film could not be well handled during the treatment and there may occur a trouble of film breakage during its treatment. If so, in addition, the edges or the center part of the film may be brought into strong contact with a conveyor roll to give much dust, and as a result, much impurity may adhere to the surface of the film. In that condition, if the optical film is used as an optically-compensatory film, then the frequency of the scratches, the dot defects and the coating streaks may be over the allowable level. Further, when the curl value of the optical film of the invention is defined to fall within the range as above, then bubbles may be prevented from being caught by the optical film stuck to a polarizing film, and in addition, when an optically-anisotropic layer is formed on the optical film, then the frequency of color mottle failures that may be formed in the layer may be reduced.

The curl value may be determined according to a measurement method defined by American National Standard Institute (ANSI/ASCPH1.29-1985).
[Additives to Film]

The optical film of the invention may contain various additives. The additives include, for example, optical anisotropy-lowering compound (also called, compound capable of lowering optical anisotropy), wavelength-dependent anisotropy distribution improver, optical property improver, UV inhibitor, plasticizer, antioxidant, fine particles, etc.

Various additives are added to the film in the stage of producing the film. The time for addition of additives is not specifically defined. When a thermoplastic resin is thermally melted to form an optical film, then the additives may be added while the resin is thermally melted. When a polymer is uniformly dissolved in a solvent and a film is formed from the resulting solution (according to a solvent-casting process), then the additives may be added while the polymer solution (hereinafter this may be referred to as a dope) is prepared. In this case, a final step of adding additives to a dope may be additionally carried out in the dope-preparing process.

[Content of Additives]

The optical film of the invention may contain such additives in an amount of at least 0.3% by mass, for example, from 0.3% by mass to 45% by mass. (In this specification, % by mass and parts by mass are equal to % by weight and parts by weight, respectively.) Containing the additives, the optical properties and the physical properties of the optical film may be broadened than those of the film comprising a resin material alone. More preferably, the additive content is from 5 to 40% by mass, even more preferably from 10 to 30% by mass. As so mentioned hereinabove, the additives include, for example, optical anisotropy-lowering compound, wavelength-dependent anisotropy distribution improver, UV inhibitor, plasticizer, antioxidant, fine particles, release agent, IR absorbent. Preferably, the additives have a molecular weight of at most 3000, more preferably at most 2000, even more preferably at most 1000. If their molecular weight is larger than 3000, then it is unfavorable since the additives may be ineffective and, if so, in addition, the additives could not be uniformly dispersed in the film and detecting uniform dispersion of the additives in the film would be difficult. If the total amount of the additive compounds is smaller than 0.3% by mass, then it may be problematic in that the property of the basic resin material would appear too greatly and, for example, the optical property and the physical strength of the resin film may readily fluctuate depending on the ambient temperature and humidity change. On the other hand, however, if the total amount of the additive compounds is larger than 45% by mass, then it would be over the limit of compatibility of the additives in the optical film and, if so, there may occur a problem in that the additives may precipitate out on the surface of the film and the film may whiten (that is, the constitutive additive component may bleed out of the film).

When the resin material for the film is a water-absorbing or moisture-absorbing one, then the additives thereto are preferably hydrophobic. This is because such hydrophobic additives may be effective for homogenizing the hydrophilicity/hydrophobicity of the film in the thickness direction thereof, and may be effective for stabilizing the optical properties such as the light transmittance and the optical anisotropy of the film, and stabilizing the physical properties such as the curling resistance and the moisture absorption resistance of the film depending on the temperature change, the moisture change and time-dependent change thereof. On the contrary, when the resin material for the film is a hydrophobic material, then hydrophilic additives may be preferably used for it.

[Additive Distribution in the Thickness Direction of Film]

The optical film of the invention contains at least one additive of a compound having a molecular weight of at most 3000, in an amount of at least 0.3% by mass of the resin material that constitutes the optical film, and when the film is divided into 10 equal portions in the thickness direction thereof, the amount of the additive existing in 8 portions excepting the two outermost layer portions of those 10 portions is from 80% to 120% of the mean additive amount in the entire optical film. The wording "mean additive amount in the entire optical film" as referred to herein is meant to indicate a value obtained by dividing the overall additive amount in the optical film by 10. Since the additive distribution in the optical film of the invention is uniform, it is believed that the curl value of the optical film could be almost 0 at room temperature and ordinary humidity, or at low humidity or high humidity, or at low temperature or high temperature, and it is therefore believed that the humidity-dependent curl fluctuation and the temperature-dependent curl fluctuation of the film could be kept low. More preferably, the additive amount in each portion of the film is from 85% to 115% of the mean additive amount in the film, even more preferably from 90% to 110%.

The additive distribution in the thickness direction of the film may be determined by the use of ION-TOF7s TOF-SIMS IV (primary ion of $Aul^+$, 25 eV). Briefly, the film is divided in the thickness direction thereof from the surface of the film-cast support to the air surface (opposite to the support surface) into 10 equal portions, and the additive strength in every layer portion is measured, and the additive distribution is determined from the data of each layer portion. When plural additives are added to the film, then the additive strength is determined for every additive, the additive amount in the entire film is computed from the data, and the additive amount of each layer portion is computed relative to the proportion of each additive in each layer portion.

For controlling the additive distribution in the optical film to fall within the defined range as above, used are additives that hardly scatter and diffuse in the process of extruding and cooling the melts for the film. Further, it is also desirable that, in consideration of the scatterability and the diffusibility of the additives used, the amount of the additives to be in the outer melt layers of the film is kept somewhat higher than that in the other layers in the process of co-extrusion of forming the film. Concretely, herein employable is a method that comprises the following steps (1) and (2):

(1) a step of adding an additive having a molecular weight of at most 3000 to a resin material at plural different concentrations and melting it to prepare plural melts having different additive concentrations, (2) a step of co-extruding the melts onto a substrate in such a manner that the melts having a higher additive concentration could form an outer layer of the resulting optical film.

The outer layer as referred to in the above means the outermost top and bottom layers of 10 equal portions of the optical film divided in the thickness direction thereof. The additive concentration of the outermost layer is preferably higher by from 0.1 to 15% than the inner layers, more preferably by from 0.5% to 10%.

For the film formed from solutions, the additive and the solvent are so selected and combined that the additive hardly scatters or diffuses in the drying step for solvent removal after the step of casting the dope solutions onto a substrate. Preferably, the additive has a higher affinity to the resin material than to the solvent. It is desirable that, in the drying step, the additive scatters little while the solvent is evaporated away from the film surface, and in the step where the solvent concentration becomes lower, the additive diffusion into the film surface during the solvent diffusion thereinto is retarded by the resin material that has a higher affinity to the additive, whereby the additive distribution in the film is prevented from being uneven and could fall within a desired range.

In consideration of the diffusibility and the scatterability of the additive, it is also desirable that the additive amount in the outer dope layer (outer layer of the film) is kept somewhat higher than that in the inner layers. Specifically, herein employable is a method comprising the following steps (1) and (2):

(1) a step of adding an additive having a molecular weight of at most 3000 to a resin material at plural different concentrations, adding a solvent thereto to dissolve them, and preparing plural solutions having different additive concentrations, (2) a step of casting the solutions onto a substrate in a co-casting process or a multi-layer casting process in such a manner that the solutions having a higher additive concentration could form an outer layer of the resulting optical film.

The definition of the outer layer and the difference in the additive concentration between the outermost layer and the inner layers are as mentioned hereinabove.

By controlling the drying condition in producing the film, the additive distribution may also fall within the defined range. For it, herein employable is a method comprising the following steps (1), (2) and (3):

(1) a step of adding a resin material and an additive having a molecular weight of at most 3000 to a solvent and dissolving them therein to prepare a solution, and casting it onto a substrate, (2) a step of drying it so that the volatile content of the solution could be within a range of from 40% to 80% to form a film and peeling the film from the substrate, (3) a step of controlling the volatile content of the film thus peeled from the substrate to fall within a range of from 10% to 45%, and drying it at a temperature not lower than 131° C.

The drying condition is preferably as follows: The film is peeled away from a substrate such as a band or a drum, having a volatile content of from 40% to 80%, at a peeling speed of from 40 in/min to 200 m/min, and its drying is started at 131° C. or higher when the volatile content of the film is from 10% to 45%, and the drying time is within 24 minutes. The rapid drying is preferred.

Preferably, the volatile content of the film being peeled is from 50% to 70%, more preferably from 58% to 65%. The peeling speed is preferably from 53 m/min to 180 m/min, more preferably from 90 m/min to 160 m/min. The peeling speed has an influence on the film producibility, and if it is lower than 40 m/min, then it may be difficult to produce the film at low costs.

Preferably, the drying at 131° C. or higher is started while the volatile content of the film is from 15% to 40% more preferably from 18% to 35%. The drying time is preferably within 20 minutes, more preferably within 16 minutes.

The drying temperature is preferably higher as the film could be dried more rapidly and the additive distribution in the film could be more unified. Though depending on the dope composition for the film, the drying temperature is preferably 131° C. or higher, more preferably from 135 to 180° C. for rapidly removing water from the film.

Examples of the additives are compounds of the following formulae (1) and (2). These have a function of lowering the optical anisotropy of the film and are therefore very favorable.

Formula (1)

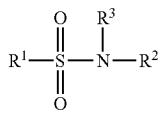

In formula (1), $R^1$ represents an alkyl group or an aryl group; $R^2$ and $R^3$ each independently represents a hydrogen atom, an alkyl group, or an aryl group. The sum total of the carbon atoms of $R^1$, $R^2$ and $R^3$ is preferably at least 10. In $R^1$, $R^2$ and $R^3$, the alkyl group and the aryl group may have a substituent.

For the substituent for the alkyl group and the aryl group, preferred are a fluorine atom, an alkyl group, an aryl group, an alkoxy group, a sulfone group and a sulfonamide group; and more preferred are an alkyl group, an aryl group, an alkoxy group, a sulfone group and a sulfonamide group. The alkyl group may be linear, branched or cyclic, preferably having from 1 to 25 carbon atoms, more preferably from 6 to 25 carbon atoms, even more preferably from 6 to 20 carbon atoms (e.g., methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl, didecyl). The aryl group preferably has from 6 to 30 carbon atoms, more preferably from 6 to 24 carbon atoms (e.g., phenyl, biphenyl, terphenyl, naphthyl, binaphthyl, triphenylphenyl).

Preferred examples of the compound of formula (1) are mentioned below, to which, however, the invention should not be limited.

A-1
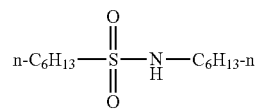

A-2
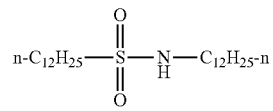

A-3
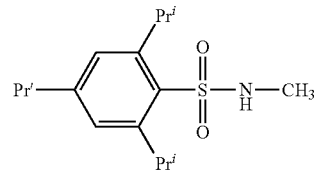

A-4
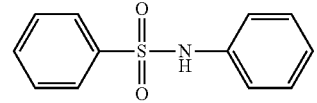

A-5
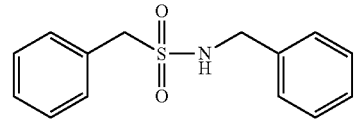

A-6
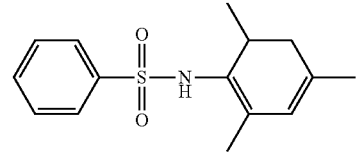

A-7
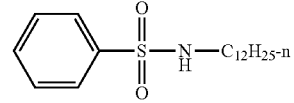

A-8
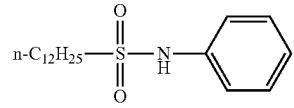

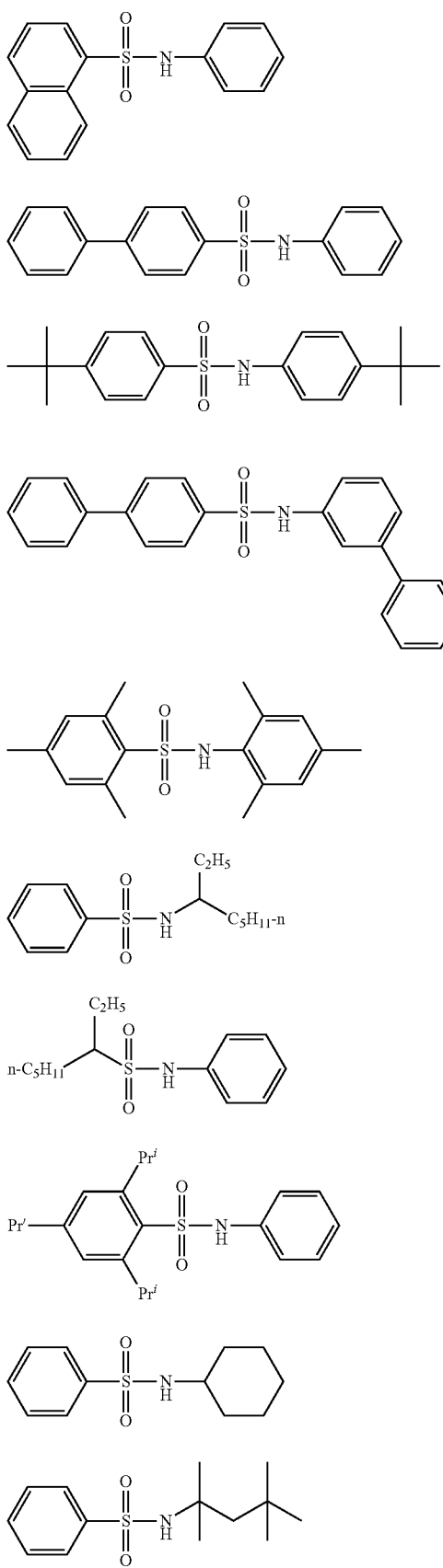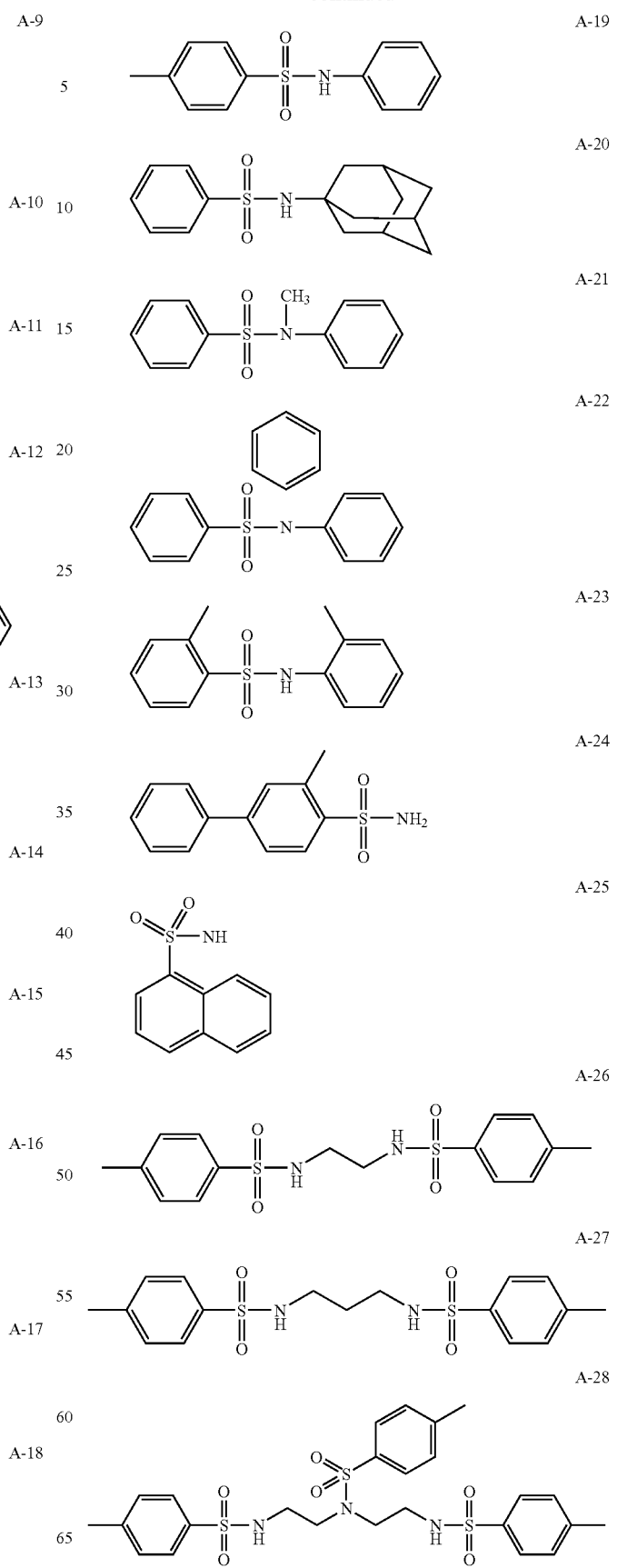

-continued
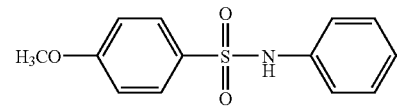
A-29
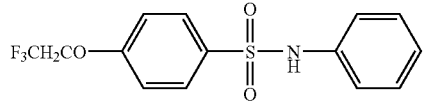
A-30
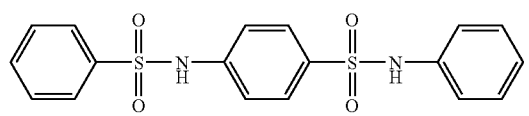
A-31
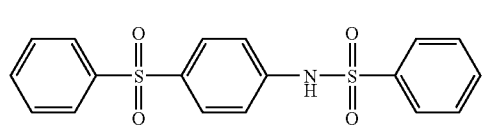
A-32
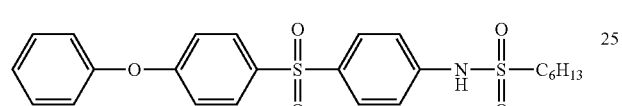
A-33
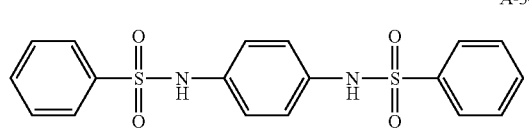
A-34
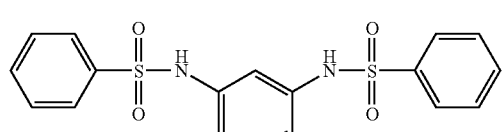
A-35
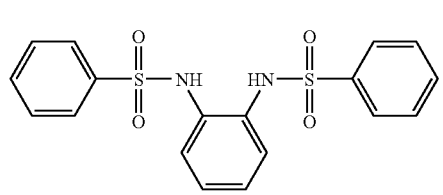
A-36
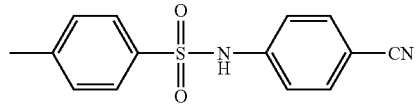
A-37
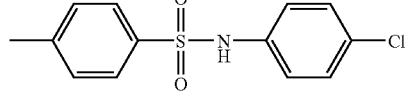
A-38
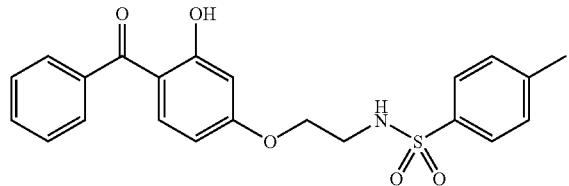
A-39
-continued
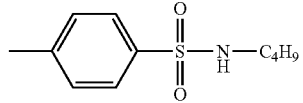
A-40
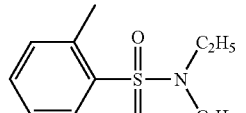
A-41
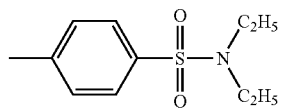
A-42
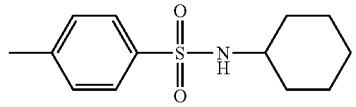
A-43
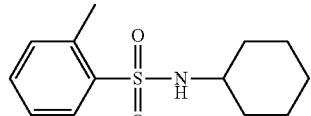
A-44
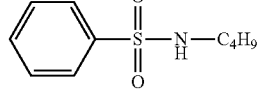
A-45
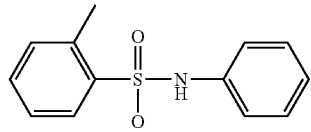
A-46
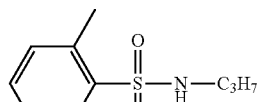
A-47
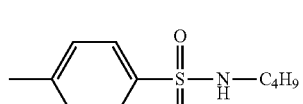
A-48
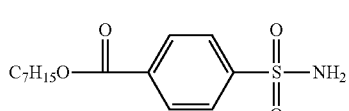
A-49
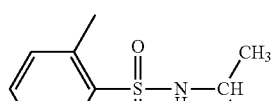
A-50
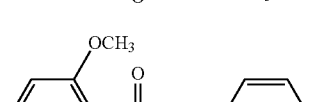
A-51

Compounds of formula (2) are described below.

Formula (2)

In the formula, $R^{31}$ represents an alkyl group or an aryl group; $R^{32}$ and $R^{33}$ each independently represents a hydrogen atom, an alkyl group or an aryl group. The alkyl group may be linear branched or cyclic, preferably having from 1 to 20 carbon atoms, more preferably from 1 to 15 carbon atoms, most preferably from 1 to 12 carbon atoms. The cyclic alkyl group is especially preferably a cyclohexyl group. The aryl group preferably has from 6 to 36 carbon atoms, more preferably from 6 to 24 carbon atoms.

The alkyl group and the aryl group may have a substituent. For the substituent, preferred are a halogen atom (e.g., chlorine, bromine, fluorine, iodine), an alkyl group, an aryl group, an alkoxy group, an aryloxy group, an acyl group, an alkoxycarbonyl group, an aryloxycarbonyl group, an acyloxy group, a sulfonylamino group, a hydroxy group, a cyano group, an amino group and an acylamino group; more preferred are a halogen atom, an alkyl group, an aryl group, an alkoxy group, an aryloxy group, a sulfonylamino group and an acylamino group; even more preferred are an alkyl group, an aryl group, a sulfonylamino group and an acylamino group.

Preferred examples of the compound of formula (2) are mentioned below, to which, however, the invention should not be limited.

FA-9

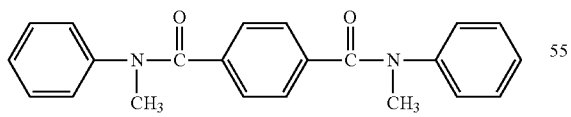

FA-10

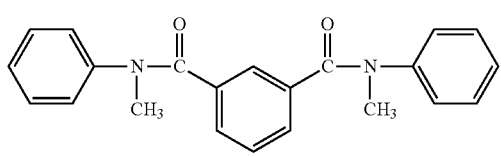

FA-11

FA-12

FA-13

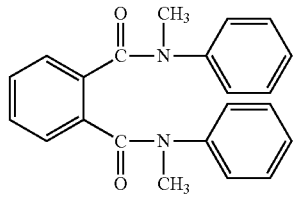

FA-14

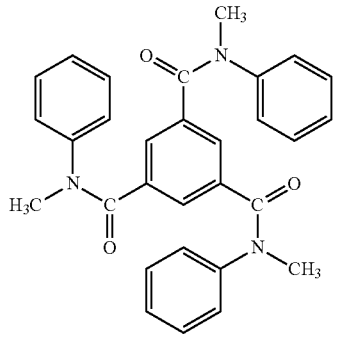

FA-15

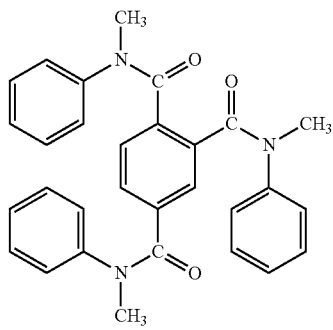

FA-16

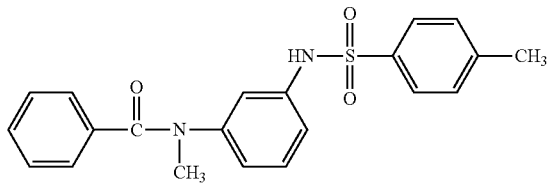

FA-17

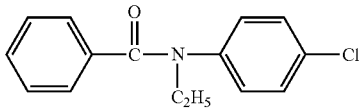

FA-18

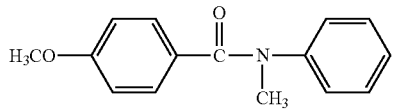

FA-19

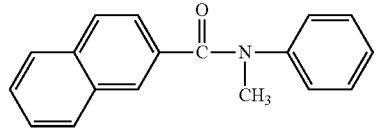

FA-20
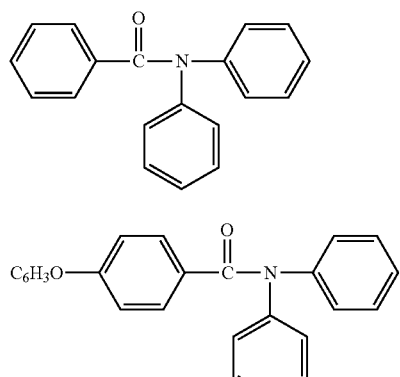
FA-21
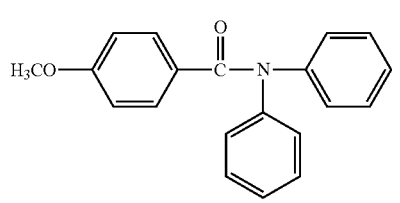
FA-22
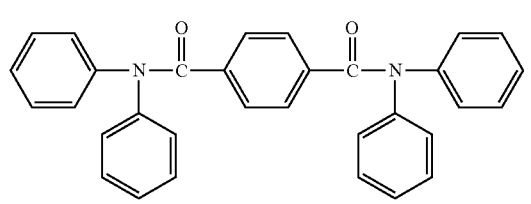
FA-23
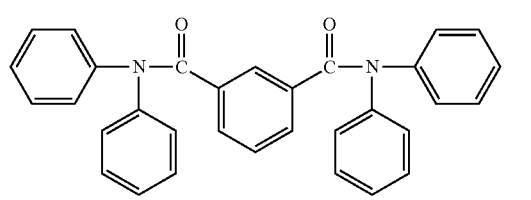
FA-24
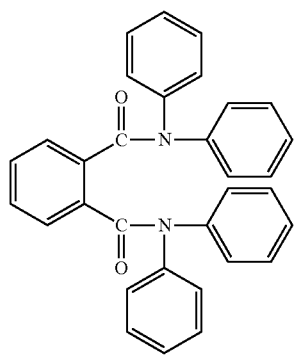
FA-25
FA-26
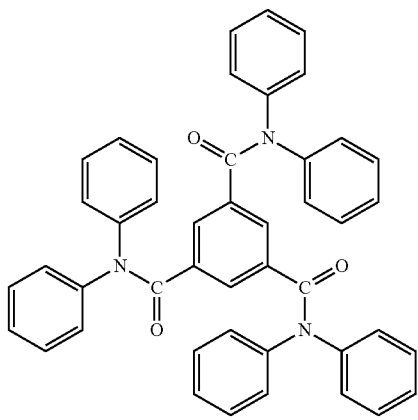
FA-27
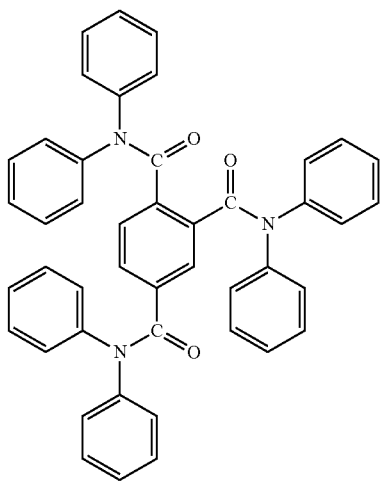
FA-28
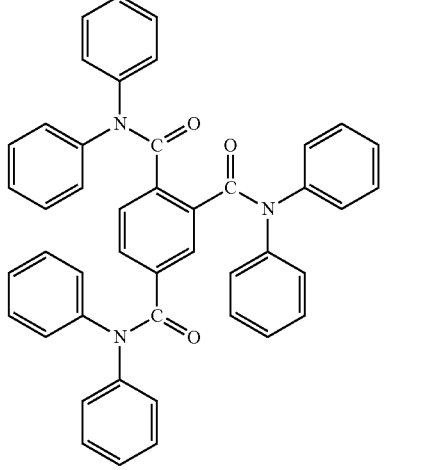
FB-1
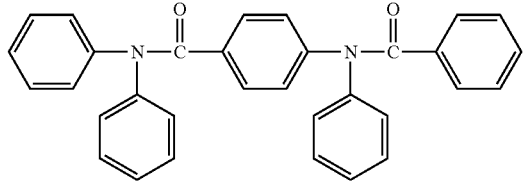
FB-2
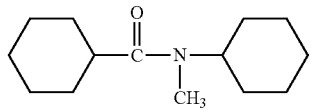
FB-3
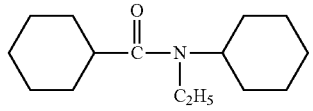
FB-4
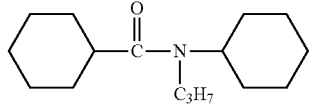
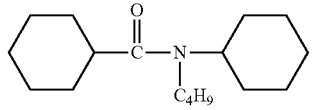

FB-5
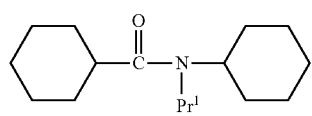
FB-6
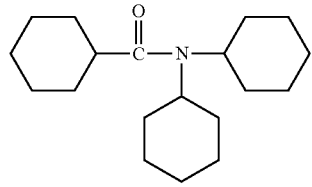
FB-7
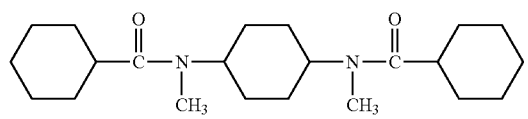
FB-8
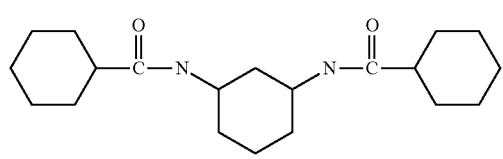
FB-9
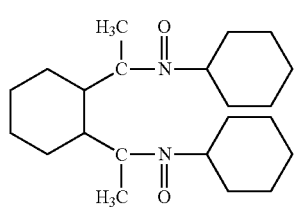
FB-10
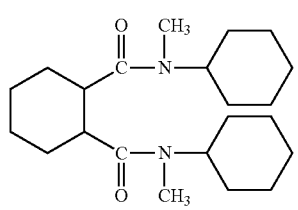
FB-11
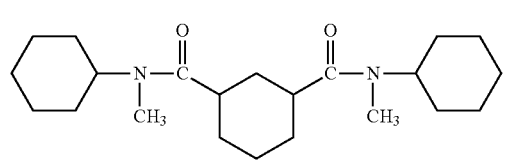
FB-12
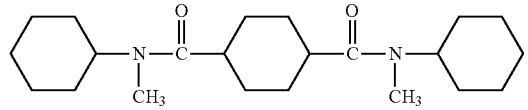
FB-13
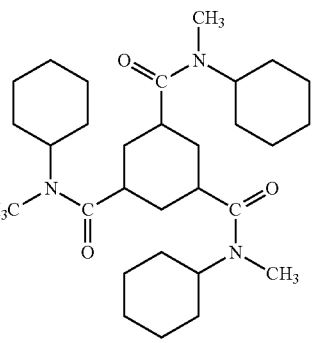
FB-14
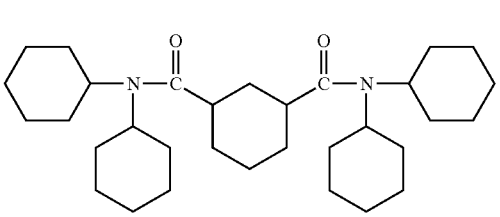
FB-15
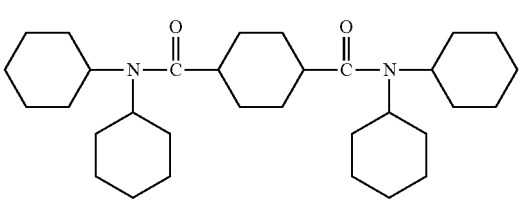
FB-16
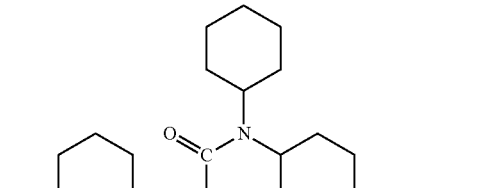
FB-17
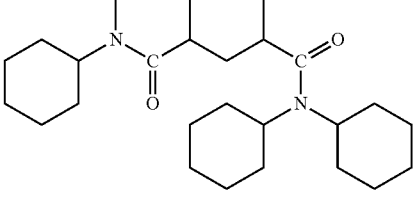
FB-18
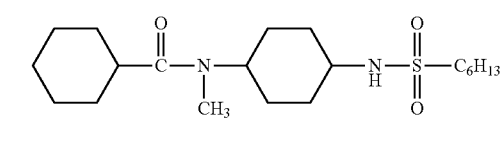
FB-19
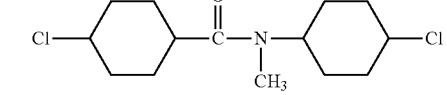

FB-20
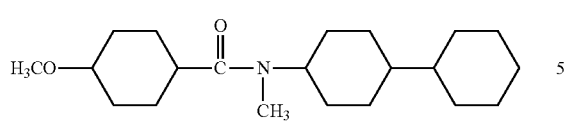
FB-21
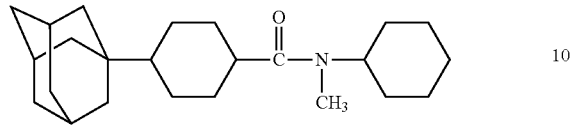
FB-22
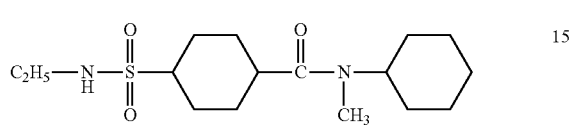
FB-23
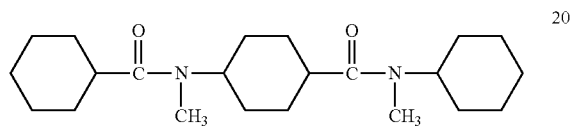
FB-24
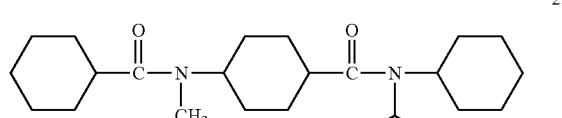
FC-1
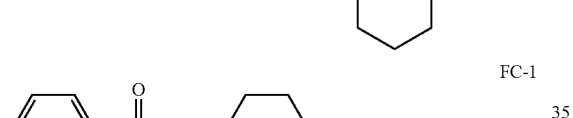
FC-2
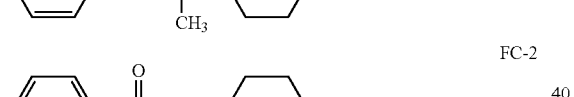
FC-3
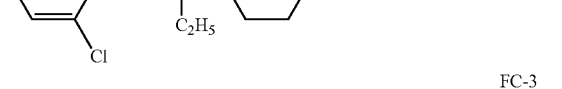
FC-4
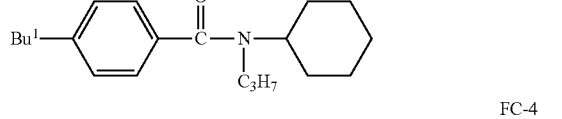
FC-5
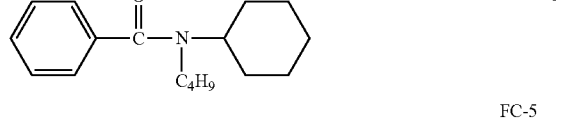
FA-6
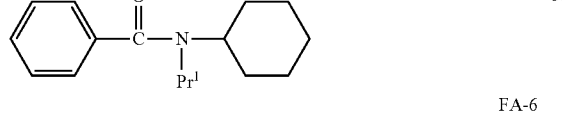
FC-7
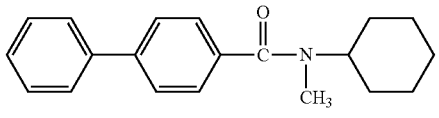
FC-8
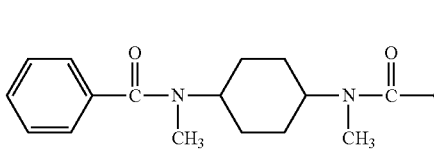
FC-9
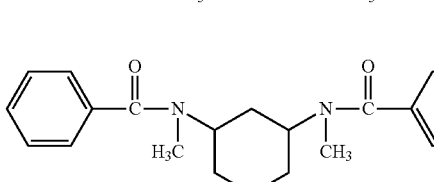
FC-10
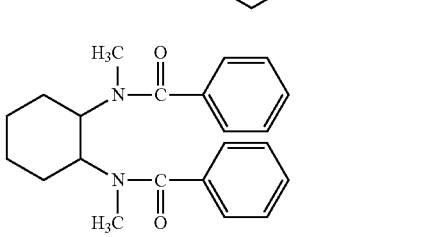
FC-11
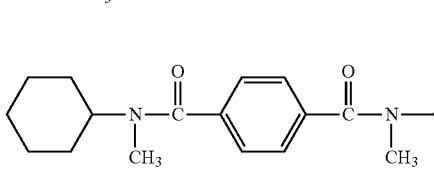
FC-12
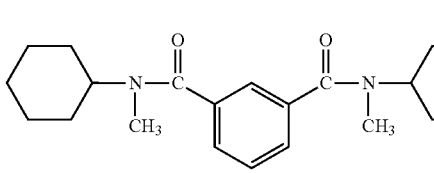
FC-13
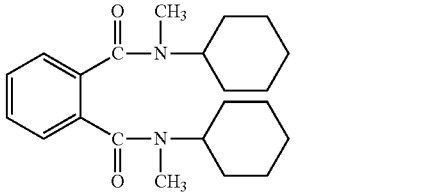
FC-14
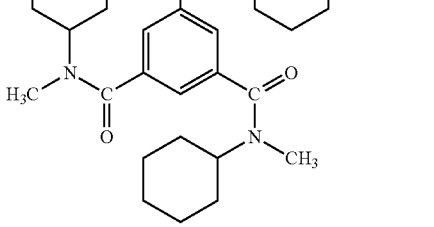

-continued

FC-15, FC-16, FC-17, FC-18, FC-19, FC-20, FC-21, FC-22, FC-23, FC-24, FC-25, FD-1, FD-2, FD-3, FD-4, FD-5, FD-6, FD-7, FD-8

FD-9
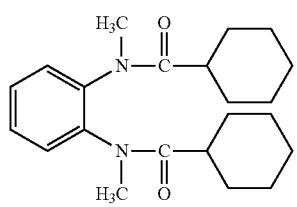
FD-10
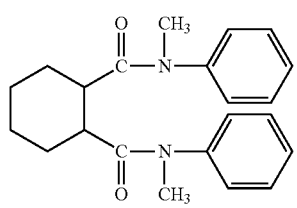
FD-11
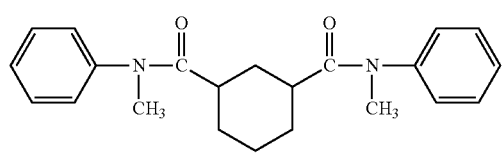
FD-12
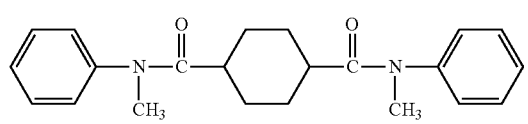
FD-13
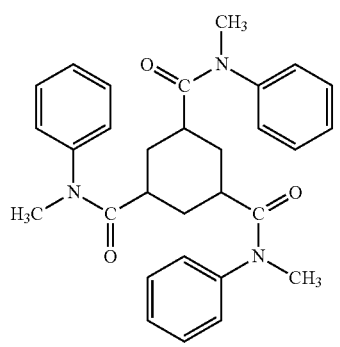
FD-14
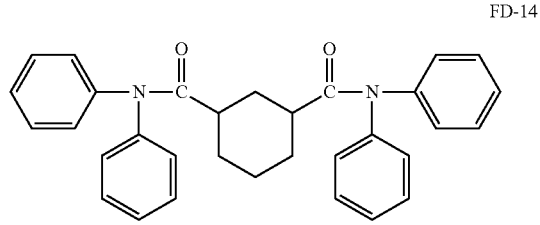
FD-15
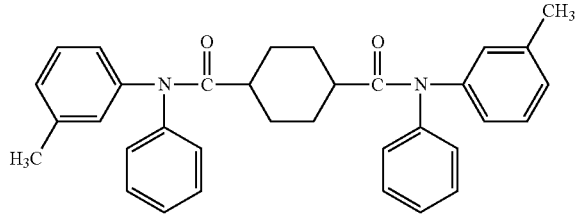
FD-16
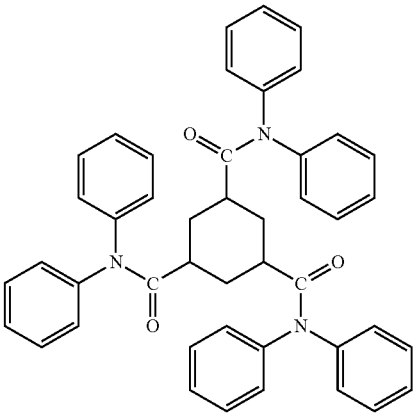
FD-17
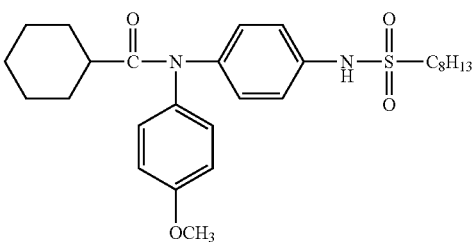
FD-18
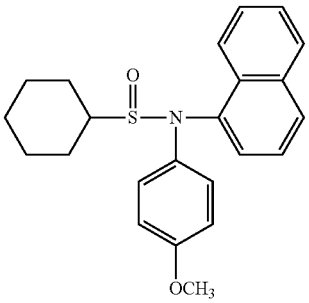
FD-19
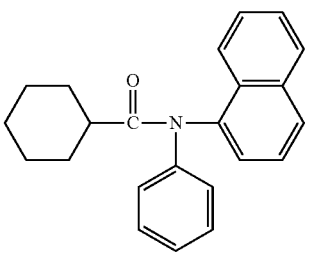
FD-20
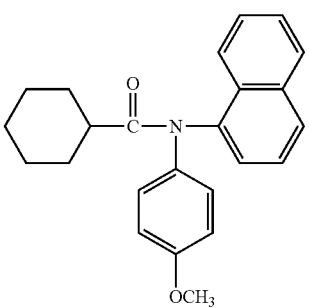

-continued

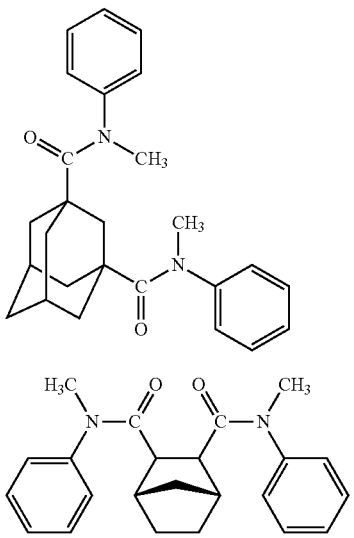

FD-21

FD-22

These additives mentioned above have a function of lowering the optical anisotropy of the film containing any of them.

The optical film of the invention contains such a compound capable of lowering the optical anisotropy thereof, or that is, a compound having the ability to inhibit the polymer molecules of the optical film from being aligned in the in-plane direction and the thickness direction of the film, and therefore Re of the film may be near to 0 and Rth thereof may also be near to 0. It is advantageous that the compound of lowering the optical anisotropy of the film is well miscible with the polymer for the film and does not have a rod-like structure or a plane-like structure by itself. Concretely, when the compound has a plurality of plane-like functional groups such as aromatic groups, then it is advantageous that the functional groups are not in one and the same plane in a two-dimensional structure but in different planes in a three-dimensional structure.

Preferably, the optical film of the invention contains at least one such optical anisotropy-lowering compound within a range satisfying the following formulae (a) and (b):

$(Rth(A)-Rth(0))/A \leq -1.0$, (a)

$0.01 \leq A \leq 30$. (b)

In these formulae, Rth(A) means Rth (nm) of the film that contains A % of a compound of lowering Rth; Rth(0) means Rth (nm) of the film not containing a compound of lowering Rth; A means the mass (%) of the compound relative to the solid content mass, 100, of the polymer.

Preferably, the formulae (a) and (b) are as follows:

$(Rth(A)-Rth(0))/A \leq -2.0$, (a1)

$0.05 \leq A \leq 25$, (b1)

more preferably, $(Rth(A)-Rth(0))/A \leq -3.0$, (a2)

$0.1 \leq A \leq 20$. (b3)

[Optical Anisotropy of Film]

Preferably, the optical anisotropy (Re, Rth) of the invention is small; and more preferably, the in-plane retardation $Re_{(630)}$ of the film at a wavelength of 630 nm is at most 10 nm ($0 \leq Re_{(630)} \leq 10$), and the absolute value of the thickness-direction retardation Rth(630) thereof is at most 25 nm ($|Rth_{(630)}| \leq 25$ nm). More preferably, $0 \leq Re_{(630)} \leq 5$, and $|Rth_{(630)}| \leq 20$ nm; even more preferably, $0 \leq Re_{(630)} \leq 2$, and $|Rth_{(630)}| \leq 15$ nm.

Preferably, the difference in Re and Rth between at a wavelength of 400 nm and at a wavelength of 700 nm of the optical film of the invention, $|Re_{(400)}-Re_{(700)}|$ and $|Rth_{(400)}-Rth_{(700)}|$, is small; more preferably, $|Re_{(400)}-Re_{(700)}| \leq 10$ and $|Rth_{(400)}-Rth_{(700)}| \leq 35$. Even more preferably, $|Re_{(400)}-Re_{(700)}| \leq 5$ and $|Rth_{(400)}-Rth_{(700)}| \leq 25$; still more preferably $|Re_{(400)}-Re_{(700)}| \leq 3$ and $|Rth_{(400)}-Rth_{(700)}| \leq 15$.

(Thickness of Film)

Preferably, the thickness of the optical film of the invention is from 20 to 120 μm, more preferably from 30 to 75 μm, even more preferably from 55 to 75 μm, still more preferably from 65 to 75 μm.

(Equilibrium Water Content of Film)

The equilibrium water content of the optical film of the invention is preferably at most 4% at 25° C. and 80% RH, irrespective of the film thickness, in order that it may not lose its good adhesiveness to water-soluble polymer such as polyvinyl alcohol when it is used as a protective film for polarizing plate. More preferably, the equilibrium water content of the film is from 0.1 to 3.5%, even ore preferably from 1 to 3%. If the equilibrium water content thereof is larger than 4%, then the film is unfavorable since the humidity-dependent retardation fluctuation of the film may be great when the film is used as a support for optically-compensatory films.

The water content may be measured as follows: A sample, 7 mm×35 mm of the optical film of the invention is se on a water content meter of a sample drier (CA-03, VA-05, both by Mitsubishi Chemical), and its water content is measured according to a Karl-Fischer's method. The water amount (g) is divided by the sample mass (g) to obtain the water content of the sample film.

(Water Vapor Permeability Through Film)

The water vapor permeability through the optical film of the invention may be determined as follows: According to the JIS standard, JISZ0208, a film sample is analyzed at a temperature of 60° C. and a humidity of 95% RH, and its water vapor permeability is calculated, as converted as a film having a thickness of 80 μm. Preferably, the film of the invention has a water vapor permeability of from 400 g/m²·24 hr to 2000 g/m²·24 hr, more preferably from 500 to 1800 g/m²·24 hr, even more preferably from 600 to 1600 g/m²·24 hr. If it is over 2000 g/m²·24 hr, then the humidity-dependent absolute value of Re and Rth of the film may be significantly higher than 0.5 nm/% RH. In addition, the case is also unfavorable because, when an optically-anisotropic layer is laminated on the optical film of the invention to give an optically-compensatory film, then the humidity-dependent absolute value of Re and Rth of the film may also be significantly higher than 0.5 nm/% RH. When such an optically-compensatory film or a polarizing plate is built in a liquid-crystal display device, then it may cause color change or viewing angle reduction. On the other hand, when the water vapor permeability through the optical film of the invention is smaller than 400 g/m²·24 hr, it may also be problematic in that, when the film is stuck to both faces of a polarizing film to fabricate a polarizing plate, then the optical film may interfere with the drying of the adhesive used and may therefore cause adhesion failure of the resulting polarizing plate.

When the optical film is thick, then its water vapor permeability may be small; but when the film is thin, then its water vapor permeability may be large. Accordingly, a standard thickness of 80 µm shall apply to any and every film sample, and the data of all the samples analyzed must be recomputed based on the standard thickness. The film thickness-based conversion is attained as (80 µm-thick sample water-vapor permeability=measured water-vapor permeability×measured film thickness, µm/80 µm).

For the determination of the water vapor permeability of the optical film of the invention, referred to is the method described in *Physical Properties of Polymer II* (Polymer Experiment Lecture 4, Kyoritsu Publishing), pp. 285-294; Determination of Vapor Permeation Amount (mass process, thermometer process, vapor pressure process, adsorption process). Briefly, a film sample disc of 70 mmϕ is moisture-conditioned at 25° C. and 90% RH, and at 60° C. and 95% RH both for 24 hours, while set in a vapor permeability tester (KK-709007, by Toyo Seiki), in which the water amount per the unit area ($g/m^2$) of the sample is measured according to JIS Z-0208. Water vapor permeability=mass after moisture-conditioning−mass before moisture-conditioning.

[Haze of Film]

Preferably, the haze of the optical film in the invention falls between 0.01 and 2.0%, more preferably between 0.05 and 1.5%, even more preferably between 0.1 and 1.0%. The film transparency is a matter of importance when the film serves as an optical film. The haze may be determined as follows: A sample of the optical film of the invention having a size of 40 mm×80 mm is measured with a haze meter (HGM-2DP by Suga Test Instruments) at 25° C. and 60% RH, according to JIS K-6714.

[Material of Optical Film]

The material to form the optical film of the invention is preferably a polymer having good optical properties, good transparency, good mechanical strength, good heat stability, good waterproofness and good isotropy. Any and every material can be used so far as its Re and Rth fall within the ranges satisfying the above-mentioned range. For example, it includes polycarbonate polymers; polyester polymers such as polyethylene terephthalate, polyethylene naphthalate; acrylic polymers such as polymethyl methacrylate; and styrenic polymers such as polystyrene, acrylonitrile/styrene copolymer (AS resin). Other examples of the polymer material are polyolefins such as polyethylene, polypropylene; polyolefin copolymers such as ethylene/propylene copolymer; vinyl chloride polymers; amide polymers such as nylon, aromatic polyamide; imide polymers, sulfone polymers, polyether-sulfone polymers, polyether-ether-ketone polymers, polyphenylene sulfide polymers, vinylidene chloride polymers, vinyl alcohol polymers, vinyl butyral polymers, arylate polymers, polyoxymethylene polymers, epoxy polymers, and mixtures of the polymers mentioned above. The transparent film of the invention may be formed as a cured layer of an acrylic, urethane, acrylurethane, epoxy or silicone-type UV-curable or thermosetting resin.

For the material to form the optical film of the invention, a thermoplastic norbornene-type resin is also preferably used. The thermoplastic norbornene-type resin includes ZEONEX and ZEONOA by Nippon Zeon, and ARTON by JSR.

For the material to form the optical film of the invention, also preferred is a cellulose-type polymer (hereinafter this is referred to as cellulose acylate) that has heretofore been used as a transparent protective film for polarizing plates. As a typical example of cellulose acylate, triacetyl cellulose is exemplified. The cellulose acylate is described in detail hereinunder.

[Raw Material Cellulose for Cellulose Acylate]

The raw material cellulose for cellulose acylate used in optical film of the invention includes cotton linter, wood pulp (hardwood pulp, softwood pulp). Any and every type of cellulose acylate obtainable from any and every type of such raw material cellulose is usable herein. As the case may be, they may be mixed for use herein. The raw material cellulose is described in detail, for example, in Maruzawa & Uda, Plastic Material Lecture (17) Cellulosic Resin, by Nikkan Kogyo Shinbun (1970); and Hatsumei Kyokai, Disclosure Bulletin No. 2001-1745 (pp. 7-8). Celluloses described in these may be used for the optical film of the present invention.

(Degree of Cellulose Acylate Substitution)

Cellulose acylate is prepared by acylating the hydroxyl group of cellulose, and the substituent for it may be any acyl group having from 2 to 22 carbon atoms including an acyl group having 2 carbon atoms. The degree of substitution of the hydroxyl group of cellulose to give cellulose acylate is not specifically defined, but is preferably from 2.50 to 3.00, more preferably from 2.75 to 3.00, even more preferably from 2.85 to 3.00.

The degree of substitution of the hydroxyl group of cellulose may be determined by measuring the degree of bonding of acetic acid and/or other fatty acids having from 3 to 22 carbon atoms to the hydroxyl group of cellulose for substitution, followed by computing the resulting data to give the intended degree of substitution. The degree of bonding may be measured according to ASTM D-817-91.

Of acetic acid and/or fatty acids having from 3 to 22 carbon atoms that substitute for the hydroxyl group in cellulose, the acyl group having from 2 to 22 carbon atoms may be any of aliphatic group or aromatic group, and are not specifically defined. It may be a single group or may be a mixture of two or more different groups. They are, for example, cellulose alkylcarbonyl esters, alkenylcarbonyl esters, aromatic carbonyl esters or aromatic alkylcarbonyl esters, which may be further substituted. Preferred examples of the acyl group of the type are acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl groups. Of those, preferred are acetyl, propionyl, butanoyl, dodecanoyl, octadecanoyl, t-butanoyl, oleoyl, benzoyl, naphthylcarbonyl and cinnamoyl groups; and more preferred are acetyl, propionyl and butanoyl groups.

Of the above-mentioned acyl substituents that substitute for the hydroxyl group in cellulose, at least two of substantially acetyl group/propionyl group/butanoyl group may lower the optical anisotropy of the cellulose acylate when the total degree of substitution with them is from 2.50 to 3.00. More preferably, the degree of acyl substitution is from 2.60 to 3.00, even more preferably from 2.65 to 3.00.

[Degree of Polymerization of Cellulose Acylate]

Regarding the degree of polymerization of the cellulose acylate, it is desirable that the viscosity-average degree of polymerization of the cellulose acylate is from 180 to 700, when using cellulose acetate, more preferably from 180 to 550, even more preferably from 180 to 400, still more preferably from 180 to 350. If the degree of polymerization thereof is too high, then the viscosity of the dope solution of cellulose acylate may be too high, and film formation by casting may be difficult. If the degree of polymerization is too low, then the strength of the film formed may be low. The mean degree of polymerization may be determined according to an Uda et all's limiting viscosity method (Kazuo Uda & Hideo Saito, the Journal of Fiber Society of Japan, Vol. 18, No. 1, pp. 105-120, 1962). This is described in detail in JP-A 9-95538.

Cellulose acylate especially favorable for the optical film of the invention has an acyl substituent of substantially an acetyl group alone, and it is a cellulose acylate having a mean degree of polymerization of from 180 to 550. Using the cellulose acylate of the type may further lower the optical anisotropy of the optical film formed of it.

The molecular weight distribution of cellulose acylate may be determined through gel permeation chromatography, and its polydispersiveness index, Mw/Mn (where Mw indicates a mass-average molecular weight, and Mn indicates a number-average molecular weight) is preferably from 1.0 to 5.0, more preferably from 1.5 to 4.0, most preferably from 2.0 to 3.5.

Cellulose acylate in which the amount of a low-molecular-weight component is small has a high molecular weight (high degree of polymerization) but its viscosity is lower than that of ordinary cellulose acylate. Therefore, the cellulose acylate of the type is more favorable for use herein. Cellulose acylate where the amount of a low-molecular-weight component is small may be obtained by removing the low-molecular-weight component from cellulose acylate produced in an ordinary method. For removing the low-molecular-weight component from it, cellulose acylate may be washed with a suitable organic solvent. When cellulose acylate where the amount of a low-molecular-weight component is small is produced, it is desirable that the amount of the catalyst sulfuric acid for use in oxidation reaction is controlled to be from 0.5 to 25 parts by mass relative to 100 parts by mass of the starting cellulose. When the amount of the catalyst sulfuric acid is defined to fall within the range as above, then cellulose acylate that is favorable in point of the molecular weight distribution thereof (in that it has a uniform molecular weight distribution) may be produced.

Preferably, the water content of the cellulose acylate for use herein is at most 2% by mass, more preferably at most 1% by mass, even more preferably at most 0.7% by mass. Ordinary cellulose acylate generally contains water and its water content is known to be from 2.5 to 5% by mass. Therefore, in order that the cellulose acylate for use in the invention is made to have a water content falling within the range as above, the cellulose acylate is preferably dried. The drying method for it is not specifically defined, so far as the dried cellulose acylate may have the intended water content.

A method for producing the cellulose acylate mentioned above is described in detail in Hatsumei Kyokai, Disclosure Bulletin No. 2001-1745 (issued Mar. 15, 2001, by Hatsumei Kyokai), pp. 7-12.

The type of substituent, the degree of substitution, the degree of polymerization and the molecular weight distribution of the cellulose acylate for use in the invention may fall within the ranges as above, and one or more such cellulose acylates may be used herein either singly or as combined.

(Wavelength-Dependent Anisotropy Distribution Improver)

It is desirable that the wavelength dependency of Re and Rth of the optical film of the invention is small, or that is, the wavelength-dependent anisotropy distribution of the film is as small as possible. For reducing the wavelength-dependent anisotropy distribution of the film in the invention, it is effective to add a wavelength-dependent anisotropy distribution-reducing compound (hereinafter this is referred to as "wavelength-dependent anisotropy distribution improver) to the optical film of the invention.

Preferably, the wavelength-dependent anisotropy distribution improver is a compound capable of lowering the wavelength-dependent distribution of Rth of the following formula (c), $\Delta Rth = |Rth_{(400)} - Rth_{(700)}|$, and it is desirable that the optical film of the invention contains at least one such compound within a range that satisfies the following formulae (d) and (e):

$$\Delta Rth = |Rth_{(400)} - Rth_{(700)}|, \tag{c}$$

$$(\Delta Rth(B) - dRth(0))/B \leq -2.0, \tag{d}$$

$$0.01 \leq B \leq 30. \tag{d}$$

In these formulae, $\Delta Rth(B)$ means $\Delta Rth$ (nm) of the film that contains B % of a compound of reducing the wavelength-dependent anisotropy distribution of Rth; $\Delta Rth(0)$ means $\Delta Rth$ (nm) of the film not containing a compound of reducing the wavelength-dependent anisotropy distribution of Rth; B means the mass (%) of the compound relative to the solid content mass, 100, of the polymer.

Preferably, the formulae (c) and (d) are as follows:

$$(\Delta Rth(B) - \Delta Rth(0))/B \leq -3.0, \tag{c1}$$

$$0.05 \leq B \leq 25, \tag{d1}$$

more preferably, $$(\Delta Rth(B) - \Delta Rth(0))/B \leq -4.0, \tag{c2}$$

$$0.1 \leq B \leq 20. \tag{d2}$$

More preferably, the wavelength-dependent anisotropy distribution improver is a compound having an absorption in a UV region of from 200 to 400 nm and capable of reducing $\Delta Re = |Re_{(400)} - Re_{(700)}|$ and $\Delta Rth = |Rth_{(400)} - Rth_{(700)}|$ of the film. Containing at least one such compound, the wavelength-dependent anisotropy distribution of Re and Rth of the optical film of the invention may be more effectively controlled.

Regarding Re and Rth of an optical film, the wavelength-dependent distribution of the values Re and Rth is generally larger within a long wavelength range than that within a short wavelength range. Accordingly, it is desired to make the wavelength-dependent anisotropy distribution of Re and Rth of the optical film by increasing the values Re and Rth thereof within a short wavelength range. On the other hand, a compound having an absorption within a UV region of from 200 to 400 nm has a wavelength-dependent anisotropy distribution characteristic in that its absorbance within a short wavelength range is larger than that within a long wavelength range. When a compound of the type itself exists isotropically inside an optical film, then it may be considered that the birefringence of the compound itself, and therefore the wavelength-dependent anisotropy distribution of Re and Rth of the optical film may be larger within a short wavelength range like the wavelength-dependent distribution of the absorbance of the compound.

Accordingly, when a compound that has an absorption within a UV region of from 200 to 400 nm and that may have a larger wavelength-dependent anisotropy distribution of Re and Rth by itself, as so mentioned hereinabove, is used in an optical film, then the wavelength-dependent anisotropy distribution of Re and Rth of the optical film may be thereby reduced. For this, the wavelength-dependent anisotropy distribution-reducing compound must be sufficiently uniformly miscible with the polymer solid content to form the film. The absorption zone range in a UV region of the compound is preferably from 200 to 400 nm, but more preferably from 220 to 395 nm, even more preferably from 240 to 390 nm.

In recent liquid-crystal display devices for televisions, notebook-size personal computers and mobile display terminals, the optical members are required to have a high transmittance in order that the display devices can have a high brightness at a smaller power. In this point, when a wavelength-dependent anisotropy distribution improver is added to the optical film, it is desirable that the improver to be added thereto has a high spectral transmittance. Preferably, the spectral transmittance of the wavelength-dependent anisotropy distribution improver for use in the invention is from 45% to 95% at a wavelength of 380 nm, and is more preferably at most 10% at a wavelength of 350 nm.

It is desirable that the wavelength-dependent anisotropy distribution improver for use herein does not evaporate away in the step of dope casting and drying in producing the optical film of the invention. Concretely, for it, the improver preferably has a molecular weight of from 250 to 1000, more preferably from 260 to 800, even more preferably from 270 to 800, still more preferably from 300 to 800. Having a molecular weight that falls within the range, the improver may have a specific monomer structure or may have an oligomer structure or a polymer structure that comprises plural monomer units bonding to each other.

It is desirable that the amount of the wavelength-dependent anisotropy distribution improver preferable for use in the invention is from 0.01 to 30% by mass of the film-constituting polymer, more preferably from 0.1 to 20% by mass, even more preferably from 0.2 to 10% by mass.

One or more different types of such wavelength-dependent anisotropy distribution improvers may be used herein either singly or as combined.

Specific examples of the wavelength-dependent anisotropy distribution improver preferred for use in the invention are benzotriazole compounds, benzophenone compounds, cyano group-containing compounds, oxybenzophenone compounds, salicylate compounds and nickel complex salt compounds, to which, however, the invention should not be limited.

Preferred examples of benzotriazole compounds for use as the wavelength-dependent anisotropy distribution improver in the invention are those of the following formula (101):

wherein $Q^1$ represents a nitrogen-containing aromatic hetero ring; and $Q^2$ represents an aromatic ring.

$Q^1$ is a nitrogen-containing aromatic hetero ring, preferably a 5- to 7-membered nitrogen-containing aromatic hetero ring, more preferably a 5- or 6-membered nitrogen-containing aromatic hetero ring, including, for example, imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthoxazole, azabenzimidazole, purine, pyridine, pyrazine, pyrimidine, pyridazine, triazine, triazaindene, tetrazaindene. More preferably, $Q^1$ is a 5-membered nitrogen-containing aromatic hetero ring, concretely including imidazole, pyrazole, triazole, tetrazole, thiazole, oxazole, benzotriazole, benzothiazole, benzoxazole, thiadiazole, oxadiazole, and is especially preferably benzotriazole.

The nitrogen-containing aromatic hetero ring for $Q^1$ is may have a substituent. For the substituent, the substituents T mentioned below are applicable. Plural substituents, if any, may be condensed to form a condensed ring.

Not specifically defined, the aromatic ring for $Q^2$ may be an aromatic hydrocarbon ring or an aromatic hetero ring, but is preferably an aromatic hydrocarbon ring. It may be a monocyclic ring, or may form a condensed ring along with any other ring.

The aromatic hydrocarbon ring is preferably a monocyclic or bicyclic aromatic hydrocarbon ring having from 6 to 30 carbon atoms (e.g., benzene ring, naphthalene ring), more preferably having from 6 to 20 carbon atoms, even more preferably from 6 to 12 carbon atoms, still more preferably a naphthalene ring or a benzene ring, most preferably a benzene ring.

Not specifically defined, the aromatic hetero ring is preferably an aromatic hetero ring containing a nitrogen atom or a sulfur atom. Specific examples of the aromatic hetero ring are thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. Of those, preferred are pyridine, triazine, quinoline.

$Q^2$ may have a substituent. For the substituent, preferred are the substituents T mentioned below.

The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom., e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

Of the compounds of formula (101), preferred are those of the following formula (101-A):

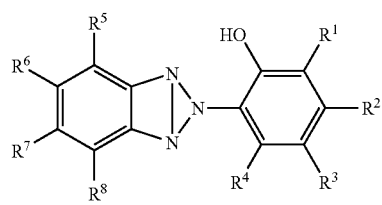

Formula (101-A)

wherein $R^1$, $R^2$, $R^3$, $R^4$, $R^5$, $R^6$, $R^7$ and $R^8$ each independently represents a hydrogen atom or a substituent.

$R^1$, $R^2$, $R^3$, $R^4$, $R^5$, $R^6$, $R^7$ and $R^8$ each independently represents a hydrogen atom or a substituent. For the substituent, referred to are the substituents T mentioned above. These substituents may have any other substituent. The substituents may be condensed to form a condensed cyclic structure.

$R^1$ and $R^3$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably an alkyl group having from 1 to 12 carbon atoms (preferably having from 4 to 12 carbon atoms).

$R^2$ and $R^4$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^5$ and $R^8$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^6$ and $R^7$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom or a halogen atom; still more preferably a hydrogen atom or a chlorine atom.

Of the compounds of formula (101), more preferred are those of the following formula (101-B):

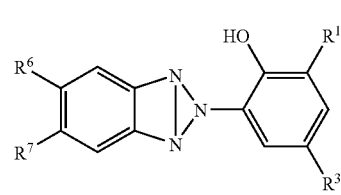

Formula (101-B)

wherein $R^1$, $R^3$, $R^6$ and $R^7$ have the same meanings as those in formula (101-A), and their preferred ranges are also the same as those therein.

Specific examples of the compounds of formula (101) are mentioned below, to which, however, the invention should not be limited.

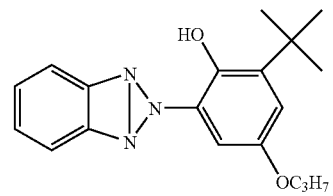

UV-1

UV-2 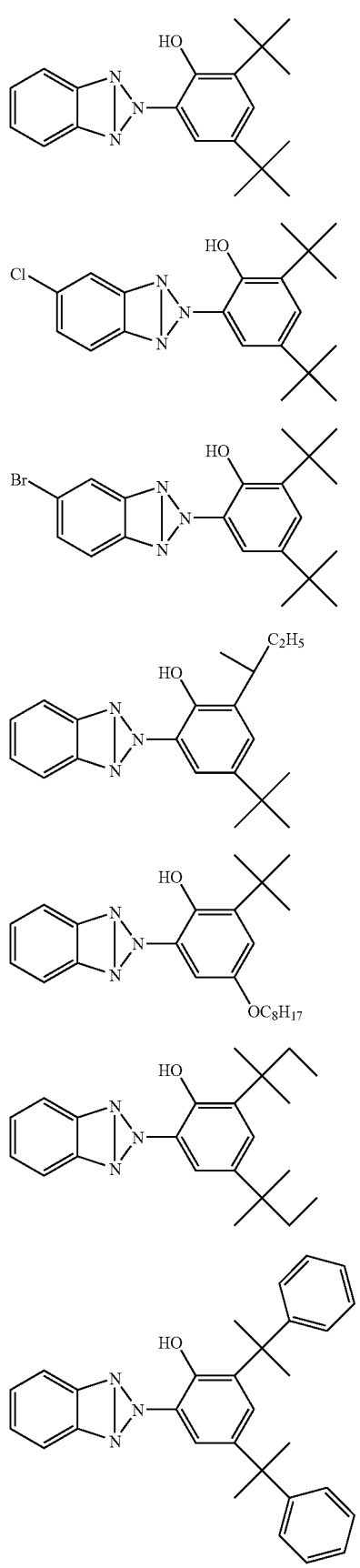 UV-3 UV-4 UV-5 UV-6 UV-7 UV-8
UV-9 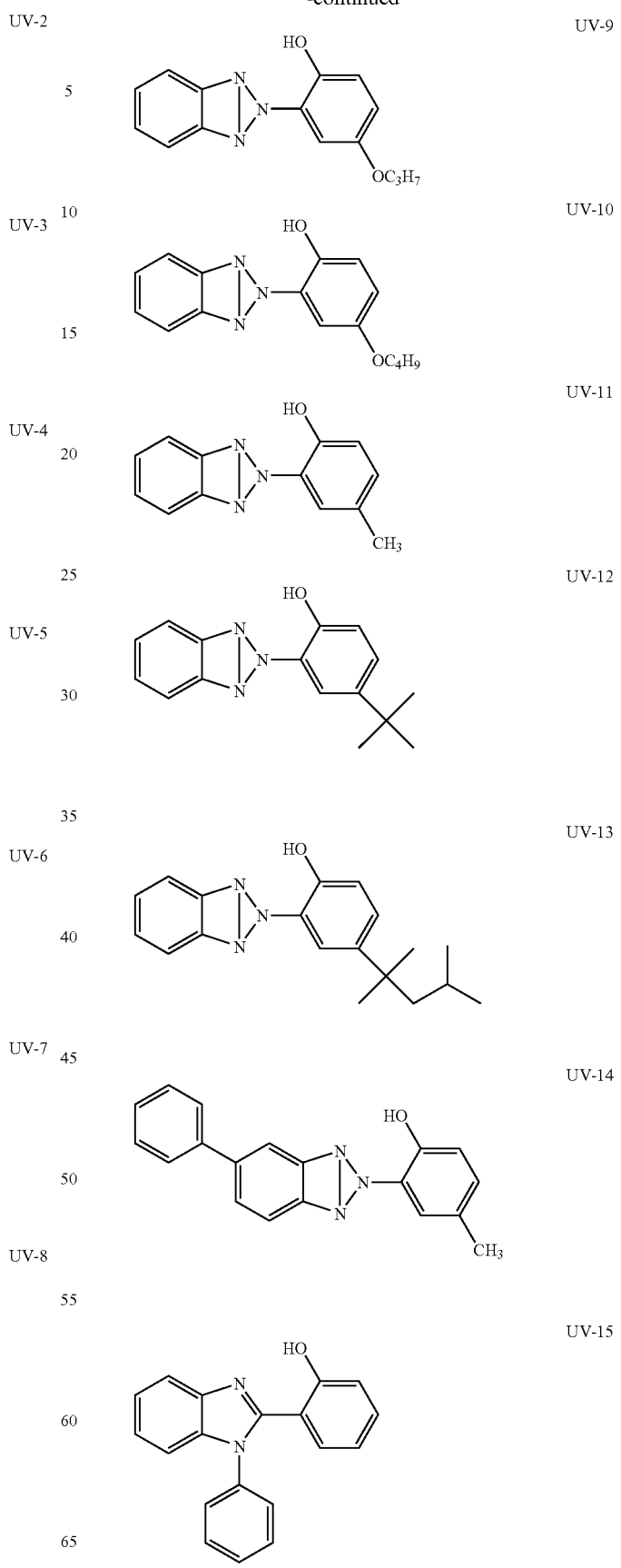 UV-10 UV-11 UV-12 UV-13 UV-14 UV-15

-continued

UV-16
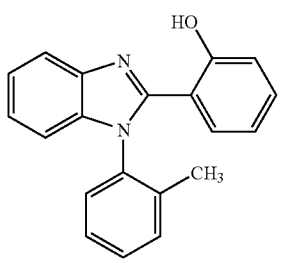

UV-17
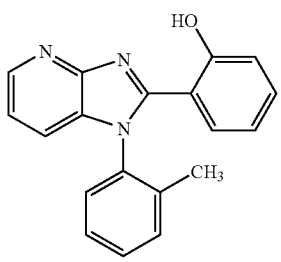

UV-18
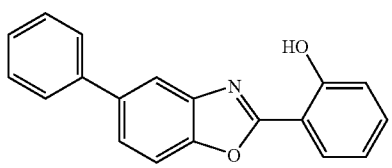

UV-19
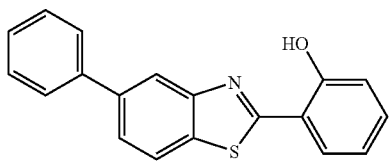

UV-20
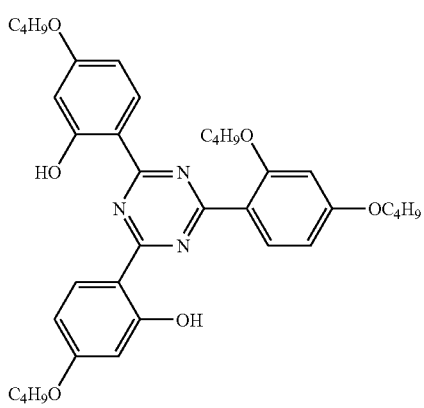

UV-21
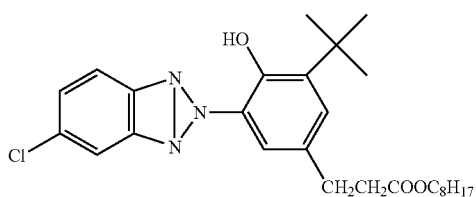

-continued

UV-22
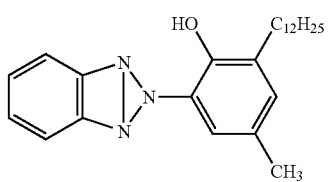

UV-23
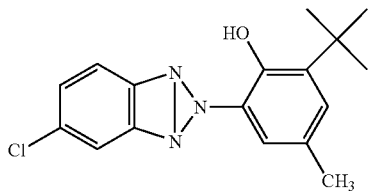

Of the benzotriazole compounds mentioned hereinabove, those having a molecular weight of not smaller than 320 are preferred. We, the present inventors have confirmed that the compounds of the type are advantageous in point of their retentiveness in cellulose acylate films formed with them.

Preferred examples of benzophenone compounds for use as the wavelength-dependent anisotropy distribution improver in the invention are those of the following Formula (102):

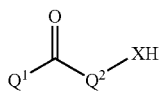
Formula (102)

wherein $Q^1$ and $Q^2$ each independently represents an aromatic ring; X represents NR (where R represents a hydrogen atom or a substituent), an oxygen atom or a sulfur atom.

The aromatic ring for $Q^1$ and $Q^2$ may be an aromatic hydrocarbon ring or an aromatic hetero ring. It may be a single ring or may form a condensed ring with any other ring.

The aromatic hydrocarbon ring for $Q^1$ and $Q^2$ is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably from 6 to 12 carbon atoms. Still more preferably, it is a benzene ring.

The aromatic hetero ring for $Q^1$ and $Q^2$ is preferably an aromatic hetero ring that contains at least any one of an oxygen atom, a nitrogen atom or a sulfur atom. Examples of the hetero-ring are furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. The aromatic hetero-ring is preferably pyridine, triazine or quinoline.

The aromatic ring for $Q^1$ and $Q^2$ is preferably an aromatic hydrocarbon ring, more preferably an aromatic hydrocarbon ring having from 6 to 10 carbon atoms, still more preferably a substituted or unsubstituted benzene ring.

$Q^1$ and $Q^2$ may have a substituent, for which preferred are the substituents T mentioned below. However, the substituent does not include a carboxylic acid, a sulfonic acid and a quaternary ammonium salt. If possible, the substituents may bond to each other to form a cyclic structure.

X represents NR (where R represents a hydrogen atom or a substituent, and the above-mentioned substituent group T may apply to the substituent), or an oxygen atom or a sulfur atom. When X is NR, then R is preferably an acyl group or a sulfonyl group, and these substituents may be further substituted. X is preferably NR or an oxygen atom, more preferably an oxygen atom.

The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom., e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

Of the compounds of formula (102), preferred are those of the following formula (102-A):

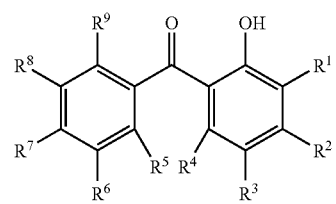

Formula (102-A)

wherein $R^1$, $R^2$, $R^3$, $R^4$, $R^5$, $R^6$, $R^7$, $R^8$ and $R^9$ each independently represents a hydrogen atom or a substituent.

$R^1$, $R^2$, $R^3$, $R^4$, $R^5$, $R^6$, $R^7$, $R^8$ and $R^9$ each independently represents a hydrogen atom or a substituent. For the substituent, referred to are the substituents T mentioned above. These substituents may have any other substituent. The substituents may be condensed to form a condensed cyclic structure.

$R^1$, $R^3$, $R^4$, $R^5$, $R^6$, $R^8$ and $R^9$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^2$ is preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms, or a hydroxyl group; even more preferably an alkoxy group having from 1 to 20 carbon atoms; still more preferably an alkoxy group having from 1 to 12 carbon atoms.

$R^7$ is preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms, or a hydroxyl group; even more preferably a hydrogen atom, or an alkoxy group having from 1 to 20 carbon atoms (preferably having from 1 to 12 carbon atoms, more preferably having from 1 to 8 carbon atoms, still more preferably a methyl group); especially preferably a methyl group or a hydrogen atom.

Of the compounds of formula (102), more preferred are those of the following formula (102-B):

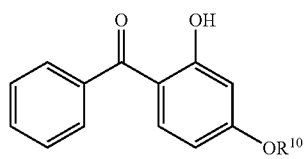

Formula (102-B)

wherein $R^{10}$ represents a hydrogen atom, a substituted or unsubstituted alkyl group, a substituted or unsubstituted alkenyl group, a substituted or unsubstituted alkynyl group, or a substituted or unsubstituted aryl group.

$R^{10}$ is a hydrogen atom, a substituted or unsubstituted alkyl group, a substituted or unsubstituted alkenyl group, a substituted or unsubstituted alkynyl group, or a substituted or unsubstituted aryl group. For the substituent, referred to are the substituents T mentioned above.

$R^{10}$ is preferably a substituted or unsubstituted alkyl group, more preferably a substituted or unsubstituted alkyl group having from 5 to 20 carbon atoms, even more preferably a substituted or unsubstituted alkyl group having from 5 to 12 carbon atoms (e.g., n-hexyl group, 2-ethylhexyl group, n-octyl group, n-decyl group, n-dodecyl group, benzyl group), still more preferably a substituted or unsubstituted alkyl group having from 6 to 12 carbon atoms (e.g., 2-ethylhexyl group, n-octyl group, n-decyl group, n-dodecyl group, benzyl group).

The compounds of formula (102) may be produced according to a known method such as that described in JP-A 11-12219.

Specific examples of the compounds of formula (102) are mentioned below, to which, however, the invention should not be limited.

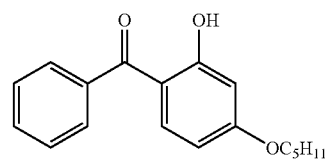
UV-101

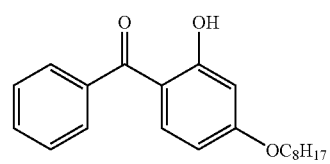
UV-102

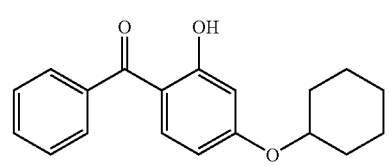
UV-103

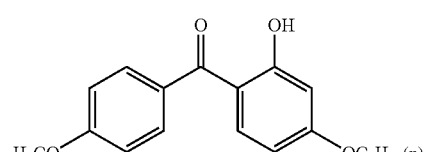
UV-104

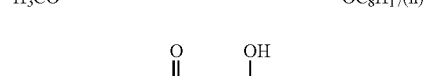
UV-105

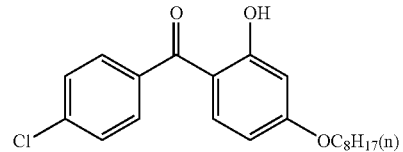
UV-106

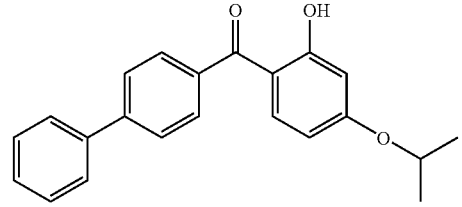
UV-107

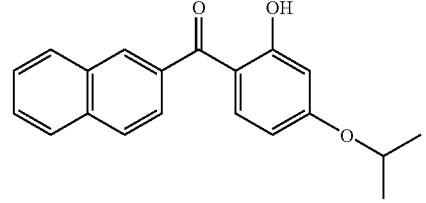
UV-108

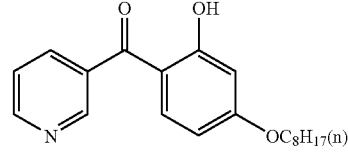
UV-109

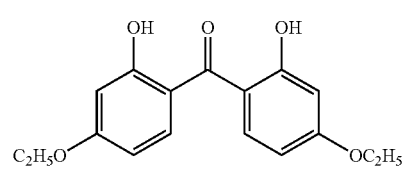

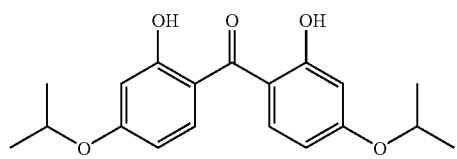
UV-110

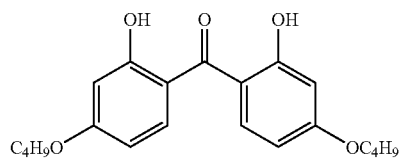
UV-111

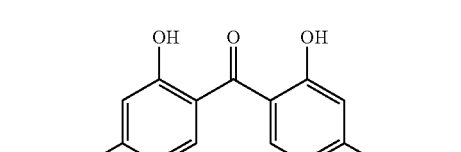
UV-112

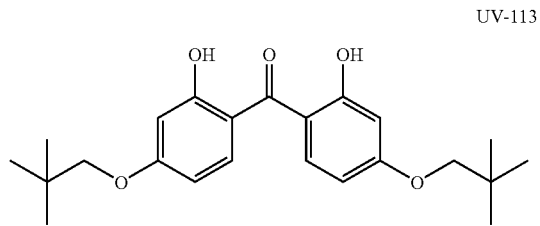
UV-113

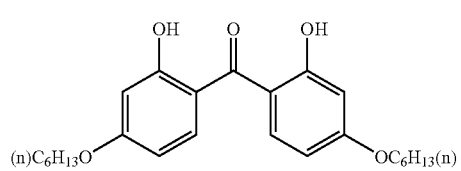
UV-114

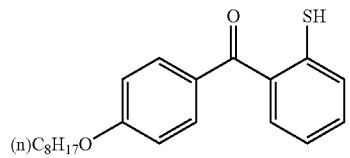
UV-115

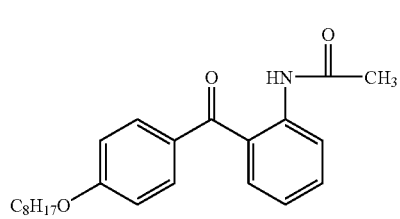
UV-116

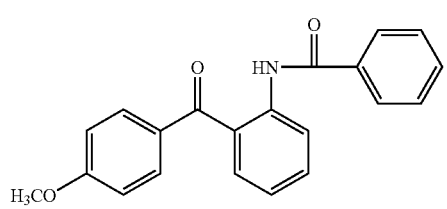
UV-117

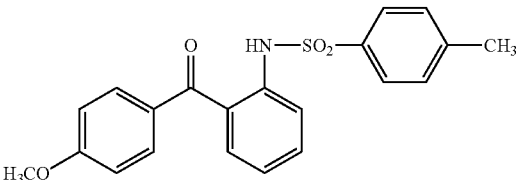
UV-118

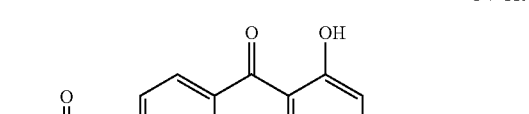
UV-119

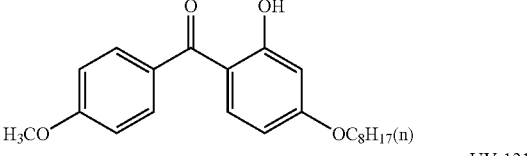
UV-120

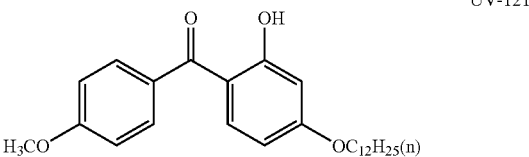
UV-120

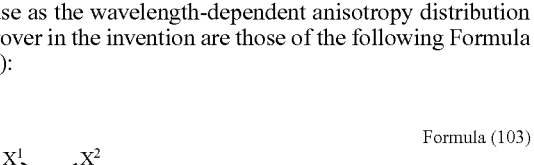
UV-121

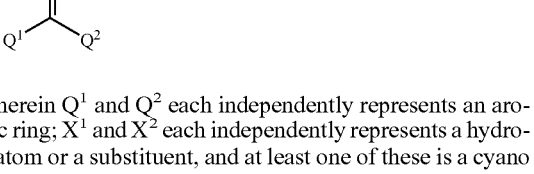

Preferred examples of cyano group-containing compounds for use as the wavelength-dependent anisotropy distribution improver in the invention are those of the following Formula (103):

Formula (103)

wherein $Q^1$ and $Q^2$ each independently represents an aromatic ring; $X^1$ and $X^2$ each independently represents a hydrogen atom or a substituent, and at least one of these is a cyano group.

The aromatic ring for $Q^1$ and $Q^2$ may be an aromatic hydrocarbon ring or an aromatic hetero ring, and it may be a single ring or may form a condensed ring with any other ring.

The aromatic hydrocarbon ring is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably from 6 to 12 carbon atoms. Still more preferably, it is a benzene ring.

The aromatic hetero-ring is preferably one that contains a nitrogen atom or a sulfur atom as a hetero atom. Examples of the hetero-ring are thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. The aromatic hetero-ring is preferably pyridine, triazine or quinoline.

The aromatic ring for $Q^1$ and $Q^2$ is preferably an aromatic hydrocarbon ring, more preferably a benzene ring.

$Q^1$ and $Q^2$ may have a substituent, for which referred to are the substituents T mentioned below. The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom., e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

$X^1$ and $X^2$ each represent a hydrogen atom or a substituent, and at least either one of these represents a cyano group. The above-mentioned substituent group T may apply to the substituent for $X^1$ and $X^2$. The substituent of $X^1$ and $X^2$ may be substituted with any other substituent, and $X^1$ and $X^2$ may be condensed to form a cyclic structure.

$X^1$ and $X^2$ are preferably a hydrogen atom, an aryl group, a cyano group, a nitro group, a carbonyl group, a sulfonyl group or an aromatic hetero ring; more preferably a cyano group, a carbonyl group, a sulfonyl group or an aromatic hetero ring; even more preferably a cyano group or a carbonyl group; still more preferably a cyano group, or an alkoxycarbonyl group (—C(=O)OR where R represents an alkyl group having from 1 to 20 carbon atoms, an aryl group having from 6 to 12 carbon atoms or their combination).

Of the compounds of formula (103), preferred are those of the following formula (103-A):

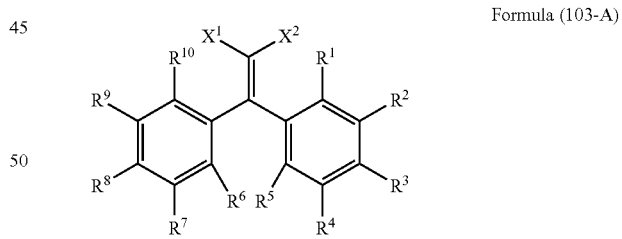

Formula (103-A)

wherein $R^1$, $R^2$, $R^3$, $R^4$, $R^5$, $R^6$, $R^7$, $R^8$, $R^9$ and $R^{10}$ each independently represents a hydrogen atom or a substituent; $X^1$ and $X^2$ have the same meanings as those in formula (103), and their preferred ranges are also the same as those therein.

$R^1$, $R^2$, $R^3$, $R^4$, $R^5$, $R^6$, $R^7$, $R^8$, $R^9$ and $R^{10}$ each independently represents a hydrogen atom or a substituent. For the substituent, referred to are the substituents T mentioned above. These substituents may have any other substituent. The substituents may be condensed to form a condensed cyclic structure.

$R^1$, $R^2$, $R^4$, $R^5$, $R^6$, $R^7$, $R^9$ and $R^{10}$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^3$ and $R^8$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms, or a hydroxyl group; even more preferably a hydrogen atom, or an alkoxy group having from 1 to 12 carbon atoms; still more preferably an alkoxy group having from 1 to 12 carbon atoms; further preferably a hydrogen atom.

Of the compounds of formula (103), more preferred are those of the following formula (103-B):

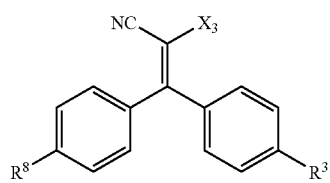

Formula (103-B)

wherein $R^3$ and $R^8$ have the same meanings as those in formula (103-A), and their preferred ranges are also the same as therein; $X^3$ represents a hydrogen atom or a substituent.

$X^3$ represents a hydrogen atom or a substituent. For the substituent, referred to are the substituents T mentioned above. If possible, the substituent may be further substituted with any other substituent. $X^3$ is preferably a hydrogen atom, an alkyl group, an aryl group, a cyano group, a nitro group, a carbonyl group, a sulfonyl group or an aromatic hetero ring; more preferably a cyano group, a carbonyl group, a sulfonyl group or an aromatic hetero ring; even more preferably a cyano group or a carbonyl group; still more preferably a cyano group or an alkoxycarbonyl group (—C(=O)OR where R is an alkyl group having from 1 to 20 carbon atoms, an aryl group having from 6 to 12 carbon atoms or their combination).

Of the compounds of formula (103), even more preferred are those of the following formula (103-C):

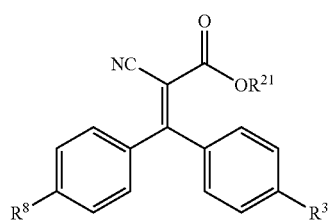

Formula (103-C)

wherein $R^3$ and $R^8$ have the same meanings as those in formula (103-A), and their preferred ranges are also the same as therein; $R^{21}$ represents an alkyl group having from 1 to 20 carbon atoms.

When $R^3$ and $R^8$ are both hydrogen atoms, then $R^{21}$ is preferably an alkyl group having from 2 to 12 carbon atoms, more preferably an alkyl group having from 4 to 12 carbon atoms, even more preferably an alkyl group having from 6 to 12 carbon atoms, still more preferably an n-octyl group, a tert-octyl group, a 2-ethylhexyl group, an n-decyl group or an n-dodecyl group; most preferably a 2-ethylhexyl group.

When $R^3$ and $R^8$ are not hydrogen atoms, then $R^{21}$ is preferably an alkyl group having at most 20 carbon atoms with which the molecular weight of the compound of formula (103-C) could be at least 300.

The compounds of formula (103) for use in the invention can be produced according to the method described in *Journal of American Chemical Society*, Vol. 63, p. 3452 (1941).

Specific examples of the compounds of formula (103) are mentioned below, to which, however, the invention should not be limited.

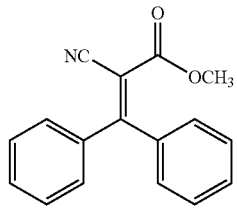

UV-201

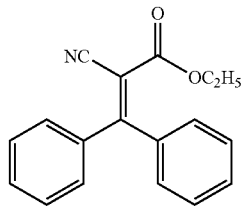

UV-202

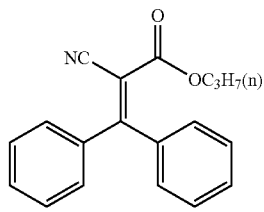

UV-203

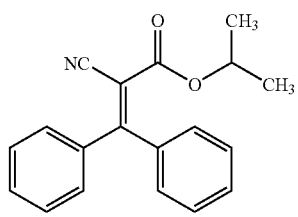

UV-204

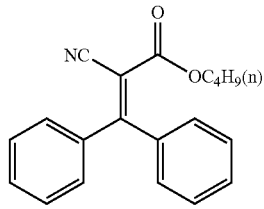

UV-205

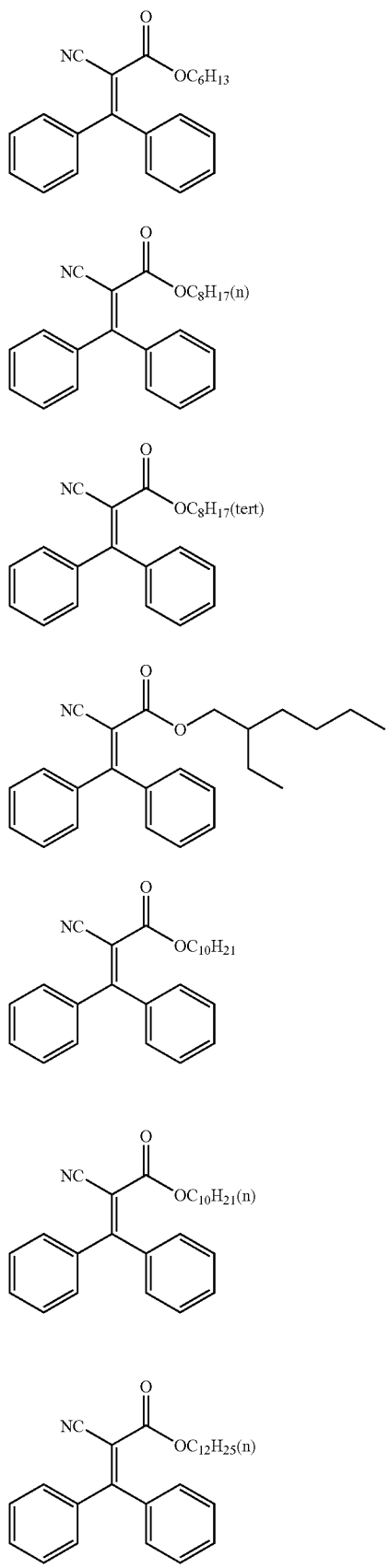
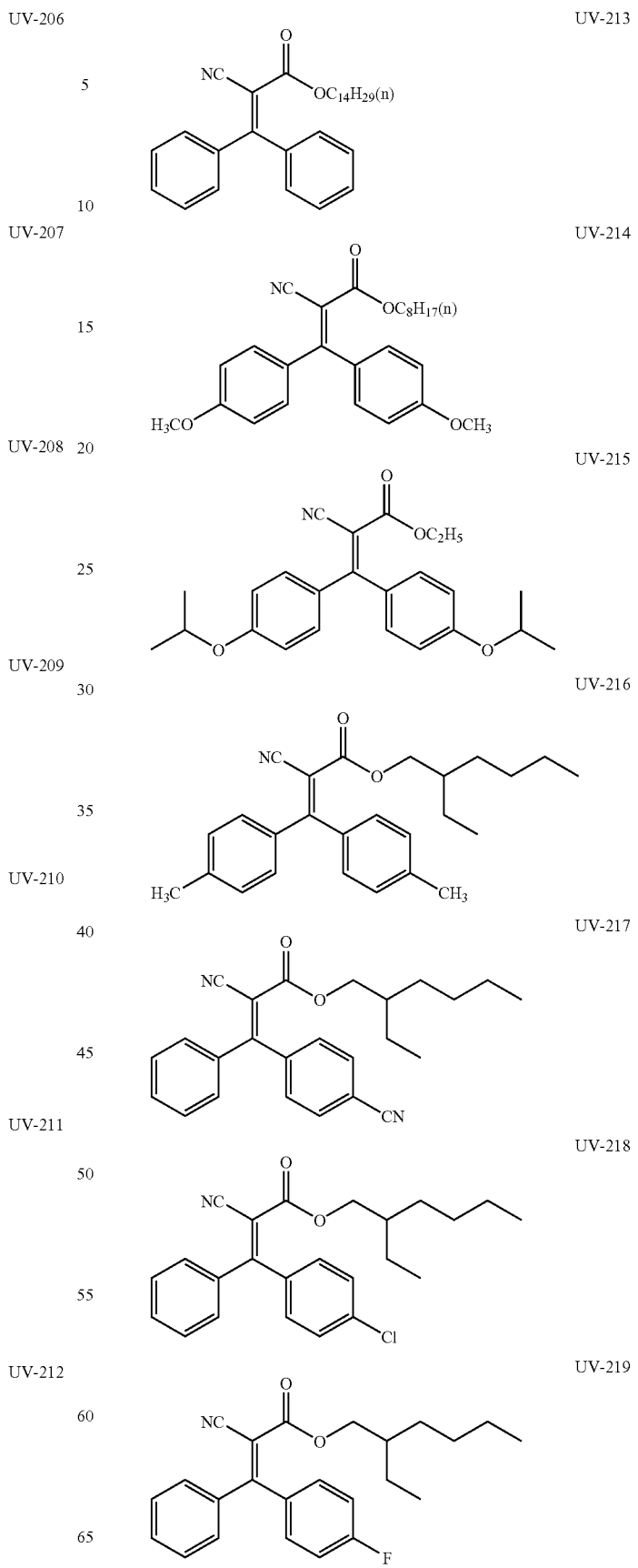

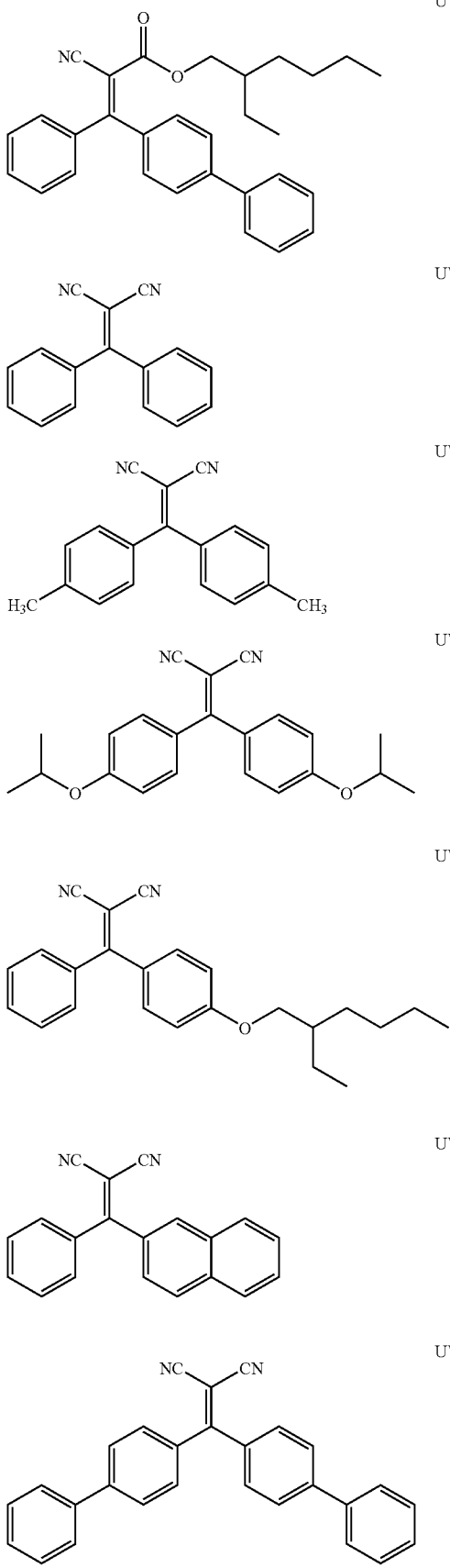
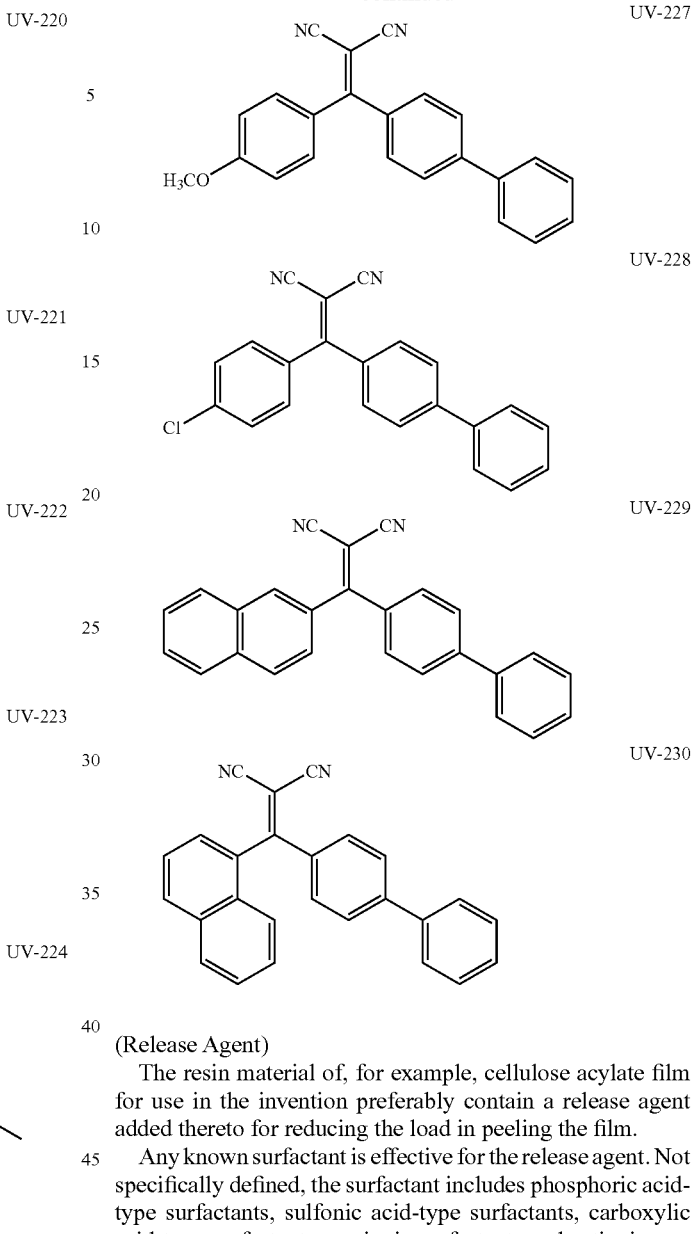

(Release Agent)

The resin material of, for example, cellulose acylate film for use in the invention preferably contain a release agent added thereto for reducing the load in peeling the film.

Any known surfactant is effective for the release agent. Not specifically defined, the surfactant includes phosphoric acid-type surfactants, sulfonic acid-type surfactants, carboxylic acid-type surfactants, nonionic surfactants and cationic surfactants. Examples of the surfactants usable herein are described in, for example, JP-A 61-243837.

Regarding the release agent, JP-A 2003-055501 describes a cellulose acylate solution dissolved in a non-chlorine solvent and containing an additive selected from polybasic acid partial esters, alkali metal salts and alkaline earth metal salts having an acid dissociation constant pKA of from 1.93 to 4.5, in which the cellulose acylate solution is prevented from being cloudy and is improved in point of its releasability in production and of its film surface condition.

Regarding other additives, JP-A 2003-128838 describes a cellulose acylate dope solution that contains at least one crosslinking agent having at least two groups capable of reacting with an active hydrogen, in an amount of from 0.1 to 10% by mass of the cellulose acylate therein, in which the additive is for improving the releasability, the surface condition and the film strength of the film formed of the dope solution.

JP-A 2003-165868 proposes a film that contains an additive and has good moisture permeability and dimensional stability.

In the invention, the release agents described in the above-mentioned patent publications may be used.

[Mat Agent Particles]

The optical film in the invention preferably contains particles serving as a mat agent. The particles for use herein include silicon dioxide, titanium dioxide, aluminium oxide, zirconium oxide, calcium carbonate, talc, clay, calcined kaolin, calcined calcium silicate, calcium silicate hydrate, aluminium silicate, magnesium silicate and calcium phosphate. The particles are preferably silicon-having ones as the haze of the films containing them may be low. Especially preferred is silicon dioxide. Particles of silicon dioxide for use herein preferably have a primary mean particle size of at most 20 nm and have an apparent specific gravity of at least 70 g/liter. More preferred are particles having a small primary mean particle size of from 5 to 16 nm, since the haze of the films containing them is lower. The apparent specific gravity is more preferably from 90 to 200 g/liter, even more preferably from 100 to 200 g/liter. Particles having a larger apparent specific gravity may give a dispersion having a higher concentration, and are therefore preferable since the haze of the films containing them could be lower and since the solid deposits in the film may be reduced.

The particles generally form secondary particles having a mean particle size of from 0.1 to 3.0 μm, and in the film, they exist as aggregates of primary particles, therefore forming protrusions having a size of from 0.1 to 3.0 μm in the film surface. Preferably, the secondary mean particle size is from 0.2 μm to 1.5 μm, more preferably from 0.4 μm to 1.2 most preferably from 0.6 μm to 1.1 μm. The primary and secondary particle sizes are determined as follows: The particles in a film are observed with a scanning electromicroscope, and the diameter of the circle that is circumscribed around the particle is referred to as the particle size. 200 particles are observed at random in different sites, and their data are averaged to give the mean particle size thereof.

For silicon dioxide particles, herein usable are commercial products of Aerosil R972, R972V, R974, R812, 200, 200V, 300, R202, OX50, TT600 (all by Nippon Aerosil). Zirconium oxide particles are also commercially available, for example, as Aerosil R976 and R811 (both by Nippon Aerosil), and are usable herein.

Of those, Aerosil 200V and Aerosil R972V are silicon dioxide particles having a primary mean particle size of at most 20 nm and having an apparent specific gravity of at least 70 g/liter, and these are especially preferred for use herein since they are effective for reducing the friction coefficient of optical films not increasing the haze thereof.

In the invention, for obtaining an optical film that contains particles having a small secondary mean particle size, there may be employed some methods for preparing a dispersion of particles. For example, one method for it comprises previously preparing a dispersion of particles by stirring and mixing a solvent and particles, then adding the resulting dispersion to a small amount of a cellulose acylate solution separately prepared, and thereafter further mixing it with a main cellulose acylate dope. This method is desirable since the dispersibility of silicon dioxide particles is good and since the dispersion of silicon dioxide particles prepared hardly reaggregates. Apart from it, also employable herein is a method comprising adding a small amount of a cellulose ester to a solvent, dissolving them with stirring, and fully mixing the resulting dispersion of particles with a dope in an in-line mixer. The invention should not be limited to these methods.

When silicon dioxide particles are mixed and dispersed in a solvent, the silicon dioxide concentration in the resulting dispersion is preferably from 5 to 30% by mass, more preferably from 10 to 25% by mass, most preferably from 15 to 20% by mass. Relative to the amount of the particles therein, the dispersion having a higher concentration may have a smaller haze, and is therefore favorable since the haze of the films with it may be lowered and the solid deposits may be reduced in the films. Finally, the amount of the mat agent to be in the cellulose acylate dope is preferably from 0.01 to 1.0 $g/m^2$, more preferably from 0.03 to 0.3 $g/m^2$, most preferably from 0.08 to 0.16 $g/m^2$.

The solvent may be a lower alcohol, preferably methyl alcohol, ethyl alcohol, propyl alcohol, isopropyl alcohol or butyl alcohol. The solvent usable herein except such lower alcohols is not specifically defined, for which, however, preferred are those generally used in cellulose ester film formation.

[Plasticizer, Antioxidant, Release Agent]

In addition to the optical anisotropy-lowering compound and the wavelength-dependent anisotropy dispersion improver mentioned above, the optical film of the invention may contain various additives (e.g., plasticizer, UV inhibitor, antioxidant, release agent, IR absorbent) added thereto in the process of producing it and in accordance with the use of the film. The additives may be solid or oily. In other words, they are not specifically defined in point of their melting point and boiling point. For example, UV-absorbing materials may be mixed at 20° C. or lower and at 20° C. or higher; and the same may apply to mixing plasticizers. For example, this is described in JP-A 2001-151901. Further, IR-absorbing dyes are described in, for example, JP-A 2001-194522. The time when the additives are added may be anytime in the process of preparing dopes. As the case may be, the additives may be added in the final step of the process of preparing dopes. The amount of each additive to be added is not specifically defined so far as the additive could exhibit its function. When the optical film has a multi-layer structure, then the type and the amount of the additives to be added to each layer may differ. For example, this is described in JP-A 2001-151902, and the technique is well known in the art. Its details are described in Hatsumei Kyokai's Disclosure Bulletin No. 2001-1745 (issued Mar. 15, 2001 by Hatsumei Kyokai), pp. 16-22, and the materials described therein are preferably used in the invention.

[Method of Film Formation]

The optical film of the invention may be formed in a mode of thermally melting a thermoplastic polymer resin, or may be formed from a solution prepared by uniformly dissolving a polymer (solvent-casting method). Preferably, the film is formed according to the solvent-casting method. The solvent-casting method is described below.

(Method of Film Formation in Solvent Casting]

For producing an optical film according to a solvent-casting method, a starting polymer for the film is dissolved in a suitable organic solvent to prepare a solution (dope), and the dope is cast onto a suitable substrate (preferably a metal substrate). Then, the solvent is evaporated away, and when the film has gelled, it is peeled away from the substrate, and the film is then fully dried to remove the solvent to give the intended optical film.

[Organic Solvent in Cellulose Acylate Solution]

In the invention, the cellulose acylate film is produced preferably according to a solvent-casting method, in which a cellulose acylate is dissolved in an organic solvent to prepare a solution (dope) and the dope is formed into films. The organic solvent preferably used as the main solvent in the invention is selected from esters, ketones and ethers having from 3 to 12 carbon atoms, and halogenohydrocarbons having from 1 to 7 carbon atoms. Esters, ketones and ethers for use herein may have a cyclic structure. Compounds having any two or more functional groups of esters, ketones and ethers (i.e., —O—, —CO— and —COO—) may also be used herein as the main solvent, and for example, they may have any other functional group such as alcoholic hydroxyl group. The number of the carbon atoms that constitute the main solvent having two or more functional groups may fall within the range the compound having any of those functional groups.

For the cellulose acylate film of the invention, chlorine-based halogenohydrocarbons may be used as the main solvent, or non-chlorine solvents as in Hatsumei Kyokai's Disclosure Bulletin 2001-1745 (pp. 12-16) may also be used as the main solvent. Anyhow, the main solvent is not limitative for the cellulose acylate film of the invention.

In addition, the solvents for the cellulose acylate solution and the film and also methods for dissolution therein are disclosed in the following patent publications, and these are preferred embodiments for use in the invention. For example, they are described in JP-A 2000-95876, 12-95877, 10-324774, 8-152514, 10-330538, 9-95538, 9-95557, 10-235664, 12-63534, 11-21379, 10-182853, 10-278056, 10-279702, 10-323853, 10-237186, 11-60807, 11-152342, 11-292988, 11-60752, 11-60752. These patent publications disclose not only the solvents preferred for cellulose acylate for the invention but also the physical properties of their solutions as well as the substances that may coexist along with them, and these are also preferred embodiments for use in the invention.

[Method for Producing Cellulose Acylate Film]
[Dissolution Step]

Preparing the cellulose acylate solution (dope) in the invention is not specifically defined in point of its dissolution process. It may be prepared at room temperature or may be prepared in a mode of cooling dissolution or high-temperature dissolution or in a mode of their combination. A process comprising a step of preparing the cellulose acylate solution for use in the invention and a subsequent step of concentration and filtration of the solution is described in detail in Hatsumei Kyokai's Disclosure Bulletin 2001-1745 (issued Mar. 15, 2001, by Hatsumei Kyokai), pp. 22-25, and this is preferably employed in the invention.

(Transparency of Dope Solution)

Preferably, the dope transparency of the cellulose acylate solution in the invention is at least 85%, more preferably at least 88%, even more preferably at least 90%. We, the present inventors have confirmed that various additives well dissolve in the cellulose acylate dope solution in the invention. A concrete method for determining the dope transparency is described. A dope solution is put into a glass cell having a size of 1 cm$^2$, and its absorbance at 550 nm is measured with a spectrophotometer (UV-3150 by Shimadzu). The solvent alone is measured as a blank, and the transparency of the cellulose acylate solution is calculated from the ratio of the solution absorbance to the blank absorbance.

[Casting, Drying and Winding Step]

Next, a process of forming a film from the cellulose acylate solution in the invention is described. For the method and the equipment for producing the cellulose acylate film in the invention, herein employable are the solvent-casting method and the solvent-casting equipment heretofore generally used in the art for cellulose triacetate film formation. A dope (cellulose acylate solution) prepared in a dissolver (tank) is once stored in a storage tank, in which the dope is defoamed and is thus finally prepared. From the dope take-out mouth of the tank, the dope is taken out and fed into a pressure die via a metering pressure gear pump capable of feeding it with accuracy, for example, based on the revolution number thereof, and then the dope is uniformly cast onto the endlessly-running cast member of a metal support via the slit of the pressure die, and at a peel point to which the metal support makes nearly one revolution, the still wet dope film (this may be referred to as a web) is peeled from the metal support. While both ends of the thus-obtained web are clipped to ensure its width, the web is conveyed with a tenter and dried, and then further conveyed with rolls in a drier in which the web is completely dried, and thereafter this is wound up around a winder to predetermined width. The combination of the tenter and the drier with rolls may vary depending on the object of the film to be produced. When the essential applications of the optical film of the invention are for functional protective films for optical structures in electronic displays or for silver halide photographic materials, then additional coating devices may be fitted to the solvent casting apparatus for producing the film. The additional devices are for further processing the surface of the film by forming thereon a subbing layer, an antistatic layer, an antihalation layer and a protective layer. This is described in detail in Hatsumei Kyokai's Disclosure Bulletin 2001-1745 (issued Mar. 15, 2001, by Hatsumei Kyokai), pp. 25-30. It includes casting (including co-casting), metal support, drying and peeling, and these are preferably employed in the invention.

(Volatile Content)

In the invention, the volatile content is represented by the following formula. The remaining volatile content mass is determined by heating the film at 120° C. for 2 hours and then subtracting the heated film mass from the non-heated film mass.

Volatile Content=(remaining volatile content mass)/(heated film mass)×100 (%).

(Tension in Film Transportation)

In the drying step after the step of peeling the film from the substrate, the film generally tends to shrink in the cross direction (perpendicular to the machine direction) owing to the evaporation of the solvent from it. In forming the optical film of the invention, it is desirable that the film is not strongly stretched both in the machine direction and in the direction perpendicular to the machine direction. Concretely, while the film is conveyed in the machine direction, it is desirable that the strength of the tension to be applied by the film conveyor roll to the film in the machine direction thereof is from 10 to 50 kgf/m (from 98 N/m to 490 N/m). On the other hand, it is also desirable that the strength of the tension to be applied to the direction of the film perpendicular to the machine direction thereof may be the same as above. In this case, a tenter system, in which the film is held in the perpendicular direction and tenter clips are used for controlling the tension to the film, may be preferably used. For example, preferably employed is a method of drying a film with holding both sides of the film in the cross direction thereof by the use of clips entirely or partially in the drying step therein (tenter system), as in JP-A 62-46625.

[Evaluation of Physical Properties of Film]
[Optical Property Change of Film after High-Humidity Treatment]

Regarding the optical property change of the optical film of the invention in environmental change, it is desirable that Re and Rth change of the film after treated at 60° C. and 90% RH for 240 hours is at most 15 nm, more preferably at most 12 nm, even more preferably at most 10 nm.

[Optical Property Change of Film after High-Temperature Treatment]

Also preferably, the Re and Rth change of the film after treated at 80° C. for 240 hours is at most 15 nm, more preferably at most 12 nm, even more preferably at most 10 nm.

[Compound Evaporation from Film after Heat Treatment]

It is desirable that the Rth-lowering compound and the iRth-lowering compound that are favorably used in the optical film of the invention may evaporate away from the film when heated at 80° C. for 240 hours, in an amount of at most 30%, more preferably at most 25%, even more preferably at most 20%.

The compound evaporation from the heated film may be determined as follows: The film heated at 80° C. for 240 hours and the non-heated film are separately dipped in a solvent, in which the compound released from the film is detected through high-performance liquid chromatography. In terms of the peak area of the compound, the amount of the compound having remained in the film is calculated according to the following formula.

Compound Evaporation (%)={(amount of the compound remaining in the non-heated film)−(amount of the compound having remained in the heated film)}/(amount of the compound remaining in the non-heated film)×100.

[Humidity Dependency of Re and Rth of Film]

Preferably, the humidity-dependent fluctuation of the in-plane retardation Re and the thickness-direction retardation Rth of the optical film of the invention is small. Concretely, it is desirable that the absolute value of the difference between Rth at 25° C. and 10% RH and Rth at 25° C. and 80% RH, ΔRth (=Rth 10% RH−Rth 80% RH) is from 0 to 50 nm. More preferably, it is from 0 to 40 nm, even more preferably from 0 to 35 nm.

[Dimensional Change of Film]

The dimensional stability of the optical film of the invention is preferably as follows: The dimensional change of the film after stored at 60° C. and 90% RH for 24 hours (high-humidity storage), and the dimensional change of the film after stored at 90° C. and 5% RH for 24 hours (high-temperature storage) are both at most 0.5%. More preferably, the dimensional change is at most 0.3%, even more preferably at most 0.15%.

A concrete method for the measurement is described. Two samples of the optical film of the invention, having a size of 30 mm×120 mm, are prepared and conditioned at 25° C. and 65% % H for 24 hours. Using an automatic pin gauge (by Shinto Kagaku), holes of 6 mmφ are formed on both sides of the samples each at intervals of 100 mm. The original hole-to-hole distance is L0. One sample is processed at 60° C. and 90% RH for 24 hours, and then the hole-to-hole distance is measured (L1); and the other sample is processed at 90° C. and 5% RH for 24 hours, and the hole-to-hole distance is measured (L2). The minimum gauge limit in every measurement is 1/1000 mm. The dimensional change is determined as follows: Dimensional change at 60° C. and 90% RH (high-humidity storage)={|L0−L1|/L0}×100. Dimensional change at 90° C. and 5% RH (high-temperature storage)={|L0−L2|/L0}×100.

[Elastic Modulus of Film]

Preferably, the elastic modulus of the optical film in the invention is from 200 to 500 kgf/mm² (1.96 to 4.90 GPa), more preferably from 240 to 470 kgf/mm² (2.35 to 4.61 GPa), even more preferably from 270 to 440 kgf/mm² (2.65 to 4.31 GPa). A concrete method for measuring it is as follows: Using a universal tensile tester, Toyo Boldwin's STM T50BP, a sample of the film is pulled in an atmosphere of 23° C. and 70% RH at a pulling rate of 10%/min, and its stress to yield 0.5% elongation is measured. This is the elastic modulus of the sample.

[Photoelasticity Coefficient of Film]

Preferably, the photoelasticity coefficient of the optical film in the invention is at most $50 \times 10^{13}$ cm²/dyne ($5 \times 10^{-13}$ N/m²), more preferably at most $30 \times 10^{-13}$ cm²/dyne ($3 \times 10^{-13}$ N/m²), even more preferably at most $20 \times 10^{-13}$ cm²/dyne ($2 \times 10^{-13}$ N/m²). A concrete method for measuring it is as follows: A tensile stress is imparted to a sample of the optical film of the invention having a size of 12 mm×120 mm, in the direction of the major axis thereof, whereupon the retardation of the sample is measured with an ellipsometer (Nippon Bunko's M150), and the photoelasticity coefficient of the sample is derived from the retardation change thereof relative to the stress applied to the sample.

[In-Plane Retardation Change Before and after Stretching, and Slow Axis Detection]

A sample of 100×100 mm is prepared. Using a fixed monoaxial stretcher, this is stretched at a temperature of 140° C. in the machine direction (MD direction) or the transverse direction (TD direction). Before and after the stretching, the in-plane retardation of each sample is measured, using an automatic birefringence meter KOBRA21ADH. The slow axis of each sample is detected, based on the orientation angle determined in the retardation measurement as above. Preferably, the Re change by stretching of the sample is small. Concretely, preferred is $|Re(n)-Re(0)|/n \leq 1.0$, and more preferred is $|Re(n)-Re(0)|$ In 0.3, in which Re(n) indicates the in-plane retardation (nm) of the film stretched by n (%), and Re(0) indicates the in-plane retardation (nm) of the non-stretched film.

[Slow Axis Direction]

When the optical film of the invention is used as a protective film for a polarizing film, then it is desirable that the slow axis of the optical film is nearly in the MD direction or the TD direction thereof, since the polarizing film has an absorption axis in the machine direction (MD direction). When the slow axis is parallel to or perpendicular to the polarizing film, then the light leakage or discoloration may be thereby reduced. The wording "nearly" means that the angle between the slow axis and the MD or TD direction is from 0 to 10°, preferably from 0 to 5°.

[Cellulose Acylate Film Having Positive Intrinsic Birefringence]

When the cellulose acylate film of the invention is stretched in the direction of the slow axis thereof, then its in-plane retardation Re increases; but when it is stretched in the direction perpendicular to the slow axis thereof, then its in-plane retardation Re decreases. This means that the film has a positive intrinsic birefringence. For canceling Re generated inside the film, it is effective to stretch the film in the direction perpendicular to the slow axis of the film. For this, for example, it may be considered that, when the film has a slow axis in the machine direction (MD direction) thereof, then the film is stretched in the direction vertical to MD (that is, in the TD direction) by the use of a tenter to thereby reduce the in-plane retardation Re of the resulting film. As an opposite example contrary to this, when the film has a slow axis in the TD direction thereof, then the film may be stretched while the tension of the MD-running roll is increased to thereby reduce the in-plane retardation Re of the resulting film.

[Cellulose Acylate Film Having Negative Intrinsic Birefringence]

When the cellulose acylate film of the invention is stretched in the direction of the slow axis thereof, then its in-plane retardation Re may increase; but when it is stretched in the direction perpendicular to the slow axis thereof, then its in-plane retardation Re may decrease. This means that the film has a negative intrinsic birefringence. For canceling Re generated inside the film, it is effective to stretch the film in the direction of the slow axis of the film. For this, for example, it may be considered that, when the film has a slow axis in the machine direction (MD direction) thereof, then the film is stretched with increasing the tension of the MD-running roll to thereby reduce the in-plane retardation Re of the resulting film. As an opposite example contrary to this, when the film has a slow axis in the TD direction thereof, then the film may be stretched in the direction perpendicular to the MD direction (or that is, in the TD direction) by the use of a tenter to thereby reduce the in-plane retardation Re of the resulting film.

[Method of Evaluation of the Optical Film of the Invention]

The optical film of the invention is evaluated according to the methods mentioned below.

(In-Plane Retardation Re, Thickness-Direction Retardation Rth)

A film sample of 30 mm×40 mm is conditioned at 25° C. and 60% RH for 2 hours, and its Re(λ) is measured by applying thereto a light having a wavelength of λ nm in the normal line direction of the film, using an automatic birefringence meter KOBRA 21ADH (by Oji Keisoku Kiki). Rth(λ) of the sample is measured as follows: As the tilt axis thereof, the in-plane slow axis of the sample is inclined to 50° at intervals of 10° from the normal line direction, 0°, of the film, and a light having a wavelength of λ nm is applied to the film to measure the retardation values. Based on these values and the above Re(λ), the mean refractive index and the film thickness are inputted, and Rth(λ) of the sample is thereby computed.

(Determination of Wavelength-Dependent Anisotropy Distribution of Re and Rth)

A film sample of 30 mm×40 mm is conditioned at 25° C. and 60% RH for 2 hours. Using an ellipsometer M-150 (by Nippon Bunko), a light having a wavelength of from 380 nm to 780 nm is applied to it in the normal line direction of the film, and Re of the film at each wavelength is measured. From the data, the wavelength-dependent distribution of Re is determined. The wavelength-dependent distribution of Rth is determined as follows: A light having a wavelength of from 380 to 780 nm is applied to the film sample, in the direction inclined by +40° from the normal line direction of the film with the in-plane slow axis of the film as the tilt axis thereof, and the retardation is measured. A light having a wavelength of from 380 to 780 nm is applied to the film sample, in the direction inclined by −40° from the normal line direction of the film with the in-plane slow axis of the film as the tilt axis thereof, and the retardation is measured. Based on these two retardation data and the above Re value, totaling three data measured in the three directions, the mean refractive index and the film thickness are inputted, and wavelength-dependent distribution of Rth(λ) of the sample is thereby computed.

(Spectral Characteristics)

Using a spectrophotometer (U-3210 by Hitachi), the transmittance at a wavelength of from 300 to 450 nm of a sample of 13 mm×40 mm is measured at 25° C. and 60% RH. The inclination width is obtained as a wavelength for 72%-wavelength for 5%. The limit wavelength is represented by a wavelength for (inclination width/2)+5%. The absorption end is represented by the wavelength for transmittance of 0.4%. Based on these, the transmittance at 380 nm and 350 nm is determined.

[Condition of Film Surface]

Regarding the condition of the surface of the optical film of the invention, it is desirable that the arithmetical average height (Ra) of the surface roughness of the film based on JISB0601-1994 is at most 0.1 μm, and the maximum height (Ry) thereof is at most 0.5 μm. More preferably, the arithmetical average height (Ra) is at most 0.05 μm, and the maximum height (Ry) is at most 0.2 μm. The profile of the recesses and the projections of the film surface may be analyzed with an atomic force microscope (AFM).

(In-Plane Retardation Distribution of Optical Film]

Preferably, the optical film of the invention satisfies the following formulae:

$$|Re_{(MAX)}-Re_{(MIN)}| \leq 3, \text{ and } |Rth_{(MAX)}-Rth_{(MIN)}| \leq 5$$

in which $Re_{(MAX)}$ and $Rth_{(MAX)}$ each mean the maximum retardation of a piece of 1 m×1 m as cut out of the film in any desired manner; and $Re_{(MIN)}$ and $Rth_{(MIN)}$ each mean the minimum retardation thereof.

[Additive Retentiveness in Film]

The optical film of the invention is required to well retain various compounds added thereto. Concretely, when the optical film is stored at 80° C. and 90% RH for 48 hours, the mass change of the film is preferably from 0 to 5%, more preferably from 0 to 3%, even more preferably from 0 to 2%.

<Method of Evaluation of Additive Retentiveness in Film>

A sample is cut into a size of 10 cm×10 cm, and stored at 23° C. and 55% RH for 24 hours, and its mass is measured. Then, this is stored at 80±5° C. and 90±10% RH for 48 hours. After processed, the surface of the sample is gently wiped, and then further stored at 23° C. and 55% RH for 1 day, and the mass of the sample is again measured. The additive retentiveness in the sample is calculated as follows:

Additive Retentiveness (mass %)={(mass before storage−mass after storage)/(mass before storage)}×100.

[Mechanical Characteristics of Film]

(Tear Strength)

Preferably, the optical film of the invention having a thickness of from 20 to 80 μm has a tear strength of at least 2 g, measured according to the tear test method of JISK7128-2:1998 (Elmendorf tear test method), more preferably from 5 to 25 g, even more preferably from 6 to 25 g. Also preferably, the tear strength of the film having a thickness of 60 μm is at least 8 g, more preferably from 8 to 15 g. Concretely, a sample piece having a size of 50 mm×64 mm is conditioned at 25° C. and 65% RH, and then tested with a light load tear strength tester to measure its tear strength.

[Solvent Remaining in Film]

It is desirable that the optical film of the invention is dried under the condition under which the solvent amount remaining in the film could be from 0.01 to 1.5% by mass, more preferably from 0.01 to 1.0% by mass.

[Moisture-Absorbing Expansion Coefficient of Film]

Preferably, the moisture-absorbing expansion coefficient of the optical film of the invention is at most $30 \times 10^{-5}$/% RH, more preferably at most $15 \times 10^{-5}$/% RH, even more preferably at most $10 \times 10^{-5}$/% RH. The moisture-absorbing expansion coefficient of the film is preferably smaller, but in general, it may be at least $1.0 \times 10^{-5}$/% RH. The moisture-absorbing expansion coefficient means the percentage change of the length of a sample when the relative humidity around the sample is changed at a constant temperature. When the moisture-absorbing expansion coefficient is controlled as above and when the optical film of the invention is used as a support for optically-compensatory films, then frame-like transmittance increase, or that is, strain-caused light leakage can be prevented while the optically-compensatory function of the optically-compensatory films is kept as such.

[Surface Treatment]

If desired, the optical film of the invention may be subjected to surface treatment so as to increase the adhesiveness between the optical film and various functional layers (e.g., undercoat layer, back layer) formed thereon. For example, the film may be subjected to glow discharge treatment, UV irradiation treatment, corona treatment, flame treatment, acid or alkali treatment. The glow discharge treatment as referred to herein may be low-temperature plasma treatment in a low-pressure vapor at $10^{-3}$ to 20 Torr (0.133 to 2660 Pa), or preferably, it may be plasma treatment under an atmospheric pressure. The plasma-exciting vapor is a vapor that may be plasma-excited under the condition as above, including, for example, argon, helium, neon, krypton, xenon, nitrogen, carbon dioxide, flons such as tetrafluoromethane, and their mixtures. These are described in detail, for example, in Hatsumei Kyokai, Disclosure Bulletin No. 2001-1745 (issued Mar. 15, 2001, by Hatsumei Kyokai), pp. 30-32, and these may be favorably used also in the invention.

[Contact Angle on the Film Surface after Alkali Saponification Treatment]

When the optical film of the invention is used as a transparent protective film for polarizing plates, one effective method for its surface treatment is alkali saponification treatment. In this case, it is desirable that the contact angle on the film surface after the alkali saponification treatment is at most 55°, more preferably at most 50°, even more preferably at most 45°. The contact angle may be determined as follows: A water drop having a diameter of 3 mm is put on the surface of the film after alkali saponification, and the angle between the film surface and the water drop is determined in an ordinary manner. Thus determined, the contact angle could be a criterion of hydrophilicity/hydrophobicity of the film.

(Lightfastness)

Regarding the lightfastness index of the optical film of the invention, it is desirable that the film color difference $\Delta E^*ab$ after irradiation with super-xenon light for 240 hours is at most 20, more preferably at most 18, even more preferably at most 15. For the color difference determination, used is UV3100 (by Shimadzu). The measurement is as follows: A film sample is conditioned at 25° C. and 60% RH for at least 2 hours, and then the color of the film is measured before irradiation with xenon light. This gives initial values (L0*, a0*, b0*). Next, using a super-xenon weather meter SX-75 (by Suga Test Instruments), the film is irradiated with a xenon light of 150 W/m$^2$, at 60° C. and 50% RH for 240 hours. After a predetermined period of time, the film is taken out of the thermostatic chamber, then conditioned at 25° C. and 60% RH for 2 hours, and again subjected to analysis for its color. This gives aged values (L1*, a1*, b1*) after the irradiation with light. From these, the color difference $\Delta E^*ab=((L0^*-L1^*)^2+(a0^*-a1^*)^2+(b0^*-b1^*)^2)^{0.5}$ is obtained.

[Functional Layer]

The applications of the optical film of the invention include optical applications and photographic materials. The optical applications of the film are especially preferably for liquid-crystal display devices, more preferably those that comprise a liquid-crystal cell carrying liquid crystal between two electrode substrates, two polarizing plates disposed on both sides thereof, and at least one optically-compensatory sheet disposed between the liquid-crystal cell and the polarizing plate. For the liquid-crystal display devices, preferred are TN, IPS, FLC, AFLC, OCB, STN, ECB, VA and HAN.

When the optical film of the invention is used for these optical applications, various functional layers may be added to it. The layers are, for example, antistatic layer, cured resin layer (transparent hard coat layer), antireflection layer, easily-adhesive layer, antiglare layer, optically-compensatory layer, orientation layer, liquid-crystal layer. These functional layers and their materials that may be used for the optical film of the invention include surfactant, lubricant, mat agent, antistatic layer and hard coat layer, and they are described in detail in Hatsumei Kyokai's Disclosure Bulletin 2001-1745 (issued Mar. 15, 2001, by Hatsumei Kyokai), pp. 32-45, and are preferably used also in the invention.

[Use (Polarizing Plate)]

Use of the optical film of the invention is described.

The optical film of the invention is useful for a protective film for polarizing plates. When the film is used as a protective film for polarizing plates, the process for producing the polarizing plates is not limited, and it is possible to produce with a general process. There is a process in which the obtained optical film is alkali saponified, and attached to the both surfaces of polarizing film produced by immersing and stretching polyvinyl alcohol film in iodine solution with complete saponified polyvinyl alcohol solution. In stead of alkali saponification, easily adhesive process can be applied as disclosed in each of JPA-6-94915 and JPA-6-118232.

As the adhesive used for attaching the surface of the surface treated protective film to polarizing film, for example, polyvinyl alcohol adhesive such as polyvinyl alcohol or polyvinyl butyral, or vinyl latex such as butyl acrylate are exemplified.

A polarizing plate comprises a polarizing film and a protective film that protects both surfaces of the element; and a protective film is attached to one surface of the polarizing plate and a separate film is to the other surface thereof. The protective film and the separate film are for the purpose of protecting the polarizing plates while the polarizing plates are shipped or transported or while they are inspected. In this case, the protective film is for the purpose of protecting the surface of the polarizing plates, and this is on the other side opposite to the side thereof to be attached to a liquid-crystal plate. The separate film is for the purpose of protecting the adhesive layer attached to the polarizing plates, and this is on the side of the polarizing plates to be attached to a liquid-crystal plate.

A liquid-crystal display device generally comprises a liquid crystal-containing substrate sandwiched between two polarizing plates. The polarizing plate-protective film formed of the optical film of the invention may be disposed in any site of the device to exhibit excellent display visibility. In particular, on the polarizing plate-protective film on the outermost surface on the display side of a liquid-crystal display device, provided are a transparent hard coat layer, an antiglare layer and an antireflection layer. Therefore, it is desirable that the polarizing plate-protective film is disposed in the area on this site.

[Use (Optically-Compensatory Film)]

The optical film of the invention has many applications. When it is used for an optically-compensatory film in liquid-crystal display devices, it is especially effective. An optically-compensatory film is generally used in liquid-crystal display devices, and this is an optical member for compensating retardation. The optically-compensatory film has the same meaning as that of a phase retarder and an optically-compensatory sheet. The optically-compensatory film has a property of birefringence, and it is used for the purpose of removing coloration of display panels of liquid-crystal display devices and for improving the viewing angle characteristics of the devices. The optical film of the invention preferably has a small optical anisotropy in such that its Re and Rth satisfy $0 \leq Re \leq 10$ nm and $|Rth| \leq 25$ nm; and it has a reduced wavelength-dependent anisotropy distribution in such that $|Re(400)-Re(700)| \leq 10$ and $|Rth(400)-Rth(700) \leq 35$. Accordingly, the film does not have any superfluous anisotropy. When the film is combined with an optically-anisotropic layer having a birefringence, then it may exhibit the optical properties of the optically-anisotropic layer.

When the optical film of the invention is used as an optically-compensatory film for liquid-crystal display devices, it is desirable that $Re_{(630)}$ of the optically-anisotropic layer to be combined with it is from 0 to 200 nm and $|Rth_{(630)}|$ is from 0 to 400 nm. Falling within the range, any optically-anisotropic layer may be used herein. Not depending on the optical properties and the driving system of the liquid-crystal cell of the liquid-crystal display device where the optical film of the invention is used, any optically-anisotropic layer that is required for optically-compensatory films may be combined with the optical film of the invention. The optically-anisotropic layer which may be combined with the optical film of the invention may be formed of a composition that contains a liquid-crystalline compound, or may be formed of a birefringence-having polymer film.

The liquid-crystalline compound is preferably a discotic liquid-crystalline compound or a rod-shaped liquid-crystalline compound.

(Discotic Liquid-Crystal Compound)

Examples of the discotic liquid-crystal compound usable in the invention are described in various references (C. Destrade et al., *Mol. Cryst. Liq. Cryst.*, Vol. 71, p. 111 (1981); *Quarterly Journal of Outline of Chemistry*, by the Chemical Society of Japan, No. 22, Chemistry of Liquid Crystal, Chap. 10, Sec. 2 (1994); B. Kohne et al., *Angew. Chem. Soc. Chem. Comm.*, p. 1794 (1985); J. Zhang et al., *J. Am. Chem. Soc.*, Vol. 116, p. 2655 (1994)).

Preferably, the discotic liquid-crystal molecules are fixed as aligned in the optically-anisotropic layer in the invention, most preferably fixed therein through polymerization. The polymerization of discotic liquid-crystal molecules is described in JP-A 8-27284. For fixing discotic liquid-crystal molecules through polymerization, a polymerizable group must be bonded to the disc core of each discotic liquid-crystal molecule as a substituent thereto. However, if such a polymerizable group is directly bonded to the disc core, then the molecules could hardly keep their orientation during polymerization. Accordingly, a linking group is introduced between the disc core and the polymerizable group to be bonded thereto. Such polymerizable group-having discotic liquid-crystal molecules are disclosed in JP-A 2001-4387.

(Rod-Shaped Liquid-Crystal Compound)

Examples of the rod-shaped liquid-crystal compound usable in the invention are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans, and alkenylcyclohexyl-benzonitriles. Not only such low-molecular liquid-crystal compounds, but also high-molecular liquid-crystal compounds may also be usable herein.

In the optically-anisotropic layer, it is desirable that the rod-shaped liquid-crystal molecules are fixed in an aligned state, most preferably they are fixed through polymerization. Examples of the polymerizable rod-shaped liquid-crystal compound usable in the invention are described in *Macromol. Chem.*, Vol. 190, p. 2255 (1989); *Advanced Materials*, Vol. 5, p. 107 (1993); U.S. Pat. Nos. 4,683,327, 5,622,648, 5,770, 107; pamphlets of International Laid-Open Nos. 95/22586, 95/24455, 97/00600, 98/23580, 98/52905; JP-A 1-272551, 6-16616, 7-110469, 11-80081, 2001-328973.

(Optically-Anisotropic Layer of Polymer Film)

As described in the above, the optically-anisotropic layer may be formed of a polymer film. The polymer film is formed from a polymer capable of expressing optical anisotropy. Examples of the polymer are polyolefin (e.g., polyethylene, polypropylene, norbornene-based polymer), polycarbonate, polyarylate, polysulfone, polyvinyl alcohol, polymethacrylate, polyacrylate and cellulose ester (e.g., cellulose triacetate, cellulose diacetate). Copolymers or mixtures of these polymers may also be usable herein.

The optical anisotropy of the polymer film is preferably generated by stretching. The stretching is preferably monoaxial stretching or biaxial stretching. Concretely, preferred is machine-direction monoaxial stretching to be attained by utilizing the peripheral speed difference between two or more rolls; or tenter stretching to be attained by clipping both sides of a polymer film and stretching it in the width direction; or biaxial stretching comprising a combination of these. If desired, two or more polymer films may be used so that the overall optical properties of these two or more films may satisfy the above-mentioned conditions. Preferably, the polymer film is produced according to a solvent casting method in order that the birefringence unevenness of the film is reduced as much as possible. Preferably, the thickness of the polymer film falls between 20 and 500 µm most preferably between 40 and 100 µm.

For the polymer film to form the optically-anisotropic layer, usable is at least one polymer material selected from polyamide, polyimide, polyester, polyether ketone, polyamidimide-polyester imide, and polyaryl-ether ketone. This is dissolved in a solvent, then the resulting solution is applied to a substrate, and the solvent is evaporated away to form a film on the film. This method is favorably employed herein. In this case, also preferred is a method of stretching the polymer film and the substrate so as to make the film have optical anisotropy, and the film thus processed may be used as an optically-anisotropic layer. The optical film of the invention is preferably used as the support in these embodiments. Another preferred method is as follows: The polymer film is formed on a different substrate, and this is peeled from it, and then this is stuck to the optical film of the invention to give an optically-anisotropic layer having a laminate structure. In this method, the polymer film may be thinned, and its thickness is preferably at most 50 µm, more preferably from 1 to 20 µm.

[Use (Liquid-Crystal Display Device)]

The liquid-crystal display device of the invention comprises, for example, a liquid-crystal cell having a liquid crystal between two electrode substrates, and a polarizing plate disposed on at least one side thereof, in which the polarizing plate comprises a polarizing film and at least one protective film.

Preferably, the liquid-crystal display device has at least one optically-compensatory film disposed between the liquid crystal cell and the polarizing film, in which the optical film of the invention may be used as a protective film for the polarizing film and as a support for the optically-compensatory film. When the optical film of the invention is used in the optically-compensatory film, then the transmission axis of the polarizing film and the slow axis of the optically-compensatory film having a transparent film may be disposed at any angle.

The liquid-crystal layer of the liquid-crystal cell used in the liquid-crystal display device of the invention is constructed generally by introducing a liquid crystal into the space formed by two substrates with a spacer sandwiched therebetween, and sealing it up therein. A transparent electrode layer is formed on the substrate as a conductive substance-containing transparent film thereon. The liquid-crystal cell may further have a gas-barrier layer, a hard coat layer or an undercoat layer (for adhesion of a transparent electrode layer). These layers are generally formed on a substrate. The substrate of the liquid-crystal cell generally has a thickness of from 50 μm to 2 mm.

(Type of Liquid-Crystal Display Device)

The optical film of the invention may be used for liquid-crystal cells of various display modes. Various display modes such as TN (twisted nematic), IPS (in-plane switching), FLC (ferroelectric liquid-crystal), AFLC (anti-ferroelectric liquid-crystal), OCB (optically-compensatory bent), STN (super-twisted nematic), VA (vertically aligned), ECB (electrically-controlled birefringence) and HAN (hybrid aligned nematic) modes have been proposed. Also proposed are other display modes with any of the above-mentioned display modes aligned and divided. The optical film of the invention is effective in liquid-crystal display devices of any display mode. Further, it is also effective in any of transmission-type, reflection-type and semitransmission-type liquid-crystal display devices. Above all, the optical film of the invention is favorable to VA-mode or IPS-mode liquid-crystal display devices.

(TN-Mode Liquid-Crystal Display Device)

The optical film of the invention may be used as a support of the optically-compensatory film in TN-mode liquid-crystal cell-having TN-mode liquid-crystal display devices. TN-mode liquid-crystal cells and TN-mode liquid-crystal display devices are well known from the past. The optically-compensatory film to be used in TN-mode liquid-crystal display devices is described in JP-A 3-9325, 6-148429, 8-50206, 9-26572. In addition, it is also described in Mori et al's reports (*Jpn. J. Appl. Phys.*, Vol. 36 (1997), p. 143; *Jpn. J. Appl. Phys.*, Vol. 36 (1997), p. 1068).

(STN-Mode Liquid-Crystal Display Device)

The optical film of the invention may be used as a support of the optically-compensatory film in STN-mode liquid-crystal cell-having STN-mode liquid-crystal display devices. In general, the rod-shaped liquid-crystal molecules in the liquid-crystal cell in an STN-mode liquid-crystal display device are twisted at an angle within a range of from 90 to 360 degrees, and the product of the refractivity anisotropy (Δn) of the rod-shaped liquid-crystal molecules and the cell gap (d), Δnd falls between 300 and 1500 nm. The optically-compensatory film to be used in STN-mode liquid-crystal display devices is described in JP-A 2000-105316.

(VA-Mode Liquid-Crystal Display Device)

The optical film of the invention is especially favorable for a support of the optically-compensatory film in VA-mode liquid-crystal cell-having VA-mode liquid-crystal display devices. Preferably, the optically-compensatory film for use in VA-mode liquid-crystal display devices has a retardation Re of from 0 to 150 nm and a retardation Rth of from 70 to 400 nm. More preferably, the retardation Re of the sheet is from 20 to 70 nm. When two optically-anisotropic polymer films are used in a VA-mode liquid-crystal display device, then the retardation Rth of the films preferably falls between 70 and 250 nm. When one optically-anisotropic polymer film is used in a VA-mode liquid-crystal display device, then the retardation Rth of the film preferably falls between 150 and 400 nm. The VA-mode liquid-crystal display devices for the invention may have an orientation-divided system, for example, as in JP-A 10-123576.

(IPS-Mode Liquid-Crystal Display Device, and ECB-Mode Liquid-Crystal Display Device)

The optical film of the invention is also favorable for a support of the optically-compensatory film and for a protective film of the polarizing plate in IPS-mode or ECB-mode liquid-crystal cell-having IPS-mode liquid-crystal display devices and ECB-mode liquid-crystal display devices. In these modes, the liquid-crystal material is aligned nearly in parallel to the film face in black display, and the liquid-crystal molecules are aligned in parallel to the surface of the substrate when no voltage is applied to the device for black display. In these embodiments, the polarizing plate that comprises the optical film having a low optical anisotropy preferably used in the invention contributes to enlarging the viewing angle and to improving the image contrast. In this embodiment, of the aforementioned polarizing plate protective films disposed in the top and bottom of the liquid-crystal cell, it is preferred that a polarizing plate using an optical film having a low optical anisotropy is used as at least one surface of the protective films disposed between the liquid-crystal cell and the polarizing plate (the protective films of cell side). More preferably, the retardation value of the optically-anisotropic layer disposed between the protective film of the polarizing plate and the liquid crystal cell is preferably at most 2 times the value of Δn·d of the liquid-crystal layer.

(OCB-Mode Liquid-Crystal Display Device, and HAN-Mode Liquid-Crystal Display Device)

The optical film of the invention is also favorable for a support of the optically-compensatory film in OCB-mode liquid-crystal cell-having OCB-mode liquid-crystal display devices and HAN-mode liquid-crystal cell-having HAN-mode liquid-crystal display devices. Preferably, the optically-compensatory film for use in OCB-mode liquid-crystal display devices and HAN-mode liquid-crystal display devices is so designed that the direction in which the absolute value of the retardation of the sheet is the smallest does not exist both in the in-plane direction and in the normal line direction of the optically-compensatory sheet. The optical properties of the optically-compensatory film for use in OCB-mode liquid-crystal display devices and HAN-mode liquid-crystal display devices are determined, depending on the optical properties of the optically-anisotropic layer, the optical properties of the support and the positional relationship between the optically-anisotropic layer and the support. The optically-compensatory film for use in OCB-mode liquid-crystal display devices and HAN-mode liquid-crystal display devices is described in JP-A 9-197397. It is described also in Mori et al's reports (*Jpn. J. Appl. Phys.*, Vol. 38 (1999), p. 2837).

(Reflection-Type Liquid-Crystal Display Device)

The optical film of the invention is also favorably used for an optically-compensatory film in TN-mode, STN-mode, HAN-mode or GH (guest-host)-mode reflection-type liquid-crystal display devices. These display modes are well known from the past. TN-mode reflection-type liquid-crystal devices are described in JP-A 10-123478, pamphlet of International Laid-Open No. 98/48320, and Japanese Patent 3022477. The optically-compensatory film for use in reflection-type liquid-crystal display devices is described in pamphlet of International Laid-Open No. 00/65384.

(Other Liquid-Crystal Display Devices)

The optical film of the invention is also favorably used as a support of the optical compensatory film in ASM (axially symmetric aligned microcell)-mode liquid-crystal cell-having ASM-mode liquid-crystal display devices. The liquid-crystal cell in ASM-mode devices is characterized in that it is supported by a resin spacer capable of controlling and varying the thickness of the cell. The other properties of the cell are the same as those of the liquid-crystal cell in TN-mode devices. ASM-mode liquid-crystal cells and ASM-mode liquid-crystal display devices are described in Kume et al's report (Kume et al., *SID 98 Digest* 1089 (1998)).

(Hard Coat Film, Antiglare Film, Antireflection Film)

The optical film of the invention is favorably applied to hard coat films, antiglare films and antireflection films. For the purpose of improving the visibility of flat panel displays such as LCD, PDP, CRT, EL, any or all of a hard coat layer, an antiglare layer and an antireflection layer may be fitted to one or both faces of the optical film of the invention. Preferred embodiments of such antiglare films and antireflection films are described in Hatsumei Kyokai's Disclosure Bulletin 2001-1745 (issued Mar. 15, 2001, by Hatsumei Kyokai), pp. 54-57, and the optical film of the invention may be favorably used in these.

(Photographic Film Support)

The optical film usable in the invention is applicable to supports of silver halide photographic materials. Various materials and formulations and methods for processing them are described in some patent publications, and they may apply to the invention. Regarding the techniques, JP-A 2000-105445 has detailed descriptions of color negative films, and the optical film of the invention is favorably used in these. Also preferably, the film of the invention is applicable to supports of color reversal silver halide photographic materials, and various materials and formulations and methods for processing them described in JP-A 11-282119 are applicable to the invention.

(Transparent Substrate)

Since the optical film having a low optical anisotropy preferably used in the invention has nearly zero optical anisotropy and has good transparency, it may be substitutable for the glass substrate for liquid-crystal cells in liquid-crystal display devices, or that is, it may be usable as a transparent support for sealing up the driving liquid crystals in the devices.

Since the transparent substrate for sealing up liquid crystal must have a good gas-barrier property, a gas-barrier layer may be optionally fitted to the surface of the optical film of the invention, if desired. The morphology and the material of the gas-barrier layer are not specifically defined. For example, $SiO_2$ may be deposited on at least one face of the optical film of the invention, or a polymer coating layer of a vinylidene-based polymer or a vinyl alcohol-based polymer having a relatively higher gas-barrier property may be formed on the film of the invention. These techniques may be suitably selected for use in the invention.

When the film of the invention is used as a transparent substrate for sealing up liquid crystal, a transparent electrode may be fitted to it for driving liquid crystal through voltage application thereto. The transparent electrode is not specifically defined. For example, a metal film or a metal oxide film may be laminated on at least one surface of the optical film of the invention so as to form a transparent electrode on it. Above all, a meal oxide film is preferred in view of the transparency, the electroconductivity and the mechanical characteristics of the film; and a thin film of indium oxide essentially comprising tin oxide and containing from 2 to 15% of zinc oxide is more preferred. These techniques are described in detail, for example, in JP-A 2001-125079 and 2000-22760.

EXAMPLES

The invention is described more concretely with reference to the following Examples. The materials, the reagents, the proportions and the operations shown in the following Examples may be suitably modified and changed, not overstepping the scope and the spirit of the invention, and the invention should not be limited to the following Examples.

Example 1

1. Fabrication of Optical Film

A composition mentioned below was put into a mixing tank, and stirred therein with heating to dissolve and disperse the constitutive components, thereby preparing a cellulose acylate solution A.

<Composition of Cellulose Acylate Solution A>

| | |
|---|---|
| Cellulose acetate having a degree of acyl substitution of 2.87 | 100 mas. pts. |
| Methylene chloride | 300 mas. pts. |
| Methanol | 54 mas. pts. |
| 1-Butanol | 11 mas. pts. |
| Silica particle dispersion having a mean particle size of 16 nm | 0.2 mas. pts. |
| Ester mixture (monoethyl ester, diethyl ester, triethyl ester mixture, blend ratio 20:80:1) | 0.1 mas. pts. |

A composition of the following Table 1 was put into another mixing tank, and stirred therein with heating to dissolve the constitutive components, thereby preparing additive solutions B-1 to B-8.

TABLE 1

| Additive Solution | Methylene Chloride | Methanol | Butanol | Optical Anisotropy-Lowering Compound | | Wavelength-Dependent Anisotropy Distribution Improver | |
|---|---|---|---|---|---|---|---|
| | | | | compound | amount added | compound | amount added |
| B-1 | 82 mas. pts. | 15 mas. pts. | 3 mas. pts. | none | — | none | — |
| B-2 | 82 mas. pts. | 15 mas. pts. | 3 mas. pts. | BDP *1 | 35 mas. pts. | none | — |
| B-3 | 82 mas. pts. | 15 mas. pts. | 3 mas. pts. | A-19 | 40 mas. pts. | none | — |
| B-4 | 82 mas. pts. | 15 mas. pts. | 3 mas. pts. | A-19 | 20 mas. pts. | none | — |
| B-5 | 82 mas. pts. | 15 mas. pts. | 3 mas. pts. | A-19 | 10 mas. pts. | none | — |
| B-6 | 82 mas. pts. | 15 mas. pts. | 3 mas. pts. | A-19 | 3 mas. pts. | none | — |
| B-7 | 82 mas. pts. | 15 mas. pts. | 3 mas. pts. | A-19 | 20 mas. pts. | UV-21 | 5 mas. pts. |
| B-8 | 82 mas. pts. | 15 mas. pts. | 3 mas. pts. | A-19 | 20 mas. pts. | UV-21 | 2 mas. pts. |
| | | | | | | UV-23 | 2 mas. pts. |

*1: This has no ability to lower optical anisotropy.

<Fabrication of Optical Film Sample 001> parts by mass of the additive solution B-1 was added to 465 parts by mass of the cellulose acylate solution A, and well stirred to prepare a dope. The dope was cast onto a cooled metal support band, through a casting slit. The film formed was peeled off from the band, having a volatile content of 82% by mass, and with its both sides in the width direction thereof being fixed to a tenter (as in FIG. 3 in JP-A 4-1009), this was dried to have a solvent content of from 20 to 48% by mass in such a manner that the draw ratio in the transverse direction (direction perpendicular to the machine direction) could be 3%. Next, the film was conveyed between rolls in a heat treatment device and was further dried therein at 130° C. for 24 minutes. Thus, an optical film sample 001 having a thickness of 80 μm was produced. The remaining solvent content of the optical film sample 001 was 0.3%.

<Fabrication of Optical Film Samples 002, 101 to 108>

Optical film samples 002, and 101 to 108 were produced in the same manner as that for producing the optical film sample 001, for which, however, the additive solution and the film thickness were varied as in Table 2. The spectral transmittance of these samples at a wavelength of 380 nm and a wavelength of 350 nm was measured. It was found that the transmittance of these samples was from 45% to 95% at a wavelength of 380 nm, but only the samples with the wavelength-dependent anisotropy distribution improver added thereto had a transmittance of at most 10% at a wavelength of 350 nm.

The optical film samples of the invention and the comparative samples were conditioned at 25° C. and 60% RH for 2 hours, and then analyzed for the in-plane slow axis direction, the in-plane retardation Re and the thickness-direction retardation Rth thereof, using an automatic birefringence meter (KOBRA 21DH, by Oji Keisoku).

A sample of 35 mm×3 mm was taken out both in the MD direction and in the TD direction perpendicular to the MD direction, and conditioned at 25° C. and 60% RH for 2 hours, and their curl values $C_{MD,60}$ and $C_{TD,60}$ were measured. The sample was conditioned at 25° C. and 10% RH for 2 hours, and its curl values $C_{MD,10}$ and $C_{TD,10}$ were measured. Apart from these, the sample was conditioned at 25° C. and 80% RH for 2 hours, and their curl values $C_{MD,80}$ and $C_{TD,80}$ were measured. The difference between the curl value at 25° C. and 10% RH and the curl value at 25° C. and 80% RH, $\Delta(C_{MD,80}-C_{MD,10})$ and $\Delta(C_{TD,80}-C_{TD,10})$ was computed. The data are given in Table 2.

In place of the additive of the invention, a plasticizer biphenyldiphenyl phosphate (BDP) was added to prepare a comparative sample 002, DBP was not added to prepare a comparative sample 001. The absolute value of curl of these comparative samples was often over 15/m; and the absolute value of the difference between the curl value at 80% RH and the curl value at 10% RH was often over 10/m. As opposed to these, the absolute value of curl of the optical film of the invention was at most 14/m, and the absolute value of the difference between the curl value at 80% RH and that at 10% RH was at most 9/m. This confirms that the curl value and its humidity dependency of the optical films of the invention are small.

TABLE 2

| Sample Number | Additive Solution | Thickness (μm) | optical anisotropy-lowering agent *3 | | wavelength-dependent anisotropy distribution improver | | $Re_{(630)}$ (nm) | $Rth_{(630)}$ (nm) | $C_{MD,10}$ (1/m) | $C_{TD,10}$ (1/m) | $C_{MD,60}$ (1/m) | $C_{TD,60}$ (1/m) | $C_{MD,80}$ (1/m) | $C_{TD,80}$ (1/m) |
|---|---|---|---|---|---|---|---|---|---|---|---|---|---|---|
| 001 | B-1 | 80 | none | — | none | — | 1.3 | 35.2 | −25 | −10 | 8 | 18 | 15 | 30 |
| 002 | B-2 | 80 | BDP *4 | 10.4 | none | — | 3.4 | 38.2 | 25 | 13 | 17 | 3 | 14 | −2 |
| 101 | B-3 | 80 | A-19 | 11.4 | none | — | 1.3 | 2.6 | 2 | 3 | 4 | 9 | 4 | 12 |
| 102 | B-4 | 80 | A-19 | 6.7 | none | — | 1.8 | 5.2 | 3 | 4 | 5 | 10 | 5 | 13 |
| 103 | B-5 | 80 | A-19 | 3.6 | none | — | 1.9 | 8.5 | 4 | 5 | 6 | 12 | 7 | 14 |
| 104 | B-6 | 80 | A-19 | 1.2 | none | — | 2 | 11.5 | 5 | 5 | 7 | 11 | 8 | 13 |
| 105 | B-7 | 80 | A-19 | 6.4 | UV-21 | 1.6 | 1.6 | 3.8 | 3 | 4 | 5 | 8 | 5 | 9 |
| 106 | B-8 | 80 | A-19 | 6.5 | UV-21 UV-23 | 0.65 0.65 | 1.5 | 3.9 | 12 | 13 | 10 | 7 | 10 | 5 |
| 107 | B-8 | 75 | A-19 | 6.5 | UV-21 UV-23 | 0.65 0.65 | 1.4 | 3.5 | 10 | 10 | 10 | 6 | 11 | 4 |
| 108 | B-8 | 65 | A-19 | 6.5 | UV-21 UV-23 | 0.65 0.65 | 1.4 | 3.1 | 8 | 8 | 9 | 6 | 9 | 2 |

| Sample Number | $\Delta C_{MD}$ *1 (1/m) | $\Delta C_{TD}$ *2 (1/m) | Spectral Transmittance (%) | | |
|---|---|---|---|---|---|
| | | | 380 nm | 350 nm | |
| 001 | 40 | 40 | 92.8 | 89.7 | comparison |
| 002 | −11 | −15 | 89.7 | 88.5 | comparison |
| 101 | 2 | 9 | 86.4 | 67.7 | the invention |
| 102 | 2 | 9 | 88.6 | 78.6 | the invention |
| 103 | 3 | 9 | 89.6 | 81.3 | the invention |
| 104 | 3 | 8 | 90.2 | 84.4 | the invention |
| 105 | 2 | 5 | 89.2 | 2.2 | the invention |
| 106 | −2 | −8 | 88.5 | 5.6 | the invention |
| 107 | 1 | −6 | 89.9 | 7.5 | the invention |
| 108 | 1 | −6 | 91.1 | 8.9 | the invention |

Notes)
*1 $C_{MD,80}-C_{MD,10}$,
*2 $C_{TD,80}-C_{TD,10}$,
*3 optical anisotropy-lowering compound,
*4 having no ability to lower optical anisotropy The optical films 002, 101 and 105 were analyzed for the additive distribution in the depth direction thereof, using ION-TOF's TOF-SIMS IV (where the primary ion is Au$I^+$, 25 keV). The film was divided into 10 equal portions in the thickness direction from the film-cast band surface to the air surface (opposite to the band surface), and the additive strength in each layer portion was determined. The data are given in Table 3.

In the comparative sample 002 with a plasticizer, biphenyldiphenyl phosphate (BDP) added thereto, the additive proportion in the 2nd layer, the 3rd layer and the 9th layer from the band surface side was outside the intended range. However, in the optical films 101 and 105 of the invention, it was confirmed that the additive proportion was within a range of from 80% to 120% of the mean additive amount of the film.

TABLE 3

| Sample Number | Additive | | inner 2nd layer | inner 3rd layer | inner 4th layer | inner 5th layer | inner 6th layer | inner 7th layer | inner 8th layer | inner 9th layer | Remarks |
|---|---|---|---|---|---|---|---|---|---|---|---|
| 002 | BDP | existing additive amount *1 | 126.3 | 124.7 | 118.4 | 116.5 | 109.0 | 94.5 | 83.9 | 68.6 | comparison |
| 101 | A-19 | existing additive amount *1 | 101.3 | 102.7 | 101.3 | 101.6 | 110.1 | 103.1 | 102.9 | 100.7 | the invention |
| 105 | A-19 + UV-21 | existing additive amount *1 | 98.0 | 104.6 | 105.4 | 104.0 | 104.7 | 113.8 | 103.5 | 95.1 | the invention |

Note)
*1 % relative to the mean additive amount existing in the entire optical film.

Example 2

A cellulose acylate solution C was prepared in the same manner as in Example 1, for which, however, a cellulose acylate having a degree of acyl substitution of 1.7, a degree of propionyl substitution of 1.0 and an unsubstituted OH proportion of 0.3 was used in place of the cellulose acetate having a degree of acyl substitution of 2.87 in Example 1.

A composition of the following Table 4 was put into a different mixing tank, and stirred with heating to dissolve the components, thereby preparing additive solutions B-9 to B-16.

TABLE 4

| Additive Solution | Methylene Chloride | Methanol | Butanol | Optical Anisotropy-Lowering Compound | | Wavelength-Dependent Anisotropy Distribution Improver | |
|---|---|---|---|---|---|---|---|
| | | | | compound | amount | compound | amount |
| B-9 | 82 mas. pts. | 15 mas. pts. | 3 mas. pts. | BDP*1 | 40 mas. pts. | UV-3 | 5 mas. pts. |
| B-10 | 82 mas. pts. | 15 mas. pts. | 3 mas. pts. | BDP*1 | 75 mas. pts. | UV-7 | 8 mas. pts. |
| B-11 | 82 mas. pts. | 15 mas. pts. | 3 mas. pts. | A-7 | 40 mas. pts. | UV-21 | 5 mas. pts. |
| B-12 | 82 mas. pts. | 15 mas. pts. | 3 mas. pts. | A-18 | 40 mas. pts. | UV-102 | 5 mas. pts. |
| B-13 | 82 mas. pts. | 15 mas. pts. | 3 mas. pts. | A-35 | 40 mas. pts. | UV-102 | 5 mas. pts. |
| B-14 | 82 mas. pts. | 15 mas. pts. | 3 mas. pts. | A-30 | 40 mas. pts. | UV-21 UV-23 | 2 mas. pts. 2 mas. pts. |
| B-15 | 82 mas. pts. | 15 mas. pts. | 3 mas. pts. | FA-2 | 40 mas. pts. | UV-102 | 5 mas. pts. |
| B-16 | 82 mas. pts. | 15 mas. pts. | 3 mas. pts. | FB-6 | 40 mas. pts. | UV-21 UV-23 | 2 mas. pts. 2 mas. pts. |

*1: having no ability to lower optical anisotropy.

To 465 parts by mass of the cellulose acylate solution C, added was 40 parts by mass of the additive solution B-9 to B-16, and well stirred to prepare a dope. The dope was cast onto a metal drum cooled at 0° C. to form an optical film sample 003 to 004, and 109 to 114 having a thickness of 60 μm. These samples were analyzed and tested in the same manner as in Example 1 to determine and calculate the curl values thereof, $C_{MD,60}$, $C_{TD,60}$, $C_{MD,10}$, $C_{TD,10}$, $C_{MD,80}$, $C_{TD,80}$, and the curl difference thereof, $\Delta(C_{MD,80}-C_{MD,10})$, $\Delta(C_{TD,80}-C_{TD,10})$. As in Table 5, it is confirmed that the samples 109 to 114 containing an optical anisotropy-lowering compound favorable to the invention are all better than the comparative samples 003 and 004 in point of their curl resistance.

TABLE 5

| Sample Number | Additive Solution | Thickness (μm) | optical anisotropy-lowering agent *3 | | wavelength-dependent anisotropy distribution improver | | $C_{MD,10}$ (1/m) | $C_{TD,10}$ (1/m) | $C_{MD,60}$ (1/m) | $C_{TD,60}$ (1/m) | $C_{MD,80}$ (1/m) | $C_{TD,80}$ (1/m) | $\Delta C_{MD}$ *1 (1/m) | $\Delta C_{TD}$ *2 (1/m) | Remarks |
|---|---|---|---|---|---|---|---|---|---|---|---|---|---|---|---|
| 003 | B-9 | 60 | BDP *4 | 11 | UV-3 | 1.4 | −5 | 1 | 5 | 11 | 16 | 17 | 21 | 16 | comparison |
| 004 | B-10 | 60 | BDP *4 | 16.4 | UV-7 | 1.7 | 22 | −8 | 20 | 3 | 18 | 3 | −4 | 11 | comparison |
| 109 | B-11 | 73 | A-7 | 11 | UV-21 | 1.4 | 1 | 3 | 2 | 9 | 3 | 11 | 2 | 8 | the invention |
| 110 | B-12 | 68 | A-18 | 11 | UV-102 | 1.4 | 0 | 4 | 2 | 8 | 5 | 10 | 5 | 6 | the invention |
| 111 | B-13 | 64 | A-35 | 11 | UV-102 | 1.4 | 2 | 5 | 5 | 3 | 6 | 3 | 4 | −2 | the invention |
| 112 | B-14 | 58 | A-30 | 11.1 | UV-21 UV-23 | 0.56 0.56 | 3 | 5 | 7 | 9 | 8 | 11 | 5 | 6 | the invention |
| 113 | B-15 | 51 | FA-2 | 11 | UV-102 | 1.4 | 5 | 3 | 5 | 8 | 4 | 10 | −1 | 7 | the invention |
| 114 | B-16 | 43 | FB-6 | 11.1 | UV-21 UV-23 | 0.56 0.56 | 2 | 9 | 4 | 8 | 6 | 5 | 4 | −4 | the invention |

Notes)
*1 $C_{MD,80}$-$C_{MD,10}$,
*2 $C_{TD,80}$-$C_{TD,10}$,
*3 optical anisotropy-lowering compound,
*4 having no ability to lower optical anisotropy In the optical films 004 and 111, the additive distribution in the thickness direction of the film was determined in the same manner as in Example 1. The film was divided into 10 equal portions in the thickness direction from the film-cast drum surface to the air surface (opposite to the drum surface), and the additive strength in each layer portion was determined. The data are given in Table 6.

In the comparative optical film 004, the amount of the additive in the 9th layer from the band surface was outside the desired range. However, in the optical film 111 the invention, it was confirmed that the additive proportion was within a range of from 80% to 120% of the mean additive amount of the film.

TABLE 6

| Sample Number | Additive | | inner 2nd layer | inner 3rd layer | inner 4th layer | inner 5th layer | inner 6th layer | inner 7th layer | inner 8th layer | inner 9th layer | Remarks |
|---|---|---|---|---|---|---|---|---|---|---|---|
| 004 | BDP + UV-7 | existing additive amount *1 | 106.7 | 109.7 | 114.9 | 111.5 | 112.7 | 104.1 | 83.2 | 79.1 | comparison |
| 111 | A-35 + UV-102 | existing additive amount *1 | 111.6 | 115.4 | 116.0 | 113.7 | 108.2 | 102.6 | 99.0 | 89.9 | the invention |

Note)
*1 % relative to the mean additive amount existing in the entire optical film.

The optical film samples of the invention and the comparative samples prepared in the above were conditioned at 25° C. and 60% RH for 2 hours, and then analyzed for the in-plane retardation $Re_{(630)}$ and the thickness-direction retardation $Rth_{(630)}$ thereof at a wavelength of 630 nm. From the data of Re and Rth at 400 nm and 700 nm of these samples, calculated were ($Re_{(400)}$−$Re_{(700)}$) and ($Rth_{(400)}$−$Rth_{(700)}$). In addition, the haze and the moisture permeability of the films were also determined. The data are shown in Table 7.

TABLE 7

| Sample Number | Thickness (μm) | $Re_{(630)}$ (nm) | $Rth_{(630)}$ (nm) | $Re_{(400)}$-$Re_{(700)}$ (nm) | $Rth_{(400)}$-$Rth_{(700)}$ (nm) | Water Content (%) | Moisture Permeability (g/m² 24 hr) | Haze (%) | Remarks |
|---|---|---|---|---|---|---|---|---|---|
| 003 | 60 | 5.3 | 45.2 | 12.5 | 38.2 | 4.7 | 2903 | 1.2 | comparison |
| 004 | 60 | 5.6 | 41.6 | 8.8 | 36.4 | 3.4 | 1983 | 1.8 | comparison |
| 109 | 73 | 2.3 | 23.5 | 4.6 | 22.5 | 3.1 | 1847 | 1.1 | the invention |
| 110 | 68 | 1.9 | 7.2 | 3.4 | 17.6 | 3.6 | 976 | 0.6 | the invention |
| 111 | 64 | 1.6 | 4.5 | 2.1 | 19.4 | 3.3 | 478 | 0.3 | the invention |
| 112 | 58 | 1.7 | -1.5 | 4.3 | 15.4 | 3.1 | 1219 | 1.1 | the invention |
| 113 | 51 | 2 | 1.8 | 4.1 | 13.2 | 2.9 | 1087 | 0.7 | the invention |
| 114 | 43 | 1.8 | 13.7 | 8.6 | 20.9 | 3 | 1623 | 0.4 | the invention |

Of the comparative samples 003 and 004 containing a plasticizer, biphenyldiphenyl phosphate (BDP) in place of an optical anisotropy-lowering compound favorable to the invention, $|Rth_{(630)}|$ could not be lower than 30 nm, and the wavelength-dependent distribution of Rth was great. On the other hand, it was confirmed that, of the samples 109 to 114 containing an optical anisotropy-lowering compound favorable to the invention, $|Rth_{(630)}|$ was within a range of from 0 to 25 nm, and the wavelength-dependent anisotropy distribution was lowered (reduced).

The equilibrium water content of these samples at 25° C. and 80% RH was measured. Except that of the comparative sample 003, the water content of the samples was not higher than 4%. This confirms that the cellulose acylate films, to which the optical anisotropy-lowering compound and the wavelength-dependent anisotropy distribution improver favorable to the invention had been added, were hydrophobicated.

The moisture permeability of these samples at 60° C. and 95% RH for 24 hours (as converted into a film having a thickness of 80 μm) was determined. Except that of the comparative sample 003, the moisture permeability of the samples was within a range of from 400 g/m²·24 hr to 2000 g/m²·24 hr. In addition, it was confirmed that the samples 109 to 114 of the invention, to which the optical anisotropy-lowering compound and the wavelength-dependent anisotropy distribution improver favorable to the invention had been added, were better than the comparative samples in point of the moisture permeability thereof.

Example 3

A cellulose acylate solution A and an additive solution B-7 were prepared according to the methods described in Example 1. In addition, an additive solution B-17 was prepared in the same manner as that for the additive solution B-7, for which, however, the amount of the additive A-19 was 20.8 parts by mass and the amount of the additive UV-21 was 5.2 parts by mass.

<Fabrication of Transparent Film Sample 115>

40 parts by mass of the additive solution B-7 was added to 465 parts by mass of the cellulose acylate solution A, and well stirred to prepare a dope C. 40 parts by mass of the additive solution B-17 was added to 465 parts by mass of the cellulose acylate solution A, and well stirred to prepare a dope D. The dope C and the dope D were co-cast onto a cooled metal support band with the dope C being sandwiched between the dopes D. The film formed was peeled off from the band at a peeling speed of 53 m/min, having a solvent content of 58% by mass, and with its both sides in the width direction thereof being fixed to a tenter (as in FIG. 3 in JP-A 4-1009), this was dried to have a solvent content of from 15 to 35% by mass in such a manner that the draw ratio in the transverse direction (direction perpendicular to the machine direction) could be 3%. Next, the film was conveyed between rolls in a heat treatment device and was further dried therein at 130° C. for 20 minutes. Thus, an optical film sample 115 having a thickness of 80 μm was produced. The casting flow amount of the dope C, the dope D on the band face side and the dope D on the air face side was controlled in a ratio of 90:5:5.

The optical film sample 115 of the invention thus fabricated was analyzed and tested in the same manner as in Example 1 to determine and calculate the curl values thereof, $C_{MD,60}$, $C_{TD,60}$, $C_{MD,10}$, $C_{TD,10}$, $C_{MD,80}$, $C_{TD,80}$, and the curl difference thereof, $\Delta(C_{MD,80}-C_{MD,10})$, $\Delta(C_{TD,80}-C_{TD,10})$. The data are given in Table 8.

In addition, in the optical film sample 115, the additive distribution in the thickness direction thereof was determined in the same manner as in Example 1. The data are given in Table 9.

It was confirmed that the curl difference at 80% RH and at 10% RH of the optical film sample 115 of the invention fabricated according to a co-casting method was smaller than that of the optical film sample 105 fabricated not according to a co-casting method.

In addition, it was also confirmed that the additive distribution in the thickness direction of the film sample 115 was narrowed.

TABLE 8

| Sample Number | Additive Solution | Thickness (μm) | Amount of Additive Added (mas. pts. relative to 100 mas. pts. of cellulose acylate) optical anisotropy-lowering agent *3 | | wavelength-dependent anisotropy distribution improver | | $C_{MD,10}$ (1/m) | $C_{TD,10}$ (1/m) | $C_{MD,60}$ (1/m) | $C_{TD,60}$ (1/m) | $C_{MD,80}$ (1/m) | $C_{TD,80}$ (1/m) | $\Delta C_{MD}$ *1 (1/m) | $\Delta C_{TD}$ *2 (1/m) | Remarks |
|---|---|---|---|---|---|---|---|---|---|---|---|---|---|---|---|
| 115 | B-7, B-17 | 80 | A-19 | 6.4 | UV-21 | 1.6 | 3 | 4 | 4 | 7 | 4 | 8 | 1 | 4 | the invention |

*3 optical anisotropy-lowering compound

TABLE 9

| Sample Number | Additive | | inner 2nd layer | inner 3rd layer | inner 4th layer | inner 5th layer | inner 6th layer | inner 7th layer | inner 8th layer | inner 9th layer | Remarks |
|---|---|---|---|---|---|---|---|---|---|---|---|
| 115 | A-19 + UV-21 | existing additive amount *1 | 98.9 | 103.6 | 103.3 | 103.1 | 103.2 | 107.7 | 103.9 | 97.0 | the invention |

Note)
*1 % relative to the mean additive amount existing in the entire optical film.

Example 4

A cellulose acylate solution C and an additive solution B-10 were prepared according to the method described in Example 2. An additive solution B-18 was prepared like the additive solution B-10, for which, however, the amount of the additive BDP was changed to 80 parts by weight and the amount of the additive UV-7 was to 12 parts by weight.

<Fabrication of Transparent Film Sample 116>

40 parts by mass of the additive solution B-10 was added to 465 parts by mass of the cellulose acylate solution C, and well stirred to prepare a dope E. 40 parts by mass of the additive solution B-18 was added to 465 parts by mass of the cellulose acylate solution A, and well stirred to prepare a dope F. The dope E and the dope F were co-cast onto a cooled metal support band with the dope E being sandwiched between the dopes F. The film formed was peeled off from the band at a peeling speed of 53 m/min, having a solvent content of 82% by mass, and with its both sides in the width direction thereof being fixed to a tenter (as in FIG. 3 in JP-A 4-1009), this was dried to have a solvent content of from 20 to 48% by mass in such a manner that the draw ratio in the transverse direction (direction perpendicular to the machine direction) could be 3%. Next, the film was conveyed between rolls in a heat treatment device and was further dried therein at 130° C. for 25 minutes. Thus, a transparent film sample 116 having a thickness of 80 μm was produced. The casting flow amount of the dope E, the dope F on the band face side and the dope F on the air face side was controlled in a ratio of 90:5:5.

The transparent film sample 116 of the invention thus fabricated was analyzed and tested in the same manner as in Example 1 to determine and calculate the curl values thereof, $C_{MD,60}$, $C_{TD,60}$, $C_{MD,10}$, $C_{TD,10}$, $C_{MD,80}$, $C_{TD,80}$, and the curl difference thereof, $\Delta(C_{MD,80}-C_{MD,10})$, $\Delta(C_{TD,80}-C_{TD,10})$. The data are given in Table 10.

In addition, in the transparent film sample 116, the additive distribution in the thickness direction thereof was determined in the same manner as in Example 1. The data are given in Table 11.

It was confirmed that the curl value at 10% RH and the curl difference at 80% RH and at 10% RH of the transparent film sample 116 of the invention fabricated according to a co-casting method were small and were within a desired range, different from those of the transparent film sample 004 fabricated not according to a co-casting method.

In addition, it was also confirmed that the additive distribution in the thickness direction of the film sample 116 could also be within a desired range.

TABLE 10

| | | | Amount of Additive Added (mas. pts. relative to 100 mas. pts. of cellulose acylate) | | | | | | | | | |
|---|---|---|---|---|---|---|---|---|---|---|---|---|
| Sample Number | Additive Solution | Thickness (μm) | optical anisotropy-lowering agent *3 | wavelength-dependent anisotropy distribution improver | $C_{MD,10}$ (1/m) | $C_{TD,10}$ (1/m) | $C_{MD,60}$ (1/m) | $C_{TD,60}$ (1/m) | $C_{MD,80}$ (1/m) | $C_{TD,80}$ (1/m) | $\Delta C_{MD}$ *1 (1/m) | $\Delta C_{TD}$ *2 (1/m) | Remarks |
| 116 | B-10, B-18 | 80 | BDP *4  16.4 | UV-7  1.8 | 14 | −6 | 12 | 2 | 10 | 3 | 14 | 9 | the invention |

*3 optical anisotropy-lowering compound
*4 having no ability to lower optical anisotropy

TABLE 11

| Sample Number | Additive | | inner 2nd layer | inner 3rd layer | inner 4th layer | inner 5th layer | inner 6th layer | inner 7th layer | inner 8th layer | inner 9th layer | Remarks |
|---|---|---|---|---|---|---|---|---|---|---|---|
| 116 | BDP + UV-7 | existing additive amount *1 | 105.3 | 109.2 | 113.6 | 112.2 | 110.3 | 106.3 | 87.3 | 84.2 | the invention |

Note)
*1 % relative to the mean additive amount existing in the entire optical film.

Example 5

Fabrication of Transparent Film Sample 117

40 parts by mass of an additive solution B-10 was added to 465 parts by mass of a cellulose acylate solution C, and well stirred to prepare a dope G, and this was cast onto a cooled metal drum. The film formed was peeled off from drum at a peeling speed of 68 m/min, having a solvent content of 63% by mass, and with its both sides in the width direction thereof being fixed to a tenter (as in FIG. 3 in JP-A 4-1009), this was dried to have a solvent content of from 18 to 35% by mass in such a manner that the draw ratio in the transverse direction (direction perpendicular to the machine direction) could be 3%. Next, the film was conveyed between rolls in a heat treatment device and was further dried therein at 137° C. for 15 minutes. Thus, a transparent film sample 117 having a thickness of 80 μm was produced.

The transparent film sample 117 of the invention thus fabricated was analyzed and tested in the same manner as in Example 1 to determine and calculate the curl values thereof, $C_{MD,60}$, $C_{TD,60}$, $C_{TD,60}$, $C_{MD,10}$, $C_{TD,10}$, $C_{MD,80}$, $C_{TD,80}$, and the curl difference thereof, $\Delta(C_{MD,80}-C_{MD,10})$, $\Delta(C_{TD,80}-C_{TD,10})$. The data are given in Table 12.

In addition, in the transparent film sample 117, the additive distribution in the thickness direction thereof was determined in the same manner as in Example 1. The data are given in Table 12.

It was found that, of the transparent film sample 117 of the invention fabricated under the optimized film-forming condition, the curl value at 10% RH and the curl difference at 80% RH and at 10% RH could be reduced to fall within a desired range.

In addition, it was confirmed that the additive distribution in the thickness direction of the film sample 117 could also be within a desired range.

Example 6

Fabrication of Polarizing Plate

The optical film sample 101 obtained in Example 1 was dipped in an aqueous 1.5 N sodium hydroxide solution at 55° C. for 2 minutes. This was washed in a washing water bath at room temperature, and neutralized with 0.1 N sulfuric acid at 30° C. This was again washed in a washing water bath at room temperature, and dried with hot air at 100° C. The surface of the optical film was thus saponified.

Next, a polyvinyl alcohol roll film having a thickness of 80 μm was continuously stretched 5-fold in an aqueous iodine solution, and dried to obtain a polarizing film. Using an adhesive of an aqueous 3% polyvinyl alcohol (Kuraray's PVA-117H) solution, two sheets of the alkali-saponified optical film sample 101 were stuck together with the polarizing film sandwiched therebetween, thereby giving a polarizing plate protected with the optical film 101 on both surfaces thereof. In its fabrication, the constitutive film were so stuck together that the slow axis of the optical film sample 101 on both surfaces of the polarizing film could be in parallel to the transmission axis of the polarizing film. In the same manner as herein, the samples 102 to 114 in Examples 1 and 2 and the comparative sample 002 in Example 1 were used to fabricate polarizing plates. The adhesiveness of the optical films samples 101 to 114 of the invention and the comparative sample 002 to polyvinyl alcohol was all good, and they have good workability into polarizing plates. The polarizing plates thus fabricated herein are referred to as polarizing plates 101 to 104 and polarizing plate 002.

Comparative Example

Polarizing plates were fabricated in the same manner as in Example 6, for which, however, two sheets of a commercially-available polycarbonate film "Panlite C1400" (by Teijin Chemical) were used in place of two sheets of the

TABLE 12

| Sample Number | Additive Solution | Thickness (μm) | optical anisotropy-lowering agent *3 | | wavelength-dependent anisotropy distribution improver | | $C_{MD,10}$ (1/m) | $C_{TD,10}$ (1/m) | $C_{MD,60}$ (1/m) | $C_{TD,60}$ (1/m) | $C_{MD,80}$ (1/m) | $C_{TD,80}$ (1/m) | $\Delta C_{MD}$ *1 (1/m) | $\Delta C_{TD}$ *2 (1/m) | Remarks |
|---|---|---|---|---|---|---|---|---|---|---|---|---|---|---|---|
| 117 | B-10 | 80 | BDP *4 | 16.4 | UV-7 | 1.8 | 13 | −8 | 10 | −2 | 8 | 1 | −5 | 9 | the invention |

*3 optical anisotropy-lowering compound
*4 having no ability to lower optical anisotropy

TABLE 13

| Sample Number | Additive | | inner 2nd layer | inner 3rd layer | inner 4th layer | inner 5th layer | inner 6th layer | inner 7th layer | inner 8th layer | inner 9th layer | Remarks |
|---|---|---|---|---|---|---|---|---|---|---|---|
| 117 | BDP + UV-7 | existing additive amount *1 | 104.8 | 110.8 | 116.4 | 113.9 | 111.7 | 104.5 | 90.3 | 80.4 | the invention |

Note)
*1 % relative to the mean additive amount existing in the entire optical film.

optical film of the invention for protecting the polarizing film. However, the adhesiveness of the polycarbonate film to polyvinyl alcohol was not good, and the polycarbonate film could not function as a protective film for polarizing plate, and it was problematic in the workability into polarizing plates. The film, Panlite C1400 does not satisfy the invention in point of the additive amount defined in the invention.

Comparative Example

Polarizing plates were fabricated in the same manner as in Example 6, for which, however, two sheets of an Arton film (by JSR) having a thickness of 80 μm were used in place of two sheets of the optical film of the invention for protecting the polarizing film. However, the adhesiveness of the Arton film to polyvinyl alcohol was not good, and the film could not function as a protective film for polarizing plate, and it was problematic in the workability into polarizing plates.

The Arton film does not satisfy the invention in point of the additive amount defined in the invention.
(Durability of Polarizing Plate)

The polarizing plates comprising any of the optical film samples 101 to 115 of the invention and the comparative sample 002 prepared in Examples 1 to 3 were left at 60° C. and 95% RH for 500 hours, and tested for the degree of polarization. The polarizing plates with any of the samples 101 to 115 were all better than the polarizing plate with the comparative sample 002 in point of the polarization characteristic, and it was confirmed that the optical films of the invention have improved durability when used in polarizing plates.

Example 7

Evaluation of Film Fitted in IPS-Mode Liquid-Crystal Display Device

The optical film produced in Example 2 and the polarizing plate obtained in Example 4 were fitted to a liquid-crystal display device and tested for its optical properties. In this Example, an IPS-mode liquid-crystal cell was used; while in the other Examples, VA-mode and OCB-mode liquid-crystal cells were used. The application of the polarizing plate and the optically-compensatory film produced by the use of the optical film of the invention is not limited by these driving modes of liquid-crystal display devices.

Of those fabricated in Example 4, the polarizing plates 110 to 113 and the polarizing plate 003 (this comprises a comparative sample 003) were tested. To each of these, fitted was a monoaxially-oriented optically-compensatory film formed of an Arton film (by JSR) so as to make it have an optically-compensatory function. In this structure, the slow axis of the in-plane retardation of the optically-compensatory film was made perpendicular to the transmission axis of the polarizing plate, whereby the visible characteristics of this structure was improved with no change in the in-plane properties thereof. The in-plane retardation $Re_{(630)}$ of the optically-compensatory film was 270 nm; the thickness-direction retardation $Rth_{(630)}$ thereof was 0 nm; and the Nz factor thereof was 0.5.

Two pairs of the laminate of the polarizing plate 110 and the optically-compensatory film were prepared, and these were stacked up together with a liquid crystal cell in such a manner that the optically-compensatory film of each laminate could be on the side of the liquid-crystal cell in an order of "laminate of polarizing plate 110 and optically-compensatory film+IPS-mode liquid-crystal cell+laminate of polarizing plate 110 and optically-compensatory film". With this laminate structure built therein, a liquid-crystal display was constructed. In this, the transmission axis of the upper and lower polarizing plates was made perpendicular to each other, and the transmission axis of the upper polarizing plate was made parallel to the major axis direction of the liquid-crystal molecules in the cell (or that is, the slow axis of the optically-compensatory layer was perpendicular to the major axis of the liquid-crystal molecules in the cell). Conventional liquid-crystal cell, electrode and substrate generally used in IPS were used herein as they were. The alignment of the liquid-crystal cell was horizontal alignment, and the liquid crystal had positive dielectric anisotropy. These were all commercially-available ones for IPS-mode liquid-crystal devices. The physical properties of the liquid-crystal cell are as follows: An of liquid crystal is 0.099; the cell gaps of the liquid-crystal layer is 3.0 μm; the pretilt angle is 5 degrees; the rubbing direction is at 75 degrees in both the upper and lower substrates.

In the liquid-crystal display devices constructed in the manner as above, the degree of light leakage in black display was determined in the azimuth direction of 45 degrees and in the polar angle direction of 70 degrees from the display front, and the data obtained are given in Table 14.

The devices with the smaller data give smaller light leakage in the oblique direction of 45 degrees and therefore have better display contrast. Accordingly, the viewing angle characteristics of liquid-crystal display devices can be evaluated on the basis of the data. The degree of light leakage through the devices that comprise any of the polarizing plates 110 to 113 with the optical film of the invention is from ⅛ to ¼ and is small, as compared with that of the device comprising the polarizing plate 003 with the comparative sample. In addition, the color change in display of the devices that comprise any of the polarizing plates 110 to 113 of the invention is also small, as compared with that in the display comprising the comparative polarizing plate 003. This is because the wavelength-dependent anisotropy (Re, Rth) distribution of the optical film samples 110 to 113 of the invention is small (that is, the films of the invention have lower wavelength dependency in point of their anisotropy), and therefore the films may have the same and uniform optically-compensatory properties at any and every wavelength. As mentioned above, it is understood that the optically-compensatory films and polarizing plates fabricated by the use of the optical film of the invention have good viewing angle characteristics and are free from display color change.

TABLE 14

| Sample Number | Thickness (μm) | Light Leakage in Black Display on IPS Panel (%) | Remarks |
| --- | --- | --- | --- |
| 003 | 60 | 0.48 | comparison |
| 110 | 68 | 0.11 | the invention |
| 111 | 64 | 0.07 | the invention |
| 112 | 58 | 0.01 | the invention |
| 113 | 51 | 0.02 | the invention |

Example 8

Evaluation of Film Fitted in VA-Mode or OCB-Mode Liquid-Crystal Display Device

The optical films produced in Examples 1 to 3 were tested, as fitted to or mounted on a liquid-crystal display device described in Example 1 of JP-A 10-48420, a discotic liquid-crystal molecules-containing optically-anisotropic layer and a polyvinyl alcohol-coated orientation film described in Example 1 of JP-A 9-26572, a VA-mode liquid-crystal display device described in FIGS. 2 to 9 of JP-A 2000-154261, and an OCB-mode liquid-crystal display device described in FIGS. 10 to 15 of JP-A 2000-154261. In all of these, the films were good in point of both image contrast and viewing angle characteristics.

Example 9

Properties of Optically-Compensatory Film

According to the method described in Example 1 of JP-A 7-333433, optically-compensatory films were fabricated by the use of the optical film samples of the invention produced in Examples 1 to 3. Thus obtained, the filter films had good viewing angle characteristics on all sides. Accordingly, this confirms that the optical films of the invention are excellent in point of their optical applications.

Example 10

Properties of Optically-Compensatory Film

According to the method described in Example 1 of JP-A 2003-315541, optically-compensatory film samples were fabricated by the use of the optical film samples of the invention. A polyimide produced from 2,2'-bis(3,4-dicarboxyphenyl)hexafluoropropane dianhydride (6FDA) and 2,2'-bis(trifluoromethyl)-4,4'-diaminobiphenyl (TFMB) and having a mass-average molecular weight (Mw) of 60,000 and Δn of about 0.04 was dissolved in a solvent of cyclohexanone to prepare a 28 mas. % solution thereof. This was applied to the polymer film sample 111 of the invention (thickness, 64 μm). Next, this was heated at 100° C. for 10 minutes and then monoaxially stretched by 16% in the machine direction at 160° C., therefore producing an optically-compensatory film comprising the optical film of the invention coated with a 6 μm-thick polyimide film. The optical properties of the optically-compensatory film are as follows: The optically-compensatory film had $Re_{(630)}$=70 nm and $Rth_{(630)}$=215 nm, its alignment axis shifting angle was within ±0.5 degrees.

Comparative Example

An optically-compensatory film of the comparative optical film sample 001 coated with a 6 μm-thick polyimide film was fabricated in the same manner as in Example 10, for which, however, the solution for forming the optically-compensatory film of Example 10 was applied to the comparative sample 001 (thickness, 80 μm) prepared in Example 1. The optical properties of the optically-compensatory film are as follows: $Re_{(630)}$=75 nm, $Rth_{(630\ nm)}$=280 nm.

(Evaluation of Film Fitted in VA-Mode Liquid-Crystal Display Device)

The optically-compensatory film fabricated in Example 10 and Comparative Example was subjected to alkali saponification on the side thereof not coated with the polyamide film. This was stuck to a polarizing film with a polyvinyl alcohol adhesive, or that is, the film was directly stuck to the polarizing film. These were stuck together so that the slow axis direction of the optically-compensatory film could be perpendicular to the absorption axis of the polarizing plate. The optically-compensatory film was laminated to a VA-mode liquid-crystal panel with an adhesive in such a manner that the film could be on the side of the liquid-crystal cell. On the other side of the liquid-crystal cell in this, only the polarizing plate was stuck to the VA-mode liquid-crystal panel with an adhesive in such a manner that the absorption axis of the polarizing plates could be perpendicular to each other. Thus constructed, the liquid-crystal display device was tested for its viewing angle characteristics. As a result, the optically-compensatory film with the optical film sample 111 of the invention of Example 10 was better than the optically-compensatory film with the comparative sample 001 in point of the viewing angle characteristics on all sides. Accordingly, this confirms that the optical films of the invention are excellent when used as a retardation film for VA-mode devices.

INDUSTRIAL APPLICABILITY

According to the invention, there is provided an optical film of which the absolute value of curl is small and the curl fluctuation depending on the environmental change of temperature and humidity is also small, and there is provided a method for producing it.

According to the invention, there are also provided an optically-compensatory film, a polarizing plate and a liquid-crystal display device that comprise the optical film and that have good handlability and good viewing angle characteristics.

The entire disclosure of each and every foreign patent application from which the benefit of foreign priority has been claimed in the present application is incorporated herein by reference, as if fully set forth.

The invention claimed is:

1. A method for producing an optical film comprising:
a resin material which is cellulose acylate having a polydispersiveness index (Mw/Mn) of from 1.0 to 5.0; and
an additive having a molecular weight of 3,000 or less in an amount of at least 0.3% by mass based on the resin material,
wherein when the optical film is divided into 10 equal portions in a thickness direction of the optical film, an amount of the additive existing in each of 8 portions excepting the two outermost layer portions of the 10 equal portions is from 80 to 120% based on a mean additive amount in an entire optical film, the method comprising steps (1) and (2):
(1) a step of adding the additive to the resin material at plural different concentrations, adding a solvent to dissolve the additive and the resin material, and preparing plural solutions having different additive concentrations and a dope transparency of 85% or more; and
(2) a step of casting the plural solutions onto a substrate in a co-casting process or a multi-layer casting process in a manner that a solution having a higher additive concentration among the plural solutions forms an outer layer of the optical film, so as to form an optical film in which when the optical film is divided into 10 equal portions in a thickness direction of the optical film, an amount of the additive existing in each of 8 portions excepting the two outermost layer portions of the 10 equal portions is from 80 to 120% based on a mean additive amount in an entire optical film,
wherein the optical film contains at least one optical anisotropy-lowering compound within a range satisfying the following formulae (a) and (b):

$$(Rth(A) - Rth(0))/A \leq -1.0, \quad \text{(a)}$$

$$0.01 \leq A \leq 30, \quad \text{(b)}$$

wherein Rth(A) means Rth (nm) of the film that contains A % of a compound of lowering Rth; Rth(0) means Rth (nm) of the film not containing a compound of lowering Rth; A means the mass (%) of the compound relative to the solid content mass, 100, of a polymer in the optical film, and wherein the optical film has Re (λ) and Rth (λ) satisfying formulae (I) and (II):

$$0 \leq Re_{(630)} \leq 10, \text{ and } |Rth_{(630)}| \leq 25, \tag{I}$$

$$|Re_{(400)} - Re_{(700)}| \leq 10, \text{ and } |Rth_{(400)} - Rth_{(700)}| \leq 35, \tag{II}$$

wherein Re (λ) represents an in-plane retardation value (unit: nm) of the optical film at a wavelength of λ nm; and Rth (λ) represents a thickness-direction retardation value (unit: nm) of the optical film at a wavelength of λ nm.

2. A method for producing an optical film comprising:

a resin material which is cellulose acylate having a polydispersiveness index (Mw/Mn) of from 1.0 to 5.0; and an additive having a molecular weight of 3,000 or less in an amount of at least 0.3% by mass based on the resin material, wherein when the optical film is divided into 10 equal portions in a thickness direction of the optical film, an amount of the additive existing in each of 8 portions excepting the two outermost layer portions of the 10 equal portions is from 80 to 120% based on a mean additive amount in an entire optical film, the method comprising steps (1), (2) and (3):

(1) a step of adding the resin material and the additive to a solvent and dissolving the resin material and the additive to prepare a solution having a dope transparency of 85% or more, and casting the solution onto a substrate;

(2) a step of drying the casted solution so that a volatile content of the casted solution is within a range of from 40% to 80%, so as to form a film, and peeling the film from the substrate; and (3) a step of controlling a volatile content of the peeled film to fall within a range of from 10% to 45%, and drying the peeled film at a temperature not lower than 131° C., so as to form an optical film in which when the optical film is divided into 10 equal portions in a thickness direction of the optical film, an amount of the additive existing in each of 8 portions excepting the two outermost layer portions of the 10 equal portions is from 80 to 120% based on a mean additive amount in an entire optical film, wherein the optical film contains at least one optical anisotropy-lowering compound within a range satisfying the following formulae (a) and (b):

$$(Rth(A) - Rth(0))/A \leq -1.0, \tag{a}$$

$$0.01 \leq A \leq 30, \tag{b}$$

wherein Rth(A) means Rth (nm) of the film that contains A % of a compound of lowering Rth; Rth(0) means Rth (nm) of the film not containing a compound of lowering Rth; A means the mass (%) of the compound relative to the solid content mass, 100, of a polymer in the optical film, and wherein the optical film has Re (λ) and Rth (λ) satisfying formulae (I) and (II):

$$0 \leq Re_{(630)} \leq 10, \text{ and } |Rth_{(630)}| \leq 25, \tag{I}$$

$$|Re_{(400)} - Re_{(700)}| \leq 10, \text{ and } |Rth_{(400)} - Rth_{(700)}| \leq 35, \tag{II}$$

wherein Re (λ) represents an in-plane retardation value (unit: nm) of the optical film at a wavelength of λ nm; and Rth (λ) represents a thickness-direction retardation value (unit: nm) of the optical film at a wavelength of λ nm.

3. The method according to claim 1, wherein the molecular weight of the additive is 1,000 or less.

4. The method according to claim 1,
wherein the additive concentration of one of the two outermost layer portions is higher by 0.1 to 15% than an inner layer.

5. The method according to claim 2,
wherein the molecular weight of the additive is 1,000 or less.

6. The method according to claim 2,
wherein the additive concentration of one of the two outermost layer portions is higher by 0.1 to 15% than an inner layer.

\* \* \* \* \*